(12) United States Patent
Harada et al.

(10) Patent No.: US 7,248,272 B2
(45) Date of Patent: Jul. 24, 2007

(54) METHOD OF CORRECTING ADJUSTMENT VALUE FOR IMAGE FORMING APPARATUS, IMAGE FORMING APPARATUS, AND RECORDING MEDIUM

(75) Inventors: Yoshikazu Harada, Nara (JP); Kyosuke Taka, Nara (JP); Norio Tomita, Yamatokooriyama (JP); Nobuo Manabe, Yamatokooriyama (JP); Toshio Yamanaka, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 852 days.

(21) Appl. No.: 10/670,674

(22) Filed: Sep. 24, 2003

(65) Prior Publication Data

US 2004/0057062 A1    Mar. 25, 2004

(30) Foreign Application Priority Data

Sep. 25, 2002    (JP)    ............................. 2002-280001

(51) Int. Cl.
*B41J 2/385* (2006.01)
*G01D 15/06* (2006.01)
*G03G 15/01* (2006.01)
*G06K 9/00* (2006.01)
*G06K 9/32* (2006.01)

(52) U.S. Cl. ...................... 347/116; 382/167; 382/294; 399/301

(58) Field of Classification Search ................ 382/167, 382/294; 347/116; 358/1.9, 518–523; 399/301
See application file for complete search history.

(56) References Cited

U.S. PATENT DOCUMENTS

| 5,452,073 | A | * | 9/1995 | Kataoka | ..................... 399/299 |
| 5,696,890 | A | * | 12/1997 | Geissler et al. | .............. 358/1.9 |
| 5,872,586 | A | * | 2/1999 | Shio | ........................... 347/116 |
| 6,148,168 | A | | 11/2000 | Hirai et al. | |
| 6,198,490 | B1 | * | 3/2001 | Eom et al. | ................... 347/116 |
| 6,327,453 | B1 | * | 12/2001 | Imaizumi et al. | .......... 399/301 |
| 6,493,011 | B1 | * | 12/2002 | Shioya | ....................... 347/116 |
| 2004/0130737 | A1 | | 7/2004 | Kamimura et al. | |

FOREIGN PATENT DOCUMENTS

| CN | 1489007 | 4/2004 |
| JP | 10-213940 | 8/1998 |
| JP | 2000-81744 | 3/2000 |

* cited by examiner

*Primary Examiner*—Matthew C. Bella
*Assistant Examiner*—Yubin Hung
(74) *Attorney, Agent, or Firm*—Edward G. Conlin; Steven M. Jensen; Edwards Angell Palmer & Dodge LLP

(57) ABSTRACT

A plurality of first base images for a base color are formed in accordance with a predetermined adjustment value. A plurality of first correction images for a correction color to be a subject for correction are formed on the first base images in accordance with a predetermined adjustment value. The first correction images are displaced within a predetermined range. The first adjustment value is determined from changed adjustment values. The second base images for the base color are formed in accordance with the predetermined adjustment value while the second correction images for the correction color are formed in accordance with a plurality of adjustment values determined based on the first adjustment value. One second adjustment value having an extreme is determined from the plurality of adjustment value candidates. These processes are repeated to determine a final adjustment value. The adjustment value for the correction color is corrected to the determined final adjustment value.

19 Claims, 28 Drawing Sheets

FIG. 4

ADJUSTMENT VALUE TABLE — 52T

| TIMING OF EXPOSURE (msec.) | $T_0$ | $T_0+\Delta T_1$ | $T_0+\Delta T_2$ | $T_0+\Delta T_3$ | $\cdots T_0+\Delta T_{11}\cdots$ | $T_0+\Delta T_{98}$ | $T_0+\Delta T_{99}$ |
|---|---|---|---|---|---|---|---|
| EXPOSURE UNIT 1a (BLACK) | 0 | 1 | 2 | 3 | ⋯⋯ | 98 | 99 |
| EXPOSURE UNIT 1b (CYAN) | 0 | 1 | 2 | 3 | ⋯11⋯ | 98 | 99 |
| EXPOSURE UNIT 1c (MAGENTA) | 0 | 1 | 2 | 3 | ⋯⋯ | 98 | 99 |
| EXPOSURE UNIT 1d (YELLOW) | 0 | 1 | 2 | 3 | ⋯⋯ | 98 | 99 |

ADJUSTMENT VALUE (dot)

METHOD OF CORRECTING ADJUSTMENT VALUE FOR IMAGE FORMING APPARATUS, IMAGE FORMING APPARATUS, AND RECORDING MEDIUM

BACKGROUND OF THE INVENTION

1. Field of the Invention

The present invention relates to a method of correcting a predetermined adjustment value for an image forming apparatus that forms an image of each of separated colors based on the adjustment value, an image forming apparatus using the method, and a recording medium for realizing the function of the image forming apparatus. In particular, the invention relates to a method of efficiently correcting misregistered color images formed on a carrier.

2. Description of the Prior Art

An image forming apparatus such as a digital color copying machine or the like performs image processing on input data for each color component, and then forms a multi-color image by layering the images of the color components. If the images of the color components are misaligned in forming the multi-color image, color misregistration occurs in the resulting multi-color image, which may deteriorate the image quality. Particularly, in the image forming apparatus provided with an image forming portion for every color component in order to improve the speed of multi-color image formation, the images of the color components are formed at respective image forming portions and then layered one after another so as to form the multi-color image.

In such an image forming apparatus, misalignment often occurs in transfer positions of the images of the color components, causing a significant problem of color misregistration in the resulting multi-color image. In order to solve such a problem, a conventional image forming apparatus performs color adjustment corrects color misregistration in a multi-color image for achieving precise alignment of different color component images so as to form a good multi-color image without color misregistration. The color adjustment is usually performed by detecting a displacement of an image forming position of a color component from an image forming position of a base color component by an optical sensor. An amount of correction is then determined based on the detected result, and the timing for forming the image of each color component is adjusted in accordance with the amount of correction such that the transfer positions of the color component images match with one another.

To determine the amount of correction, first, a method of transferring the images of different color components at the same timing and then detecting the distance between the transfer positions of the color components is disclosed. Moreover, the second method is disclosed by which the images of different color components are transferred at the same timing and the density of the multi-color image formed by layering the color components is measured.

As the first method, for example, the image forming apparatus disclosed in Japanese Patent Laid-Open No. 10-213940 is known. The image forming apparatus disclosed in Japanese Patent Laid-Open No. 10-213940 detects the distance between transfer positions of the images of different color components to perform correction based on the detected amount of displacement in the transfer positions. The apparatus detects the distance between the image formed by a base color component and the image formed by another color component by a sensor and determines the amount of displacement in the transfer positions of the images of the color components based on the detected distance, to correct color misregistration.

As the second method, the image forming apparatus disclosed in Japanese Patent Laid-Open No. 2000-81744 is known. The image forming apparatus disclosed in Japanese Patent Laid-Open No. 2000-81744 measures the density of the multi-color image formed by layering the images of different color components and corrects color misregistration such that the density is that obtained when the images of the color components are precisely aligned. This image forming apparatus repeatedly forms a plurality of images of the same shape for each color component in order to improve the correction accuracy. Specifically, a plurality of images having the same linear shape are formed for each color component, and the density of each multicolor line image is detected by a sensor in order to obtain the alignment state of the line images of different color components. It is then assumed that the line images of the color components are accurately aligned when the density of the multi-line image detected by the sensor is in the range of a predetermined density. Then, color adjustment is performed by providing correction such that the images are formed in the accurately aligned state.

The image forming apparatus disclosed in Japanese Patent Laid-Open No. 10-213940 that uses a sensor for detecting transfer positions of the images of different color components to obtain displacement in the transfer positions of the images, however, had a problem such that a sensor with high detection accuracy must be used to detect small displacements in transfer positions. Color adjustment requires accuracy of several microns. Incorporation of such a sensor has caused a problem of increased cost.

The image forming apparatus disclosed in Japanese Patent Laid-Open No. 2000-81744 needs to shift the adjustment value line by line over the entire area of image color adjustment to obtain an adjustment value at which a base image and a color component image to be a subject for adjustment are perfectly aligned. This requires detection of the density used at color correction for the entire area of the image color adjustable range, which disadvantageously increases the time required for color adjustment. Moreover, if the time required for adjustment is made shorter, the image color adjustable area cannot be so widened. In particular, color misregistraion is caused by various reasons such as the temperature and moisture in the image forming apparatus, worn-out parts, and replacement of parts. Accordingly, besides at the time of factory shipment, regular corrections must be made even after delivery by a maintenance person or a user on the field. Thus, development of an image forming apparatus that can simply correct color misregistration with high accuracy has been requested.

According to the method of using a sensor to detect the density of the alignment state for the base image and the image of a color component to be a subject for adjustment, the sensor detects reflection light from the base image and the color component image that are formed on a transfer belt, whereas it detects reflection light from the transfer belt itself for the portion where no base image or image for adjustment are formed. There is a small difference between the reflection light from the transfer belt itself and the reflection light from the portion where images are formed. This may be the cause of deterioration in detection accuracy by the sensor, depending on the ratio of the image forming region to non-image forming region (the transfer belt itself) that are included in the sensor detecting area.

BRIEF SUMMARY OF THE INVENTION

The present invention has been made with the aim of solving the problems above. An object of the present invention is to provide a correction method that is capable of correcting an adjustment value in a shorter time and with higher accuracy by changing an adjustment value within a predetermined range to determine adjustment value candidates and determining a final adjustment value to be subject to correction by gradually lowering the number of adjustment value candidates, and to provide an image forming apparatus used in the method, and a recording medium for realizing the function of the image forming apparatus.

Moreover, another object of the present invention is to provide an image forming apparatus that is capable of correcting an adjustment value in a shorter time when a maintenance person, a user or the like performs correction for color adjustment after delivery, by determining whether or not detailed adjustment processes should be carried out and correcting the adjustment value only by the first adjustment if it is determined that there is no need to carry out such detailed adjustments.

The correction method according to the present invention is a method of correcting a predetermined adjustment value for an image forming apparatus forming an image of each of separated colors in accordance with the adjustment value, including a first formation step of forming a first base image for a base color in accordance with a predetermined adjustment value, and forming a first correction image for a correction color to be a subject for correction in accordance with a value obtained by changing a predetermined adjustment value within a predetermined range; a first adjustment value determination step of determining a first adjustment value from the changed adjustment values based on a density output from a sensor detecting the density of an image forming portion; an intermediate formation step of forming an intermediate correction base image for the base color in accordance with the predetermined adjustment value, and forming an intermediate correction image for the correction color in accordance with a plurality of selective adjustment values that have periodical relation with the first adjustment value; an intermediate adjustment value determination step of determining an intermediate adjustment value from the plurality of selective adjustment values based on the density output from the sensor; an intermediate adjustment value candidate extraction step of extracting a plurality of intermediate adjustment value candidates that have periodical relation with the determined intermediate adjustment value in an adjustable range of an adjustment value; an execution step of again extracting a plurality of selective adjustment values to be subject to adjustment from the intermediate adjustment value candidates and executing the intermediate forming step if the number of extracted intermediate adjustment values is a predetermined number or more; a final formation step of forming a final base image for the base color in accordance with the predetermined adjustment value, and forming a final correction image for the correction color in accordance with each of the extracted intermediate adjustment value candidates, if the number of extracted intermediate adjustment value candidates is less than the predetermined number; a final adjustment value determination step of determining a final adjustment value from the intermediate adjustment value candidates based on the density output from the sensor; and a correction step of correcting the predetermined adjustment value for the correction color to the determined final adjustment value.

The correction method according to the present invention is a method of correcting a predetermined adjustment value for an image forming apparatus forming an age of each of separated colors in accordance with the adjustment value, including a first formation step of forming a first base image for a base color in accordance with a predetermined adjustment value, and forming a first correction image for a correction color to be a subject for correction in accordance with a value obtained by changing a predetermined adjustment value within a predetermined range; a first adjustment value determination step of determining a first adjustment value from the changed adjustment values based on a density output from a sensor detecting the density of an image forming portion; an adjustment value candidate extraction step of extracting a plurality of adjustment value candidates that have periodical relation with the first adjustment value determined within the predetermined range in an adjustable range of an adjustment value; a selective adjustment value extraction step of extracting a plurality of selective adjustment values to be subject to adjustment from the extracted adjustment value candidates; an intermediate formation step of forming an intermediate base image for the base color in accordance with the predetermined adjustment value, and forming an intermediate correction image for the correction color in accordance with the extracted selective adjustment values; an intermediate adjustment value determination step of determining an intermediate adjustment value from the plurality of selective adjustment values based on the density output from the sensor; an intermediate adjustment value candidate extraction step of extracting a plurality of intermediate adjustment value candidates that have periodical relation with the determined intermediate adjustment value in an adjustable range of an adjustment value; an execution step of again extracting a plurality of selective adjustment values to be subject to adjustment from the extracted intermediate adjustment value candidates by the selective adjustment value extraction step and repeatedly executing each process at the intermediate formation step, intermediate adjustment value determination step and intermediate adjustment value candidate extraction step until the number of extracted intermediate adjustment value candidates becomes less than a predetermined number, if the number of extracted intermediate adjustment value candidates is the predetermined number or more; a final formation step of forming a final base image for the base color in accordance with the predetermined adjustment value, and forming a final correction image for the correction color in accordance with each of the extracted intermediate adjustment value candidates, if the number of intermediate adjustment value candidates extracted by the intermediate adjustment value candidate extraction step is less than the predetermined number; a final adjustment value determination step of determining a final adjustment value from the intermediate adjustment value candidates based on the density output from the sensor; and a correction step of correcting the predetermined adjustment value for the correction color to the determined final adjustment value.

The image forming apparatus according to the present invention is an image forming apparatus forming an image of each of separated colors in accordance with a predetermined adjustment value, including a sensor detecting a density of an image forming portion; and a processor capable of performing the following operations including a first formation step of forming a first base image for a base color in accordance with a predetermined adjustment value, and forming a first correction image for a correction color to be a subject for correction in accordance with a value obtained by changing a predetermined adjustment value within a predetermined range; a first adjustment value determination step of determining a first adjustment value from the changed adjustment values based on a density output from the sensor; an adjustment value candidate extraction step of extracting a plurality of adjustment value candidates that have periodical relation with the first adjustment value determined within the predetermined range in an adjustable range of an adjustment value; a selective adjustment value extraction step of extracting a plurality of selective adjustment values to be subject to adjustment from the extracted adjustment value candidates; an intermediate formation step of forming an intermediate base image for the base color in accordance with the predetermined adjustment value, and forming an intermediate correction image for the correction color in accordance with the extracted selective adjustment values; an intermediate adjustment value determination step of determining an intermediate adjustment value from the plurality of selective adjustment values based on the density output from the sensor; an intermediate adjustment value candidate extraction step of extracting a plurality of intermediate adjustment value candidates that have periodical relation with the determined intermediate adjustment value in an adjustable range of an adjustment value; an execution step of again extracting a plurality of selective adjustment values to be subject to adjustment from the extracted intermediate adjustment value candidates by the selective adjustment value extraction step and repeatedly executing each process at the intermediate formation step, intermediate adjustment value determination step and intermediate adjustment value candidate extraction step until the number of extracted intermediate adjustment value candidates becomes less than a predetermined number, if the number of extracted intermediate adjustment value candidates is the predetermined number or more; a final formation step of forming a final base image for the base color in accordance with the predetermined adjustment value, and forming a final correction image for the correction color in accordance with each of the extracted intermediate adjustment value candidates, if the number of intermediate adjustment value candidates extracted by the intermediate adjustment value candidate extraction step is less than the predetermined number; a final adjustment value determination step of determining a final adjustment value from the intermediate adjustment value candidates based on the density output from the sensor and a correction step of correcting the predetermined adjustment value for the correction color to the determined final adjustment value.

The recording medium according to the present invention is a recording medium recording a computer program for correcting a predetermined adjustment value for an image forming apparatus forming an image of each of separated colors in accordance with the adjustment value, the computer program including a first formation step of making a computer form a first base image for a base color in accordance with a predetermined adjustment value, and form a first correction image for a correction color to be a subject for correction in accordance with a value obtained by changing a predetermined adjustment value within a predetermined range; a first adjustment value determination step of making a computer determine a first adjustment value from the changed adjustment values based on a density output from a sensor that outputs a density of an image forming portion; an adjustment value candidate extraction step of making a computer extract a plurality of adjustment value candidates that have periodical relation with the first adjustment value determined within the predetermined range in an adjustable range of an adjustment value; a selective adjustment value extraction step of making a computer extract a plurality of selective adjustment values to be subject to adjustment from the extracted adjustment value candidates; an intermediate formation step of making a computer form an intermediate base image for the base color in accordance with the predetermined adjustment value, and form an intermediate correction image for the correction color in accordance with the extracted selective adjustment values; an intermediate adjustment value determination step of making a computer determine an intermediate adjustment value from the plurality of selective adjustment values based on the density output from the sensor; an intermediate adjustment value candidate extraction step of making a computer extract a plurality of intermediate adjustment value candidates that have periodical relation with the determined intermediate adjustment value in an adjustable range of an adjustment value; an execution step of making a computer again extract a plurality of selective adjustment values to be subject to adjustment from the extracted intermediate adjustment value candidates by the selective adjustment value extraction step and repeatedly execute each process at the intermediate formation step, intermediate adjustment value determination step and intermediate adjustment value candidate extraction step until the number of extracted intermediate adjustment value candidates becomes less than a predetermined number, if the number of extracted intermediate adjustment value candidates is the predetermined number or more; a final formation step of making a computer form a final base image for the base color in accordance with the predetermined adjustment value, and form a final correction image for the correction color in accordance with each of the extracted intermediate adjustment value candidates, if the number of intermediate adjustment value candidates extracted by the intermediate adjustment value candidate extraction step is less than the predetermined number; a final adjustment value determination step of making a computer determine a final adjustment value from the intermediate adjustment value candidates based on the density output from the sensor; and a correction step of making a computer correct the predetermined adjustment value for the correction color to the determined final adjustment value.

In the present invention, a base color such as black for example is output in accordance with a predetermined adjustment value. Thus, a plurality of first base images, each having a rectangular shape and the width of e.g. several dots, are formed. A correction color such as cyan for example that is to be a subject for correction is output on the first base image in accordance with a predetermined adjustment value. Thus, a plurality of first correction images, each having the rectangular shape and the width of e.g. several dots, are formed. Here, if there is no displacement, each of the first base images perfectly matches with each of the first correction images. In order to check the degree of matching, the adjustment value for the correction color is changed within a predetermined range. That is, the first correction images are shifted at formation within the predetermined range, and the state of alignment is checked.

The first adjustment value is determined from the changed adjustment values based on the density output from the sensor detecting the density of the image forming portion. Specifically, if the first base image and the first correction image are perfectly aligned with each other, the density has an extreme value compared to the case with misaligned images. Thus, an adjustment value obtained when the extreme value is output is determined as the first adjustment value.

The first adjustment value at which an extreme value is output appears periodically in the adjustable range of an adjustment value. A plurality of adjustment value candidates (e.g., ninety adjustment values) that have periodical relation with the first adjustment value determined within the predetermined range are extracted in the entire adjustable range of an adjustment value (e.g., adjustment values from 0 to 999). If images are formed and color adjustment is performed for all the adjustment value candidates, time for adjustment as well as a large amount of developing agent is required, further deteriorating the sensor detection accuracy. According to the present invention, therefore, a plurality of selective adjustment values (e.g., seven adjustment values) that are subject to adjustment are extracted from the extracted adjustment value candidates. Then, color adjustment is performed for the selective values extracted from the adjustment value candidates. Here, intermediate base images for a base color are formed in accordance with a predetermined adjustment value, while intermediate correction images for a correction color are formed in accordance with the extracted selective adjustment values. Thereafter, based on the density output by the sensor, an intermediate adjustment value that has an extreme value is determined from the plurality of selective adjustment values.

Likewise, the intermediate adjustment value having an extreme value appears periodically. Thus, a plurality of intermediate adjustment value candidates that have periodical relation with the determined intermediate adjustment value are extracted in the adjustable range of an adjustment value. That is, a plurality of intermediate adjustment value candidates obtained by adding or subtracting an integer multiple of the sum of the width of each intermediate base image and each intermediate correction image to/from the determined intermediate adjustment value are extracted. For instance, if the intermediate adjustment value is determined as x by the color adjustment performed when the width of the intermediate base image is 6d and the width of the intermediate correction image is d, intermediate adjustment value candidates of "x−14," "x−7," "x," "x+7d," "x+14d" . . . that are obtained by adding or subtracting an integer multiple of the sum of the width "7d" to/from x are extracted. In the next color adjustment, the correction images are formed with displacement in accordance with the extracted intermediate adjustment value candidates. Then, if the number of extracted intermediate adjustment value candidates is a predetermined number or more (e.g. four or higher), a plurality of selective adjustment values (e.g. six adjustment values) that are subject to adjustment are again extracted from the extracted intermediate adjustment value candidates. That is, if the number of candidates is still higher, further candidates are selected again and the same process is repeated. Repetition of this process gradually narrows the range of adjustment value candidates.

If the number of extracted intermediate adjustment value candidates becomes less than the predetermined number (e.g. three), the time required for detection will not be very long even if the final adjustment is performed one by one for all the adjustment value candidates. Thus, the final base images for the base color are formed in accordance with the predetermined adjustment value, whereas the final correction images are formed for the correction color in accordance with each of the extracted (e.g. three) intermediate adjustment value candidates. Subsequently, the final adjustment value is determined from the intermediate adjustment value candidates (e.g. three adjustment values) based on the density output from the sensor. The predetermined adjustment value for the correction color is corrected to the final adjustment value determined as described. Accordingly, time required for adjustment can significantly be shortened and waste of developing agent can be prevented while the accuracy is improved, compared to the case where image formation is performed for correction for all the adjustment value candidates after the first adjustment value is determined.

In the image forming apparatus according to the present invention, the first formation step forms the first base images with a first interval and forms the first correction images based on a value obtained by changing an adjustment value within the range of the first interval.

In the present invention, the first base images are formed with the first interval (at every several dots for example), and the first correction images are formed with the adjustment value changed within the range of the first interval. For instance, the first base images of the rectangular shape each having the width of four dots are formed at cycles of every 11 dots (4 dots having an image and 7 dots having no image). The first correction images are formed with the adjustment value changed successively within the range of 11 dots. Then, the change in the density output from the sensor shows an extreme value at an aligned position. The extreme value can repeatedly be obtained with this interval (cycle). In other words, if one first adjustment value corresponding to the extreme value is determined, candidates for the final adjustment value can be obtained periodically without image formation for the entire area of adjustment. Such a structure allows more efficient determination of the adjustment value to be corrected, allowing color adjustment in a short time as a result.

In the image forming apparatus according to the present invention, the first formation step forms the first base images and first correction images having a same shape.

In the present invention, each of the first base images and the first correction images are formed to have the same shape. For instance, a plurality of rectangular images each having the width of 4 dots are formed at every 11 dots. The images of the same shape are thus formed, so that the extreme value of the density output from the sensor shows a significant peak when each of the first base images is perfectly aligned with each of the first correction images. This allows highly accurate determination of the adjustment value.

In the image forming apparatus according to the present invention, the intermediate formation step forms the intermediate base images for the base color in accordance with the predetermined adjustment value based on said first interval, and forms the intermediate correction images for the correction color in accordance with the extracted selective adjustment values based on said first interval.

In the image forming apparatus according to the present invention, the final formation step forms the final base images for the base color in accordance with the predetermined adjustment value based on the first interval, and forms the final correction images for the correction color in accordance with each of the extracted intermediate adjustment value candidates based on the first interval, if the number of intermediate adjustment value candidates extracted by the intermediate adjustment value candidate extraction step is less than the predetermined number.

In the image forming apparatus according to the present invention, each of the first base images, first correction images, intermediate base images, intermediate correction images, final base images, and final correction images has a rectangular shape, and each of the intermediate base images, intermediate correction images, final base images, and final correction images has a width corresponding to an integer multiple of the first interval.

In the image forming apparatus according to the present invention, the intermediate adjustment value candidates extraction step extracts a plurality of intermediate adjustment value candidates obtained by adding or subtracting an integer multiple of the sum of the widths of the intermediate base image and the intermediate correction image formed at the intermediate formation step to/from the intermediate adjustment value determined at the intermediate adjustment value determination step in an adjustable range of an adjustment value.

In the image forming apparatus according to the present invention, the processor is further capable of performing the step of determining whether or not image formation by the intermediate formation step is to be executed. The correction step corrects the predetermined adjustment value for the correction color to the determined first adjustment value if it is determined that no image formation by the intermediate formation step is to be executed.

Furthermore, in the present invention, it is determined whether or not formation of intermediate base images and intermediate correction images is to be executed. That is, it is determined whether or not further color adjustments should be performed after the first color adjustment. If it is determined that the formation of the intermediate base images and the intermediate correction images is not to be executed because such a condition is satisfied that a maintenance person, a user or the like enters an instruction not to execute formation of the intermediate base images and the intermediate correction images using an operation unit, or that the number of image formations after delivery reaches a certain number, only the first base images and the first correction images are formed to determine the first adjustment value. Then, correction is performed with the determined first adjustment value set as an adjustment value for the correction color. As such, the color adjustment in the second stage downward may appropriately be omitted, allowing color adjustment to be performed readily in a shorter time at simple maintenance.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanatory view showing a record layout of an adjustment value table;

DESCRIPTION OF THE PREFERRED EMBODIMENTS

First Embodiment

Figure 1:
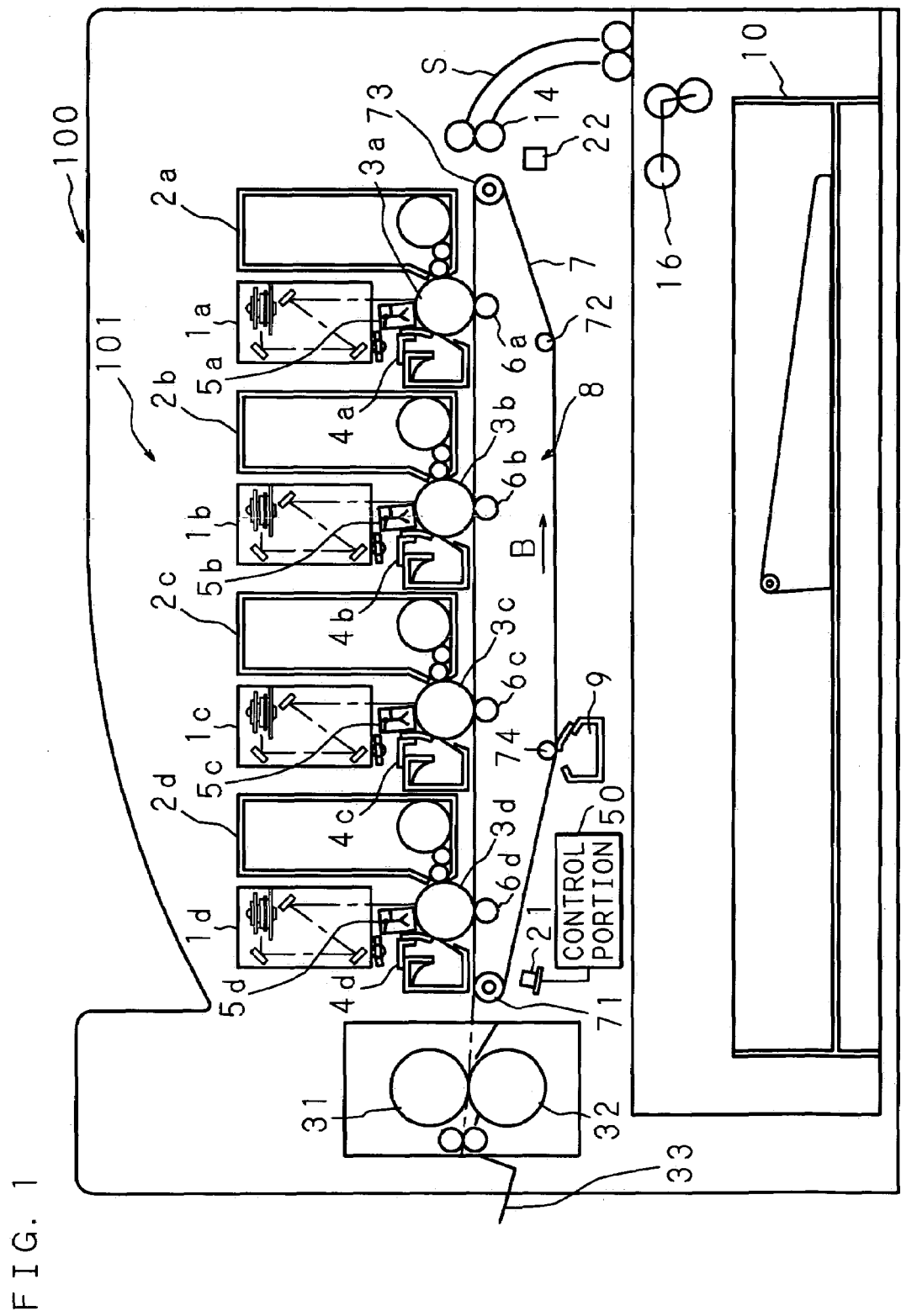
FIG. 1 is a schematic section view showing the outline of the image forming apparatus according to the present invention.

FIG. 1 is a schematic section view showing the outline of the image forming apparatus according to the present invention. The following explanation is given based on the assumption that an image forming apparatus 100 according to the present invention is a copying machine. It is, however, not limited thereto, and may also be a composite machine having the function of a facsimile or a printer in addition to the copying function.

The image forming apparatus 100 includes, as a structure related to correction for color misregistration, an image forming station 101, a transfer conveyer belt unit 8, a registration detection sensor 21, and a temperature and moisture sensor 22, as shown in FIG. 1. The image forming station 101 in the image forming apparatus 100 includes four exposure units 1a, 1b, 1c and 1d, four development devices 2a, 2b, 2c and 2d, four photosensitive drums 3a, 3b, 3c and 3d, four cleaner units 4a, 4b, 4c and 4d, and four charging devices 5a, 5b, 5c and 5d, in order to form four kinds of latent images corresponding to four colors of black (K), cyan (C), magenta (M) and yellow (Y) that are used to form a multi-color image. It is noted that the reference characters a, b, c and d above are described corresponding to black (K), cyan (C), magenta (M) and yellow (Y), respectively. In the following description, the members provided for each color may representatively be indicated as an exposure unit 1, a development device 2, a photosensitive drum 3, a cleaner unit 4 and a charging device 5, except for the case where a member corresponding to a specific color is designated.

The exposure unit 1 is a laser scanning unit (LSU) provided with a laser directing portion and a reflection mirror, or is a write head of e.g. an EL (ElectroLuminescence) or an LED (Light Emitting Diode) in which light emitting devices are arranged in an array. Note that the description in the present embodiment will be made for the example where the LSU is applied. The exposure unit 1 performs light exposure in response to input image data at the timing in accordance with an adjustment value, to form an electrostatic latent image corresponding to the image data on the photosensitive drum 3. The adjustment value is stored in an adjustment value table, which will be described later, for each color. Color-separated image data is irradiated by each of the exposure units 1a, 1b, 1c and 1d at the timing in accordance with the adjustment value. The electrostatic latent images of the colors are layered and exposed to light.

The development device 2 develops the electrostatic latent images formed on the photosensitive drum 3 by using toner for each color. The photosensitive drum 3 is disposed at around the central part of the image forming apparatus 100 and forms an electrostatic latent image or a toner image on its surface in accordance with input image data. The cleaner unit 4 removes and collects the toner remaining on the photosensitive drum 3 after developing and transferring of the electrostatic latent image formed on the surface of the photosensitive drum 3. The charging device 5 uniformly charges the surface of the photosensitive drum 3 to a predetermined electric potential. For the charging device 5, besides a roller type or a blush type abutting the photosensitive drum 3, a charger type not abutting the photosensitive drum 3 may also be used. It is noted that, in the present embodiment, the description will be made for the example where the charging device of the charger type is applied.

The transfer conveyer belt unit 8 is disposed below the photosensitive drum 3, including transfer rollers 6a, 6b, 6c and 6d, a transfer belt 7, a transfer belt cleaning unit 9, a transfer belt driving roller 71, a transfer belt tension roller 73, and transfer belt driven rollers 72 and 74. It is noted that the four transfer rollers 6a, 6b, 6c and 6d corresponding to the four colors respectively, are collectively indicated as a transfer roller 6 in the following description. The transfer roller 6 is rotatably supported by an inside frame and holds the transfer belt 7 with tension in cooperation with the transfer belt driving roller 71, the transfer belt tension roller 73, and the transfer belt driven rollers 72 and 74. The transfer roller 6 has its base made of a metal shaft having the diameter of 8 to 10 mm and its surface covered by a conductive elastic material such as EPDM (Ethylene Propylene Diene Monomer) or foam urethane.

Papers are stacked in a paper-feeding cassette 10. The rotation of a paper-feeding roller 16 preceding the rotation of the photosensitive drum 3 feeds the papers in the paper-feeding cassette 10 one by one into a paper conveying path S. The fed papers are conveyed by the paper-feeding roller 16 to a register roller 14. The papers are at a halt with their front ends abutting the register roller 14 which rotates at a predetermined timing to direct the papers toward the photosensitive drum 3. The papers are conveyed to the image forming station 101 where the toner image carried on the photosensitive drum 3 is transferred onto the papers by the transfer roller 6 to which a predetermined transfer bias is applied. The transfer roller 6 can uniformly apply to the papers or the transfer belt 7 a high voltage of a polarity opposite to the charge polarity of the toner, and transfers the toner image formed on the photosensitive drum 3 onto the transfer belt 7 or the paper attached and conveyed on the transfer belt 7.

The transfer belt 7 is formed of polycarbonate, polyimide, polyamide, polyvinylidene fluoride, polytetrafluoroethylene polymer, ethylene-tetrafluoroethylene polymer or the like with the thickness of approximately 100 μm, and is arranged in contact with the photosensitive drum 3. The toner image of each color formed at the photosensitive drum 3 is successively transferred onto the transfer belt 7 or the paper attached and conveyed on the transfer belt 7, to form a multi-color toner image. Heat and pressure is applied to the paper having the transferred image while the paper passes through fixation rollers 31 and 32. This allows the toner image to melt and to be fixed on the paper. Finally, the paper with the formed image is discharged into a paper discharge tray 33.

The transfer belt 7 has the thickness of approximately 100 μm and is formed endlessly with a film. The transfer belt driving roller 71, the transfer belt tension roller 73, and the transfer belt driven rollers 72 and 74 together hold the transfer belt 7 with tension to drive and rotate the transfer belt 7. The transfer belt cleaning unit 9 removes and collects the toner for color adjustment and the toner for process control that are directly transferred onto the transfer belt 7 as well as the toner adhered due to the contact with the photosensitive drum 3. The registration detection sensor 21 is provided at a position after the transfer belt 7 has passed through the image forming station 101 and before it reaches the transfer belt cleaning unit 9, since it detects patch images formed on the transfer belt 7. The registration detection sensor 21 detects the density of the patch images formed on the transfer belt 7 at the image forming station 101, and outputs a signal corresponding to the density to a control portion 50.

The temperature and moisture sensor 22 detecting the temperature and moisture within the image forming apparatus 100 is provided near a process portion where no rapid change in temperature or moisture occurs. At the image forming station 101 in the image forming apparatus with the above structure, the exposure unit 1 successively exposes each color to light at the timing in accordance with the adjustment value from the control portion 50 based on the input image data, so that an electrostatic latent image is formed on the photosensitive drum 3. Subsequently, the toner image developed from the electrostatic latent image by the development portion 2 is formed, which is then transferred onto the transfer belt 7 or the paper attached and conveyed on the transfer belt 7. The transfer belt 7 is driven to rotate while being held with tension by the transfer belt driving roller 71, the transfer belt tension roller 73, and the transfer belt driven rollers 72 and 74. Thus, the toner image of each color component is successively transferred and layered onto the transfer belt 7 or the paper attached and conveyed on the transfer belt 7, to form a multi-color toner image. Note that the multi-color toner image is further transferred onto a paper if the multi-color toner image is formed on the transfer belt 7.

At color adjustment performed in the image forming apparatus 100 of the present embodiment, the toner image of each color component formed at the above-described image forming station 101 is transferred onto the transfer belt 7. Here, a toner image to be a base (hereinafter referred to as a "base patch image") of all the toner images of different color components is first transferred onto the transfer belt 7, and then a toner image of another color component that is to be a subject for correction for color misregistration (hereinafter referred to as a "correction patch image") is transferred on the base patch image. Although the base patch image and the correction patch image are formed on the transfer belt 7 in the present embodiment, it is not limited thereto, and color adjustment may also be performed by detecting the density of an image formed on a paper by the registration detection sensor 21 provided between the image forming station 101 and the paper discharge tray 33.

Figure 2:
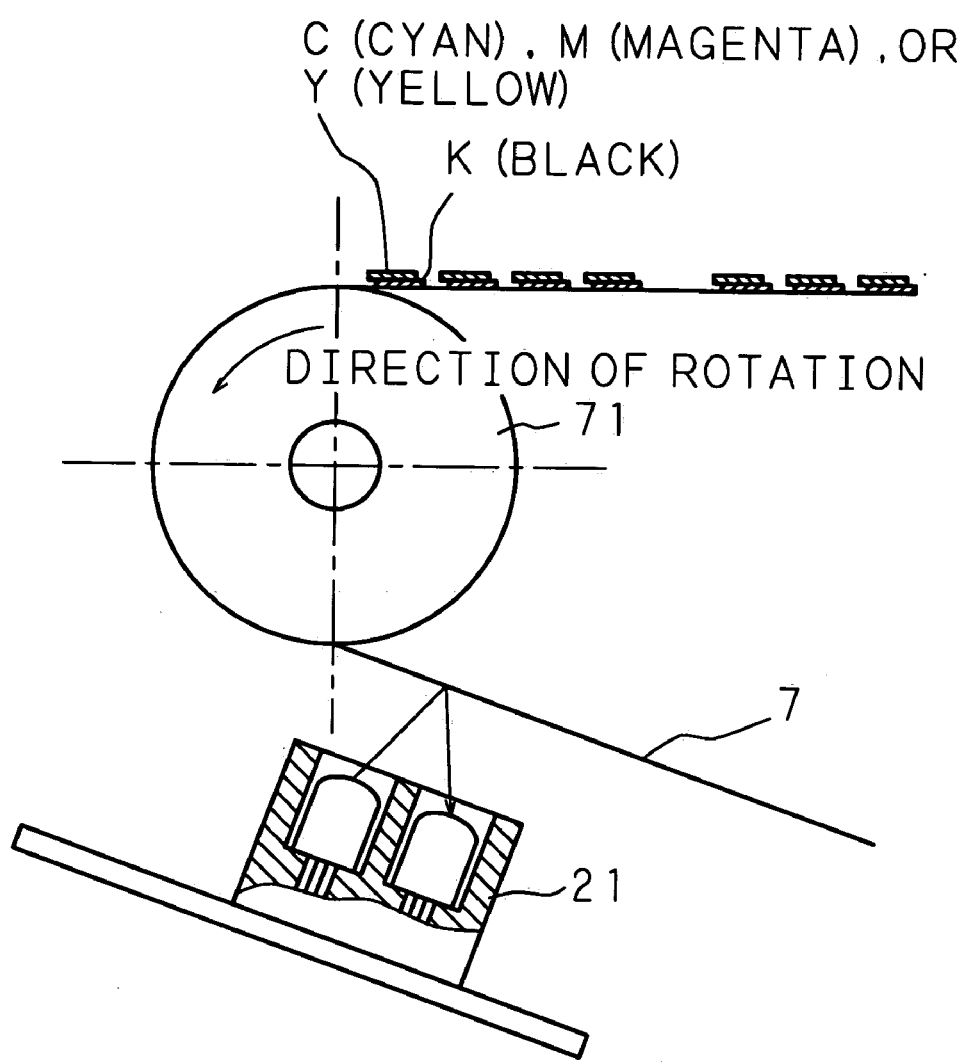
FIG. 2 is a schematic section view showing the substantial parts of a registration detection sensor and a transfer belt driving roller.

FIG. 2 is a schematic section view showing the substantial part of the registration detection sensor 21 and the transfer belt driving roller 71. The transfer belt 7 is driven to rotate by the transfer belt driving roller 71 arranged at the transfer conveyer belt unit 8. Thus, as shown in FIG. 2, when base patch images K (black) and correction patch images C (cyan) (or M (magenta) or Y (yellow)) that are formed on the transfer belt 7 reaches the position of the registration detection sensor 21, the registration detection sensor 21 detects the density of the base patch images and the correction patch images onto the transfer belt 7. The registration detection sensor 21 emits light to the transfer belt 7 and detects the light reflected on the transfer belt 7, to detect the density of the base patch images and the correction patch images.

The detected density is output to the control portion 50, which corrects the timing of exposure by the exposure unit 1 and the timing of writing onto the photosensitive drum 3 based on the detected result. It is noted that, though the registration detection sensor 21 is arranged such that the light emitting position of the emitting light and the detection position of the reflected light are parallel to the conveying direction of the transfer belt 7 as shown in FIG. 2, it is not limited thereto. The sensor 21 may also be arranged such that the light emitting position of the emitting light and the detection position of the reflected light are perpendicular to the conveying direction of the transfer belt 7, or such that the transfer belt 7 is made of a light permeable material while the light emitting portion and the light receiving portion are arranged opposite to each other with the transfer belt 7 interposed.

Although the registration detection sensor 21 in the present embodiment has the structure as described above, it is not limited thereto, and may also employ a CCD (Charge Coupled Device) producing a brightness or luminance signal, as long as the patch images can be used to examine the state of the formed images. It is noted that the process speed of image formation is 100 mm/sec, and thus the detection by the registration detection sensor 21 is performed at sampling periods of 2 m/sec.

Figure 3:
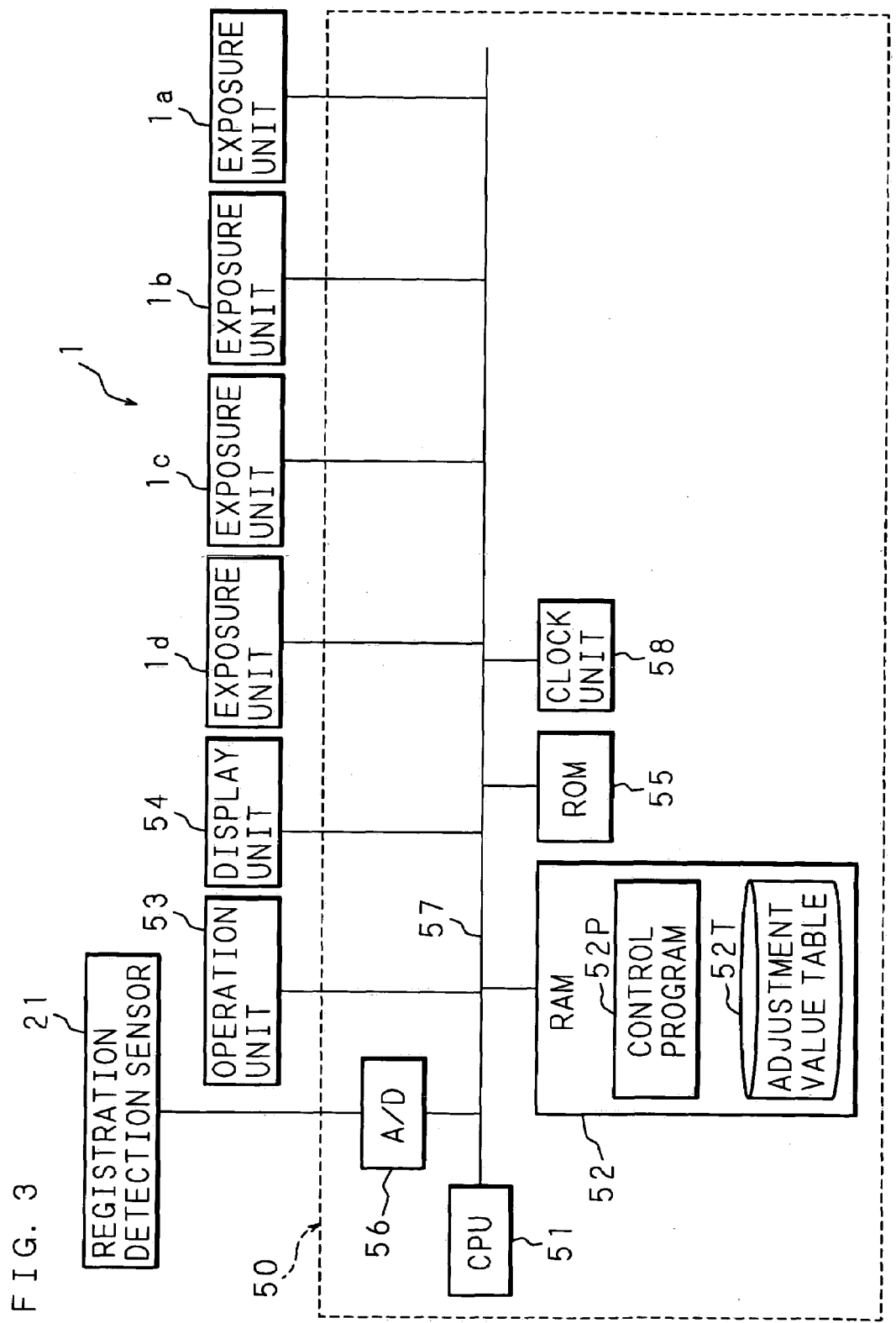
FIG. 3 is a block diagram showing the hardware configuration of a control portion.

FIG. 3 is a block diagram showing the hardware configuration of the control portion 50. As shown in FIG. 3, a RAM (Random Access Memory) 52, a ROM (Read Only Memory) 55, a display unit 54 such as a liquid crystal display, an operation unit 53 provided with various input keys such as numeric keys and a start key, a clock unit 58 producing date and time information, an A/D converter 56, and an exposure unit 1 are connected to a CPU (Central Processing Unit) 51 via a bus 57.

The CPU 51 is connected to each of the above-described hardware parts of the control portion 50, to control them while executing various kinds of software functions in accordance with a control program 52P stored in the RAM 52. The display unit 54 is a display device such as a liquid crystal display device, for displaying the operation state of the image forming apparatus 100 according to the present invention. The operation unit 53 is provided with letter keys, numeric keys, short dial keys, one-touch dial keys, various types of functions keys and the like that are required for operation of the image forming apparatus 51 of the present invention. Note that a touch panel system may also be employed for the display unit 54 to substitute for a part or all of the various keys of the operation unit 53.

The electric signal indicating the density output from the registration detection sensor 21 is converted at the A/D converter 56 into, for example, an 8-bit 256-gradation digital signal, which is output to the CPU 51. The RAM 52, which is formed of an SRAM (Static Random Access Memory), a flash memory or the like, stores temporary data generated at the execution of software. Moreover, an adjustment value table 52T is installed in the RAM 52.

FIG. 4 is an explanatory view showing a record layout of the adjustment value table 52T. An adjustment value is stored for each of the exposure units 1a to 1d for each color. The adjustment value is represented by dots, corresponding to the timing of exposure (msec). The values of 0 to 99 dots are used to indicate the timing of exposure. In the illustrated example, the adjustment value of 0 is stored for the exposure unit 1a of black, whereas the adjustment value of 11 is stored for the exposure unit 1b of cyan. Likewise, the adjustment value for the exposure unit 1c of magenta and the exposure unit 1d of yellow are also stored in advance. If it is assumed that the exposure timing corresponding to the adjustment value 0 is time $T_0$, the exposure timing corresponding to the adjustment value 11 is $T_0+\Delta T_{11}$ (msec), which is $\Delta T_{11}$ (msec) later. Thus, the CPU 51 controls the exposure units 1a to 1d with reference to the adjustment value table 52T, to drive the exposure unit 1b $\Delta T_{11}$ (msec) after driving of the exposure unit 1a of black. The adjustment value is stored color by color and is corrected to an optimal value by color correction of the present invention. If the adjustment value is, for example, shifted by one by the correction and assumes 10, the CPU 51 drives the exposure unit 1a at $T_0$ (msec), and thereafter drives the exposure unit 1b at $T_0+\Delta T_{10}$ (msec), resulting that the image of cyan is formed at a position displaced by 1 dot compared to the example above. It is noted that the adjustment value table 52T stores not only the adjustment values in the sub scanning direction as shown in FIG. 4, but also the adjustment values in the main scanning direction that are not shown. The actual exposure timing, however, is determined also in consideration of the time corresponding to the distance between the base exposure unit and the exposure unit to be a subject for correction. (Since the time is fixed at a predetermined value for each exposure unit to be the subject for correction, the time corresponding to such a value is not described here).

The color adjustment method by the image forming apparatus 100 with the structure above is now described in detail. The color adjustment method of the present embodiment includes the first color adjustment and the second color adjustment. In the present embodiment, an example is described where the toner image of K (black) is used as a base patch image while the toner image of C (cyan) is used as a correction patch image, and where the range of color adjustment extends over 99 dots (lines) (the start position is set as 0 dot and the end position is set as 99 dot) in the conveying direction of the transfer belt 7. Note that any color may be used for the toner image of the base patch image or the correction patch image, not particularly limited to the colors described here. In addition, the range of color adjustment is not particularly limited if it falls within the range detectable by the registration detection sensor 21.

Figure 5:
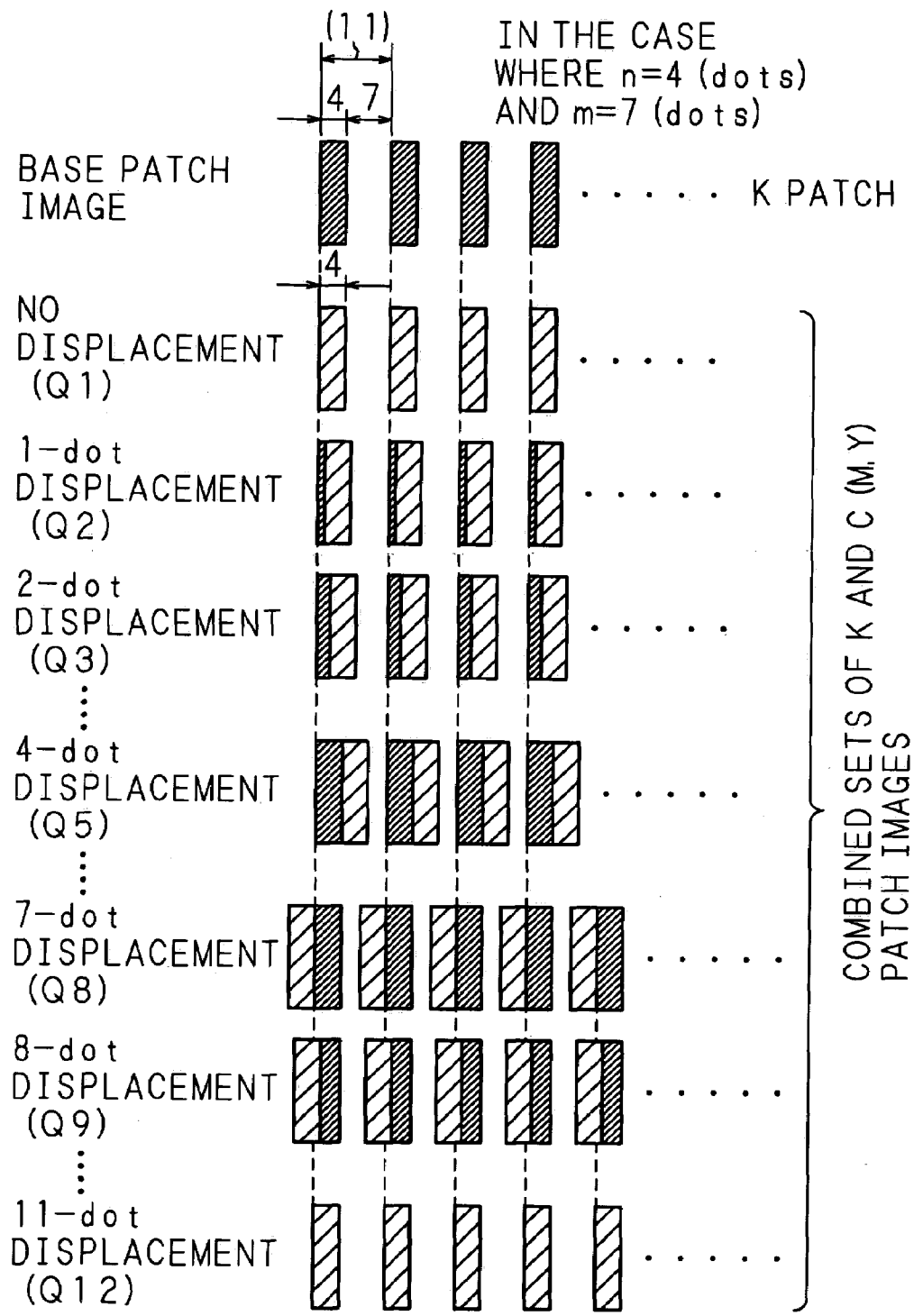
FIG. 5 is an explanatory view showing patch images formed in a sub scanning direction.

The color adjustment by the image forming apparatus 100 of the present embodiment is performed by forming the base patch images and correction patch images including a plurality of lines in the direction perpendicular (hereinafter referred to as "main scanning direction") to the conveying direction (hereinafter referred to as "sub scanning direction") of the transfer belt 7. FIG. 5 is an explanatory view showing the patch images formed in the sub scanning direction. In the first color adjustment, as shown in FIG. 5, for example, the pitch for image forming patterns (the first interval (m+n)) is set as 11 dots consisting of 4 dots of the line width n and 7 dots of the line gap m, to form the base patch images (hereinafter referred to as "base lines") on the transfer belt 7 (K patch in FIG. 5). After the base lines are formed, correction patch images (hereinafter referred to as "correction lines"), each having the same line width n and line gap m as those of the base line, is further formed. It is noted that images are formed with 600 dpi in the present embodiment.

Figure 6:
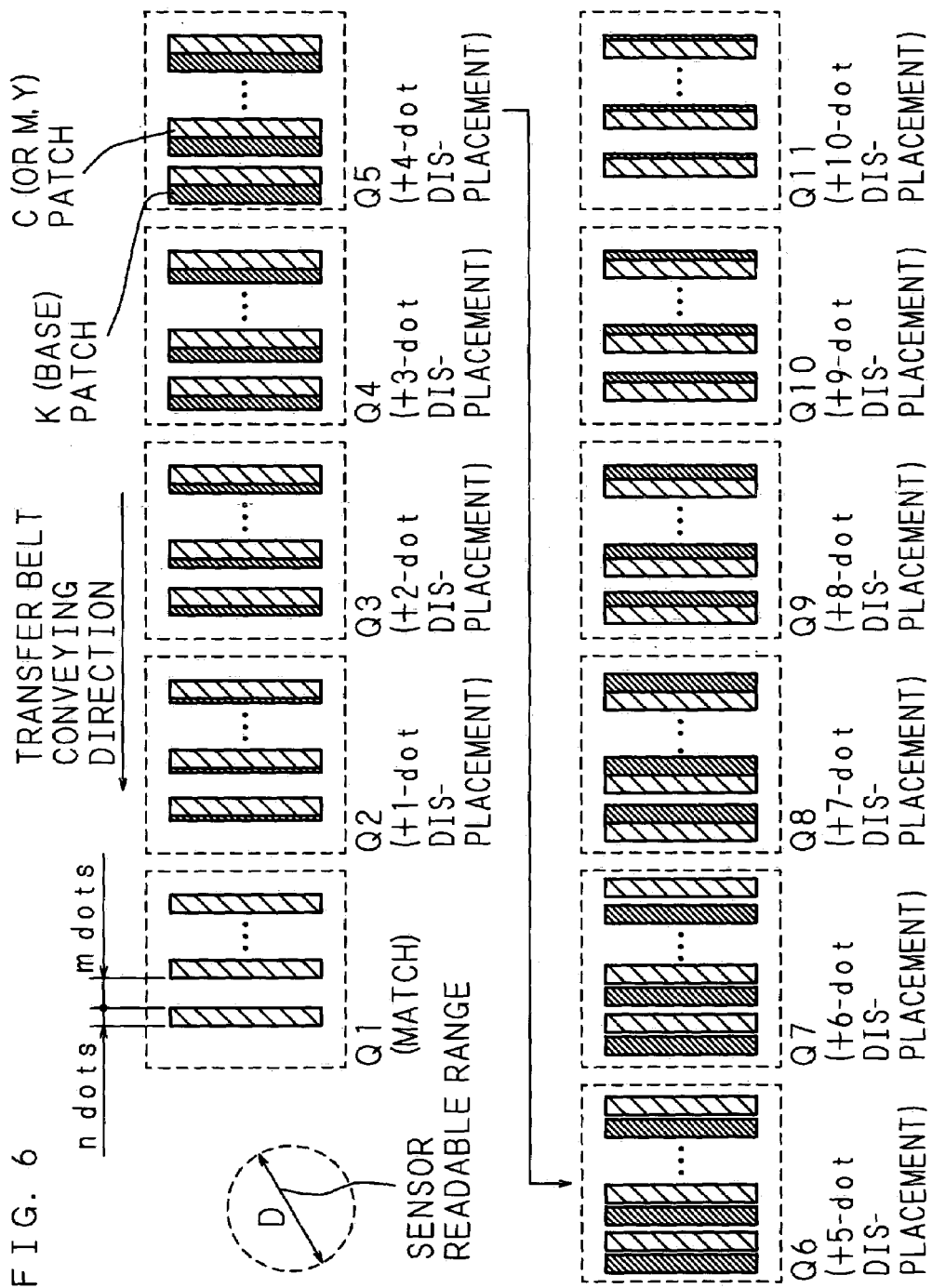
FIG. 6 is an explanatory view showing a plurality of patch images formed in the sub scanning direction.

Subsequently, the density of the base lines and the correction lines formed on the transfer belt 7 are detected by the registration detection sensor 21. FIG. 6 is an explanatory view showing a plurality of patch images formed in the sub scanning direction. The registration detection sensor 21 detects the density of the base lines and the correction lines in a sensor readable range D, as shown in FIG. 6 (indicating the images formed on the transfer belt 7). The sensor readable range D in the present embodiment has the diameter of approximately 10 mm, allowing averaging of detection errors due to color misregistration caused by fine (small) vibration or the like. The base patch images and correction patch images form a set of images including several tens of images under one condition. A plurality of sets of images are formed under a variety of other conditions.

The density of a base line and a correction line on the transfer belt 7 changes depending on the state of alignment of the base line and the correction line on the transfer belt 7. This means that the detection value of reflected light detected by the registration detection sensor 21 changes depending on the alignment state of the base line and the correction line. The result of the density detected by the registration detection sensor 21 changes depending on the area of the base line and the correction line formed on the surface of the transfer belt 7. It the area is minimum, i.e., if the base line is perfectly aligned with the correction line, the amount of absorption of the light emitted from the registration detection sensor 21 by the base line and the correction line decreases while the reflected light from the transfer belt 7 is increased to the maximum, resulting in an increased density value to be output. This excludes the case where the transfer belt 7 is transparent.

If such a color correction program is executed, the CPU 51 refers to the adjustment value table 52T, and forms the image of a base line based on the predetermined adjustment value (e.g. 0) while forming the image of a correction line based on the predetermined adjustment value (e.g. 11). A plurality of (e.g. 100) base lines and correction lines are formed as shown in FIG. 6. Subsequently, the CPU 51 measures the density at sampling periods of 2 msec and stores the result into the RAM 52. When a predetermined time period has elapsed, an average of the stored density is obtained and stored into the RAM 52. Although, in the present embodiment, sampling is performed many times for a plurality of density data output from registration detection sensor 21 and the average thereof is obtained in order to improve the measurement accuracy, the sampling may also be performed only once for comparing the output thereof at each of the adjustment values.

Thereafter, the process of changing the adjustment value is performed as will be described below. The CPU 51 forms the correction lines by incrementing the adjustment value for the correction color in the adjustment value table 52T (Q2 in FIG. 5). Even if a change is made, the density data are similarly measured and the average density is stored into the RAM 52 by associating it with the information of the adjustment value. Such a process is performed for the number of dots (m+n dots: 11 dots) corresponding to a predetermined number of pitches.

The above-described process is further described in detail with reference to FIG. 6. If the base line and the correction line are perfectly aligned with each other, the average of density stored in the RAM 52 takes an extreme value. This indicates that image formation under the condition of the average taking an extreme value of maximum (or minimum if, for example, a transparent transfer belt is used) can obtain the perfect alignment of the base line with the correction line. The first color adjustment in the present embodiment performs color adjustment by obtaining an extreme of the average of density, noting that an extreme can be obtained when the base line is perfectly aligned with the correction line.

Since a non-transparent black transfer belt 7 is used in the present embodiment, the average of density output from the registration detection sensor 21 takes the maximum value when the base line is perfectly aligned with the correction line. Accordingly, the correction line to be formed on the base line image is shifted at an arbitrary timing so as to change the alignment state of the base line and the correction line. The average of density output from the registration detection sensor 21 is obtained for each state and the maximum thereof is obtained.

Specifically, as described earlier, if the base line and the correction line are perfectly aligned with each other when there are a plurality of lines each having the line width n of 4 dots and the line gap m of 7 dots, the base line is completely covered by the correction line as indicated by Q1 shown in FIG. 6. Thus, the registration detection sensor 21 detects the density of repeated images, each having the line width of 4 dots, i.e. 4 dots for the base line and 4 dots for the correction line that are aligned with each other, and the line gap of 7 dots.

It is now assumed that the correction line is shifted by 1 dot from the position where the base line is formed, in the direction perpendicular to the main scanning direction (in the sub scanning direction) (displacement of +1 dot). The base line is then not completely covered by the correction line, resulting in misalignment, as indicated by Q2 shown in FIG. 6. Thus, the registration detection sensor 21 detects the line width of 5 dots, i.e. the line width of 4 dots for the base line plus 1 dot for the displaced portion of the correction line of 4 dots, and the line gap of 6 dots. In other words, the registration detection sensor 21 detects the density of the repeated images having the line width of 5 dots formed by the base line and the correction line and the line gap of 6 dots.

As such, if the correction line is shifted dot by dot in a direction perpendicular to the main scanning direction from the state indicated by Q1, the alignment state of the base line and the correction line changes as shown in Q1 to Q12 in FIGS. 5 and 6. If there is a displacement of +11 from the Q1 state, the line width of 4 dots and the line gap of 7 dots for the correction line recur, again showing the perfect alignment of the base line with the correction line. That is, the state where the correction line is displaced by 11 dots is the same as the state of the correction line before shifting, which is repeated every time the correction line is displaced by 11 dots. Accordingly, creation and detection of the base lines and correction lines are terminated when the displacement reaches 10 dots after shifting dot by dot from a predetermined state (e.g., the median in the color adjustable range; the median of "50" if the adjustable range is between "0" and "99"). That is, eleven types of correction lines are formed on the base lines (adjustment values: 50-60) and the density is detected for each of the layered lines. Even if the detection of the density is performed at 12 dots (adjustment value "61"), 13 dots (adjustment value "62") . . . , the same average density is periodically output. The process is therefore terminated after the measurement for one period.

Thus, the first color adjustment is performed under eleven conditions (within the range of adjustment for 11 dots in the color adjustable range), to estimate candidates for an adjustment value for the exposure timing at which a color component image to be a base and another color component image to be a subject for adjustment (correction) are perfectly aligned with each other.

Figure 7:
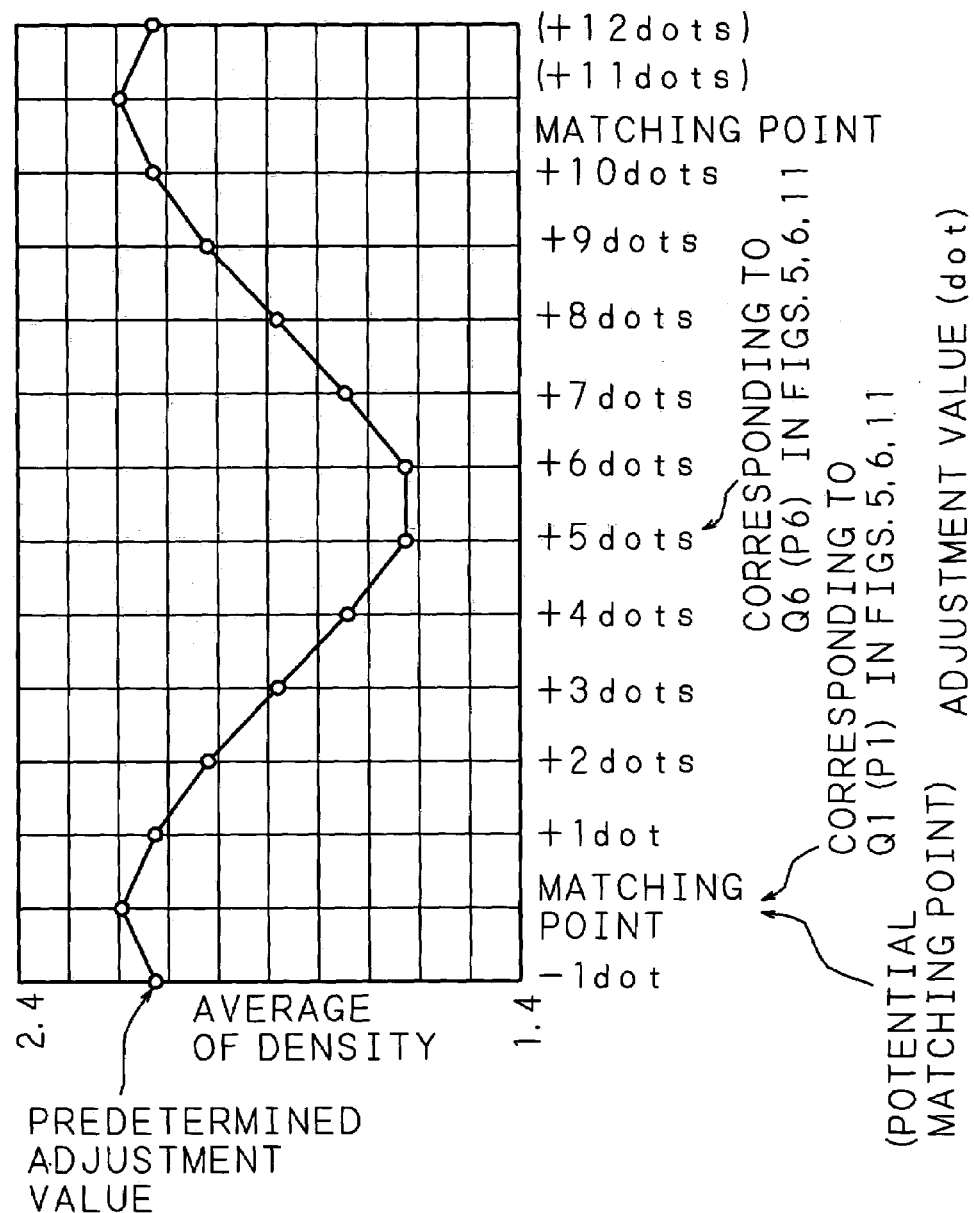
FIG. 7 is a characteristic view showing transition of the average value of density.

FIG. 7 is a characteristic view showing the transition of the average of density, illustrating an example plot of the average values of actually-detected output values. In FIG. 7, the vertical axis indicates the average of the values (voltage V) output from the registration detection sensor 21. The horizontal axis indicates the adjustment value by the unit of dot. FIG. 7 is a plot of the characteristic change in the average of density obtained when the adjustment value for a correction color is changed by a predetermined pitch (the first interval of 11 dots), with a predetermined adjustment value of the correction color set as a base point. When the base line and the correction line are perfectly aligned with each other ("potential matching point" in FIG. 7), the average of density reaches the maximum. (Since the initial state is −1 dot displaced in this example, the base line and the correction line are potentially aligned with each other when displaced by 1 dot. If the initial value is assumed to be "50," this is the state displaced by −1 dot, and "51" is the adjustment value that can obtain the potential alignment.)

The characteristic changes periodically as the adjustment value is further changed, additionally presenting extreme values at positions displaced by +11 dots (adjustment value "62"), +22 dots (adjustment value "73"), +33 dots (adjustment value "84"), +44 dots (adjustment value "95"), −11 dots (adjustment value "40"), −22 dots (adjustment value "29"), −33 dots (adjustment value "18"), and −44 dots (adjustment value "7"). One of these nine points is the condition of true matching. At this stage, candidates for the true matching point can be predicted. Since color misregistration is significant especially at factory shipment, there is a low possibility that the adjustment value first taking the extreme (50 in the example above) is the true adjustment value.

According to the present invention, color adjustment is performed several times, i.e., the second color adjustment, the third color adjustment . . . the nth color adjustment are performed after the first color adjustment. For comparison, the example where only the second color adjustment is performed after the first color adjustment will be described below.

The second color adjustment is performed so as to determine one adjustment value (the second adjustment value) from the candidates for the adjustment value (the first adjustment value) determined by the first color adjustment. The second color adjustment is to obtain an adjustment value for a true matching point at which a color component image to be the base and another color component image to be the subject for adjustment (correction) are perfectly aligned with each other, i.e., a point selected from the adjustment value ("51") obtained by the first color adjustment and the adjustment value candidates that can be obtained from the adjustment value. In the second color adjustment, the exposure unit 1 is exposed to light for writing onto the photosensitive drum 3 based on the timing at the maximum adjustment value obtained by the first color adjustment, to form base patch images and correction patch images on the transfer belt 7.

The base patch images and the correction patch images here are formed based on the pitch (the first interval) used at the first color adjustment. Specifically, the number of dots d (d=m+n) for one pitch of the base line and the correction line in the first color adjustment is used as a base. That is, the line width of the base patch image is set as eight times the number of dots d and the line gap of the base patch images is set as d, whereas the line width of the correction patch image is set as d and the line gap of the correction patch image is set as eight times the number of d.

The example above is further described in detail. If n is 4 dots and m is 7 dots in the first color adjustment, the base patch image has the line width 8d of 88 dots and the line gap d of 11 dots, whereas the correction patch image has the line width of 11 dots and the line gap 8d of 88 dots. As such, the line width of the base patch image is 88 dots if it is set as eight times the number of dots d, resulting in the color adjustment range of d+8d, i.e. 0-99 dots. The range of color adjustment may be narrower or wider by increasing or reducing this 8-fold. Although the adjustment value equivalent to the timing of exposure $(T_0+\Delta T_i)$ is described as having the range of 0-99 in the present embodiment, it is not limited thereto, and the adjustment value may be made adjustable in the range, for example, between 0 and 110 dots.

As such, the line width (8d) of each of the base patch images and the line gap (8d) for the correction patch images in the second color adjustment may be set in accordance with the range of color adjustment. That is, they may be set such that the pitch for the image forming pattern of the base patch images or the correction patch images corresponds to the number of dots for the range of required color adjustment.

When the second color adjustment is performed, the CPU 51 determines the line width and the line gap for both the base patch images and the correction patch images based on the pitch (the first interval: 11) used in the first color adjustment. Then, for the base patch images, image formation is commenced by setting the adjustment value (0) stored in the exposure unit 1a field in the adjustment value table 52T as the timing of exposure. As for the correction patch images, a plurality of adjustment value candidates (7, 18, 29, 40, 51, 62, 73, 84, and 95) that are determined based on the first adjustment value (51) and the first interval (11) are first determined and stored in the RAM 52. The correction patch images are then formed with the timing of exposure in accordance with the plurality of adjustment values. The correction patch images are formed, shifted d dots by d dots, and the density thereof output from the registration detection sensor 21 are measured.

Figure 8:
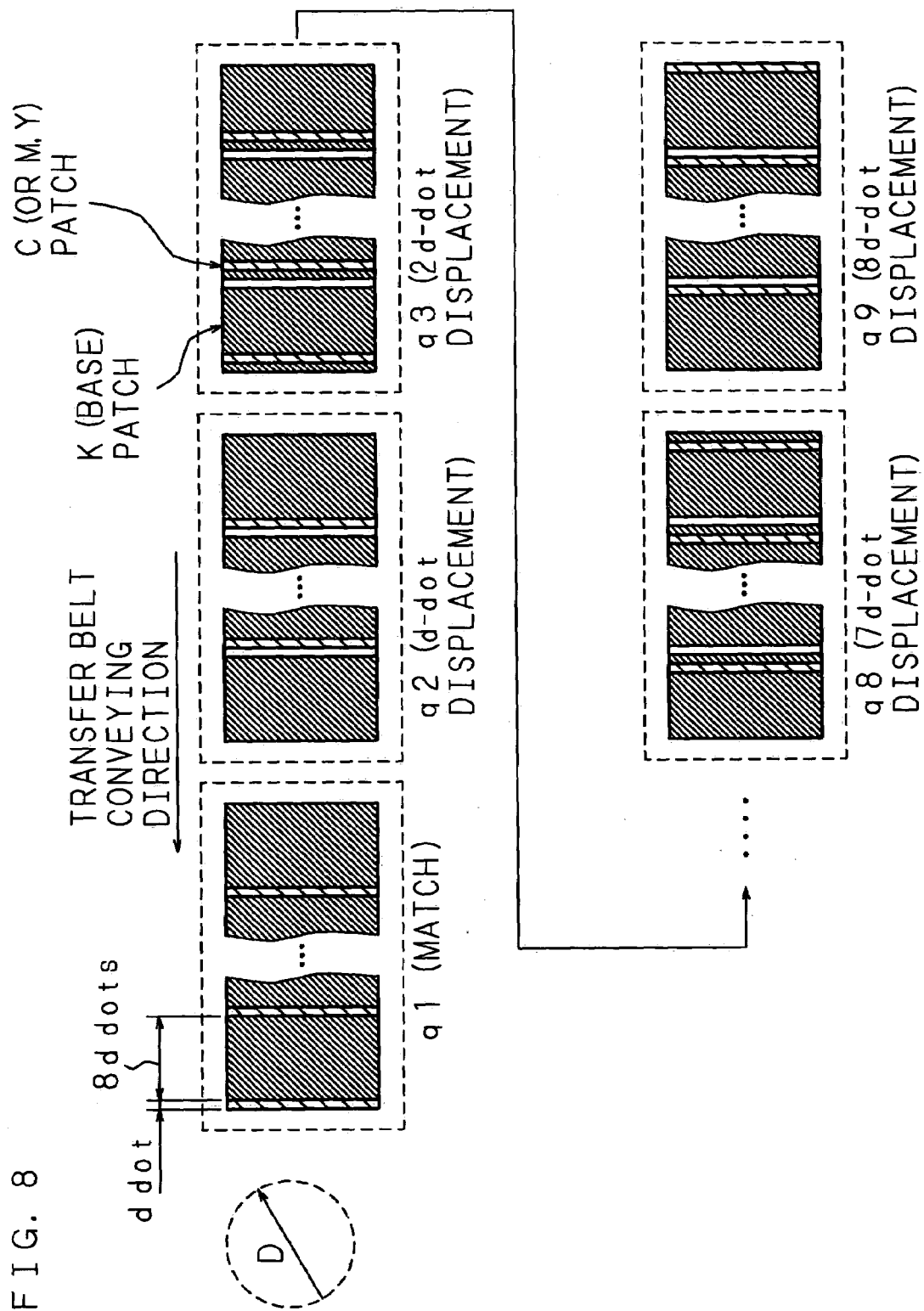
FIG. 8 is an explanatory view showing the image of base patch images and correction patch images formed in the sub scanning direction.

FIG. 8 is an explanatory view showing the image of base patch images and correction patch images formed in the sub scanning direction. In the second color adjustment, the forming positions of the base patch images and the correction patch images are set such that they are completely displaced from each other when the position of a base color component image completely matches with the position of another color component image that is to be a subject for adjustment (correction). Accordingly, as indicated by q1 in FIG. 8, the adjustment value obtained when the registration detection sensor 21 detects the state where a correction patch image is formed in the gap between base patch images, i.e., the state where the base patch images and correction patch images are continuously connected with each other (the state where no gap is formed in the sub scanning direction on the transfer belt 7) is the adjustment value for the true matching point.

When, on the other hand, the forming positions of the base patch images and the correction patch images are not perfectly aligned but displaced from the q1 state, correction patch images are formed on the base patch images as indicated by q2-q9 in FIG. 8. This means that the adjustment value obtained here is for the state where a base color component image and another color component image that is to be a subject for adjustment (correction) are misaligned, and is not corresponding to the true matching point.

Figure 9:
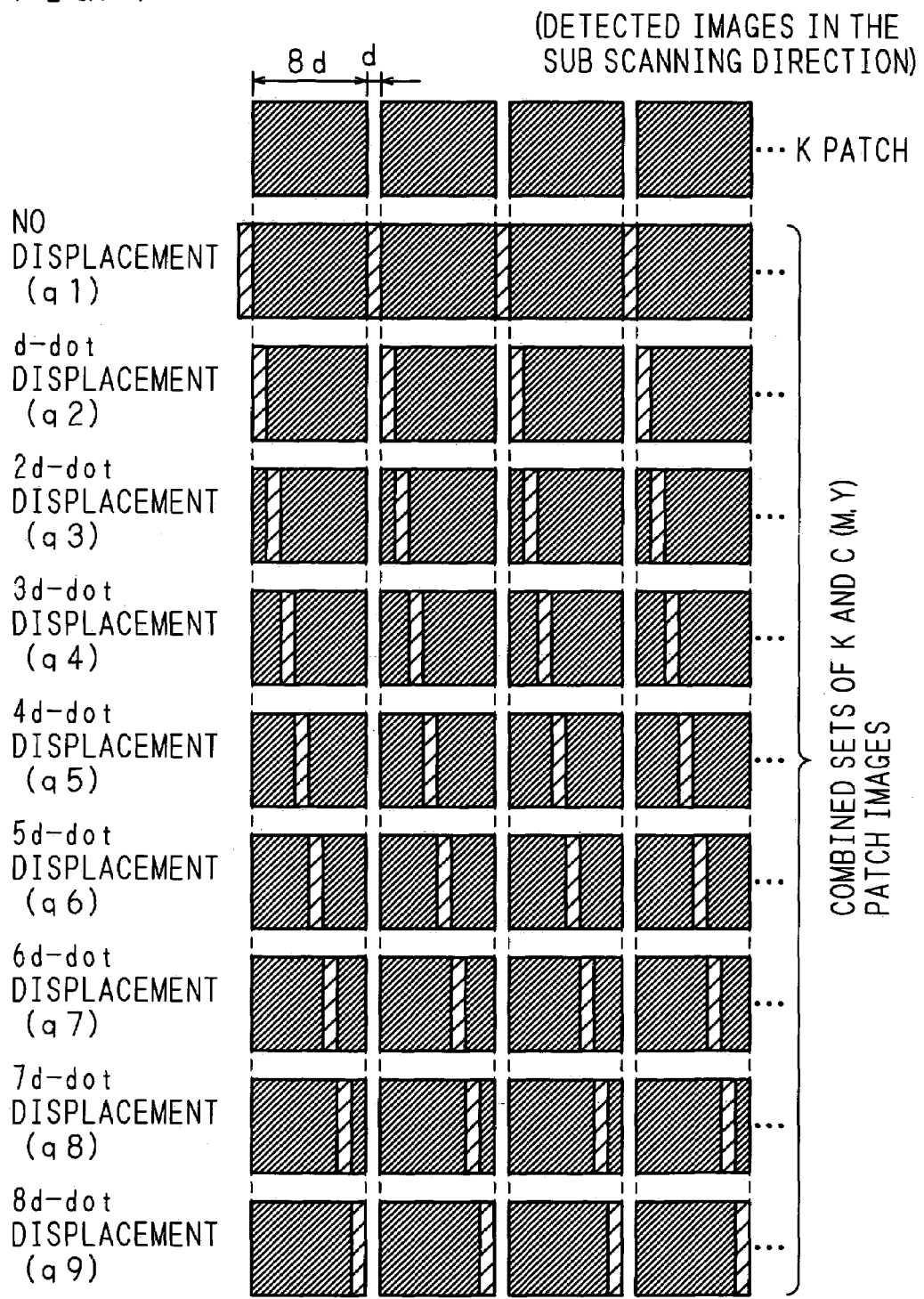
FIG. 9 is an explanatory view showing the base patch images, and the image obtained when the base patch images and the correction patch images are formed.

FIG. 9 is an explanatory view showing the base patch images and the image obtained when the base patch images and the correction patch images are formed. The K patch shows the image of the case where only the base patch images are formed, whereas the rest show the correction patch images superimposing onto the base patch images with the adjustment value changed respectively. Each of correction lines is shifted d dots by d dots from the q1 state to successively move the correction patch images on the base patch images to the q9 state. Shifting of further dots would periodically form the same images as q1-q9 again (not shown). This would exceed the range of color adjustment, and hence the density of image is detected for the nine types of displacement image patterns from q1 to q9.

Since the transfer belt 7 used in the present embodiment is black (not transparent), the value detected by the registration detection sensor 21 becomes smaller as the area covered by the base patch images or the correction patch images is increased. Thus, the detection value in the state where the correction patch images are formed in the spaces between the base patch images as indicated by q1 in FIGS. 8 and 9 is lower than the detection value in the state where the correction patch images are formed on the base patch images as indicated by q2-q9 in FIGS. 8 and 9. In other words, when the forming positions of the base patch images and the correction patch images match with each other, the density output from the registration detection sensor 21 takes the minimum value.

In the second color adjustment, the density is detected by the registration detection sensor 21 for the base patch images and the correction patch images formed on the transfer belt 7. As shown in FIG. 8, the registration detection sensor 21 detects the density of the base patch images and the correction patch images within the sensor readable range D. The sensor readable range D in the present embodiment has the diameter of approximately 10 mm, and is formed to be capable of averaging detection errors caused by color misregistration due to fine (small) vibration or the like. Each of several tens of base patch images and each of several tens of correction patch images form a set of images under one condition, and a plurality of sets of images are formed under various other conditions.

In response to an instruction issued by the CPU 51, the base patch images and correction patch images as shown in FIG. 8 are formed for a certain period of time. The CPU 51 measures the density at the sampling periods of 2 msec and stores the results into the RAM 52. When a predetermined period of time has elapsed, the average value of the stored density is obtained and stored into the RAM 52. Note that, in the present embodiment, sampling of the density data output from the registration detection sensor 21 is performed for a number of times (approximately 130 times) and an average thereof is obtained in order to improve the measurement accuracy. The sampling, however, may be performed only once and the output value thereof may be compared for each adjustment value. As in the process described above, sampling is performed with the adjustment value changed, and the average of density is stored into the RAM 52 by associating it with each adjustment value.

Figure 10:
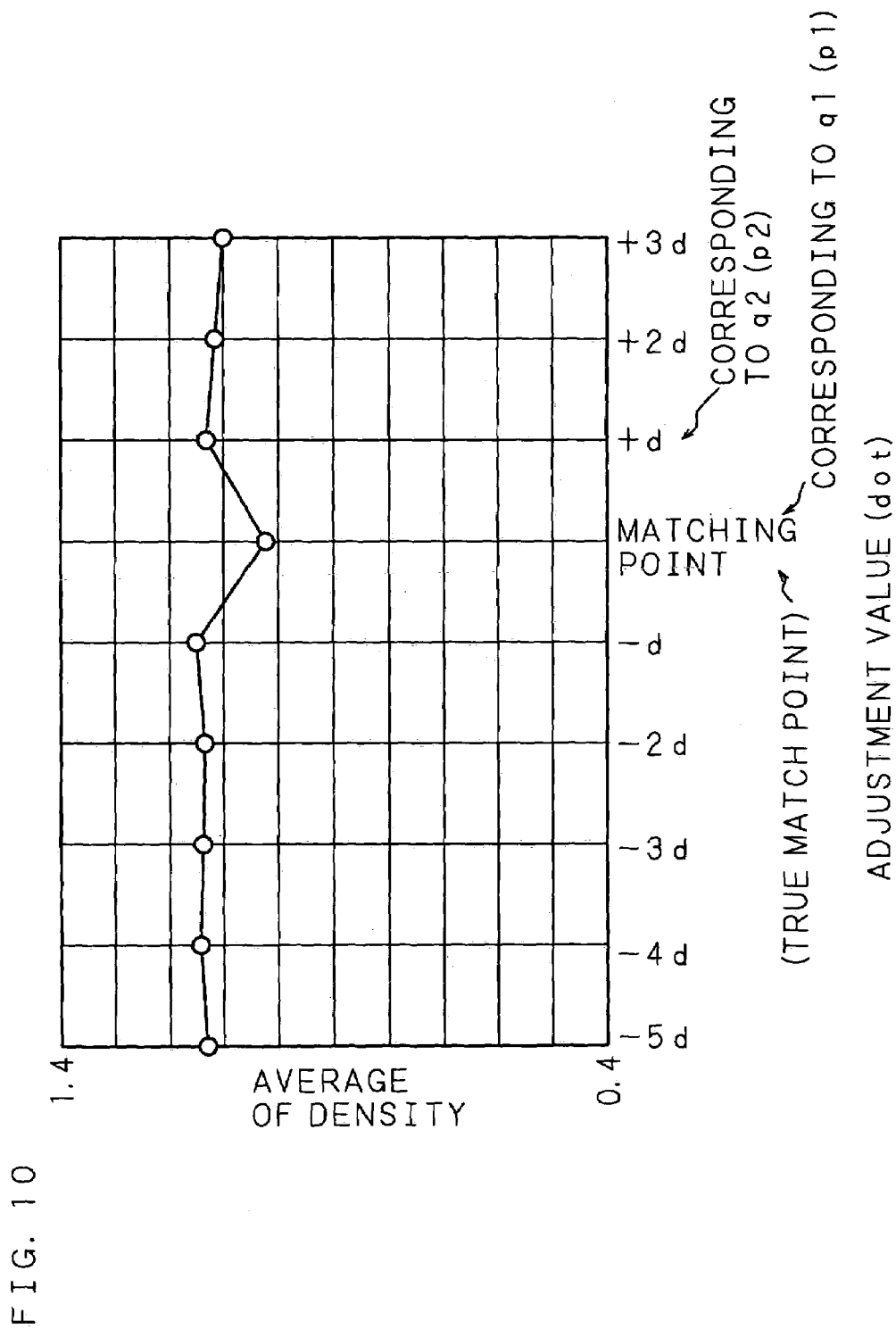
FIG. 10 is a characteristic view showing the transition of the average value of density.

FIG. 10 is a characteristic view showing the transition of the average value of density, illustrating an example plot of the averages of actually-detected output values. In FIG. 10, the vertical axis indicates the average of output values (voltage V) output from the registration detection sensor 21. The horizontal axis indicates adjustment values by the unit of dot. FIG. 10 is a plot of the characteristic change in the average of density obtained by changing the adjustment value for a correction color d dots by d dots. As shown in FIG. 10, the density average takes the minimum value when the position at which a base patch image is formed and the position at which a correction patch image is formed match with each other ("true matching point" in the figure). In FIG. 10, the adjustment value for −5d is "7," the adjustment value for −4d is "18," the adjustment value for −3d is "29," the adjustment value for −2d is "40," the adjustment value for −d is "51," the adjustment value for the matching point is "62," the adjustment value for +d is "73," the adjustment value for +2d is "84," the adjustment value for +3d is "95," and the minimum average can be obtained when the adjustment value is "51." This adjustment value of "51" is the one that can achieve true matching of a base color component image and a color component image to be a subject for adjustment (correction) (the adjustment value corresponding to q1). Accordingly, if the timing of light exposure by the exposure unit 1 performing adjustment (correction) is adjusted such that the average of density output from the registration detection sensor 21 is minimum, the base color component image and the color component image to be a subject for adjustment (correction) are perfectly aligned with each other, allowing formation of a multi-color image without color misregistration.

Thus, in the second color adjustment also, the average of density detected by the registration detection sensor 21 is obtained for every state of alignment of the base patch image and the correction patch image. Then, taking advantage of the fact that the average of density is minimum when no overlapping is seen at the forming positions of the correction patch image and the base patch image, color adjustment is performed by setting the adjustment value for the timing of light exposure by the exposure unit 1 such that the average of density output from the registration detection sensor 21 takes the minimum value.

By performing color adjustment twice as described above, the timing for exposure by the exposure unit 1, i.e. the timing at which a color component image to be a subject for adjustment (correction) is formed such that the base color component image is perfectly aligned with the color component image to be a subject, can be found for adjustment (correction), from the wide range of color adjustment. Moreover, the second color adjustment detects no overlapping state from various other alignment states of the base patch images and the correction patch images having rectangular image forming patterns set based on the first interval obtained as a result of the first color adjustment. Thus, in the first color adjustment, correction values to be obtained are predicted from a narrow range of color adjustment (the range of 11 dots under 11 conditions), whereas, in the second color adjustment, a correction value to be obtained is predicted from the values predicted in the first adjustment, the range of color adjustment here being wide (the range of 99 dots under 9 conditions).

As such, only by forming displaced images of correction patches under 20 conditions, i.e. 20 times (20 types), for comparison with the base patch images and by measuring the density of each set of the images, color adjustment in the wide range of 99 dots can be performed. This allows efficient and easy color adjustment in the wide range and also allows highly accurate color adjustment. Although these color adjustment processes are performed for the image station of each color component that is to be a subject for adjustment (correction), the description here is made only for one color. The color adjustment is performed for each of C, M and Y, with K set as a base.

Although, in the description above, the color adjustment is performed with the line direction of the base patch images and the correction patch images set in the sub scanning direction, the color adjustment is also performed for the base patch images and the correction patch images formed in the main scanning direction (the direction perpendicular to the sub scanning direction) as in the case with the sub scanning direction, since color misregistration also occurs in the main scanning direction.

Figure 11:
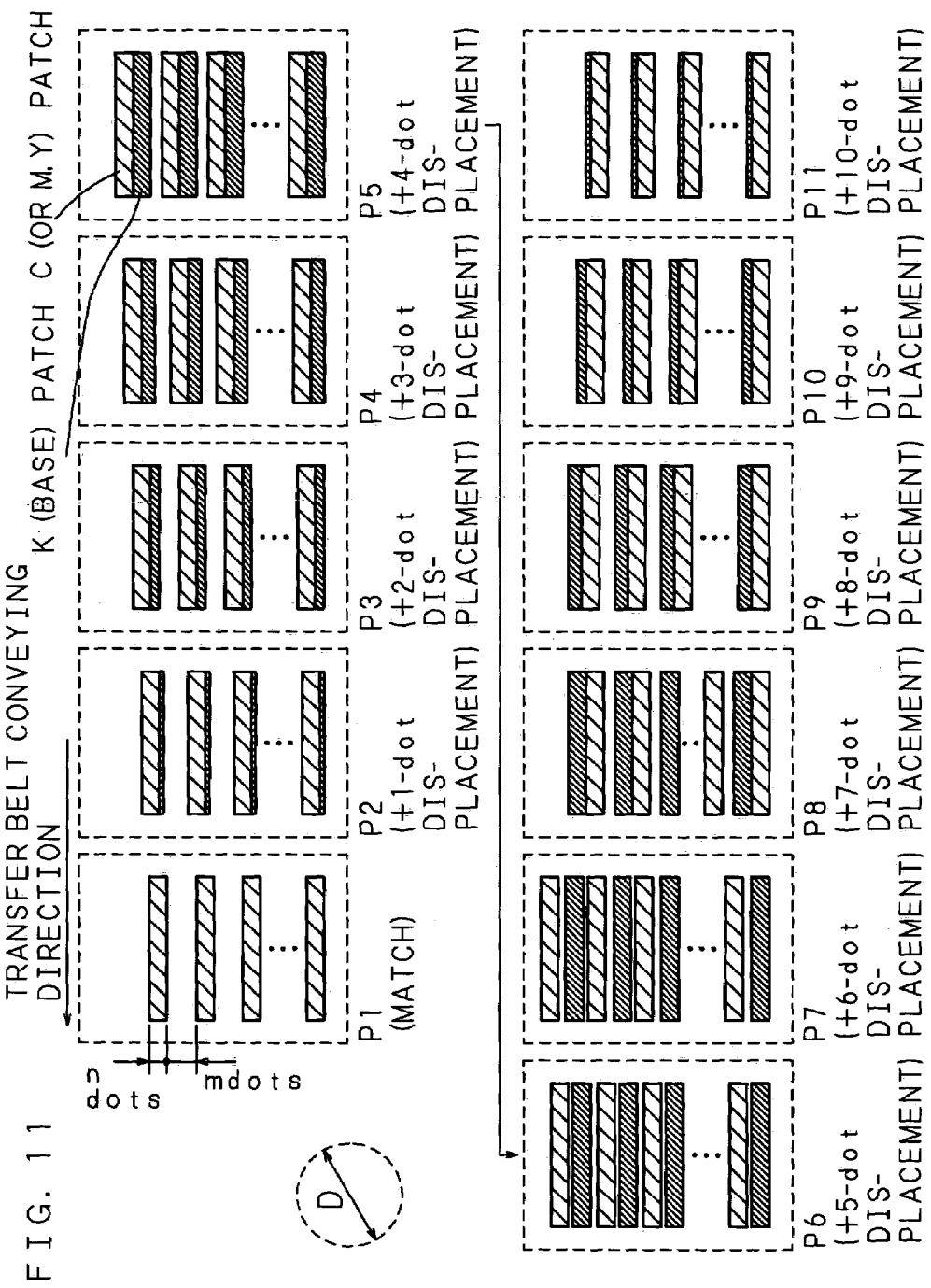
FIG. 11 is an explanatory view showing the images of base lines and correction lines, formed by the first color adjustment, in a main scanning direction.

FIG. 11 is an explanatory view showing the images of base lines and correction lines, formed by the first color adjustment, in the main scanning direction. Here, as shown in FIG. 11, first, as the first color adjustment, correction lines are formed, successively displaced from one another within the range of the pitch for the image forming pattern, and the state where a base patch image is perfectly aligned with a correction patch image is searched for. In this example, P1 of P1 to P11 shows the perfect alignment.

Figure 12:
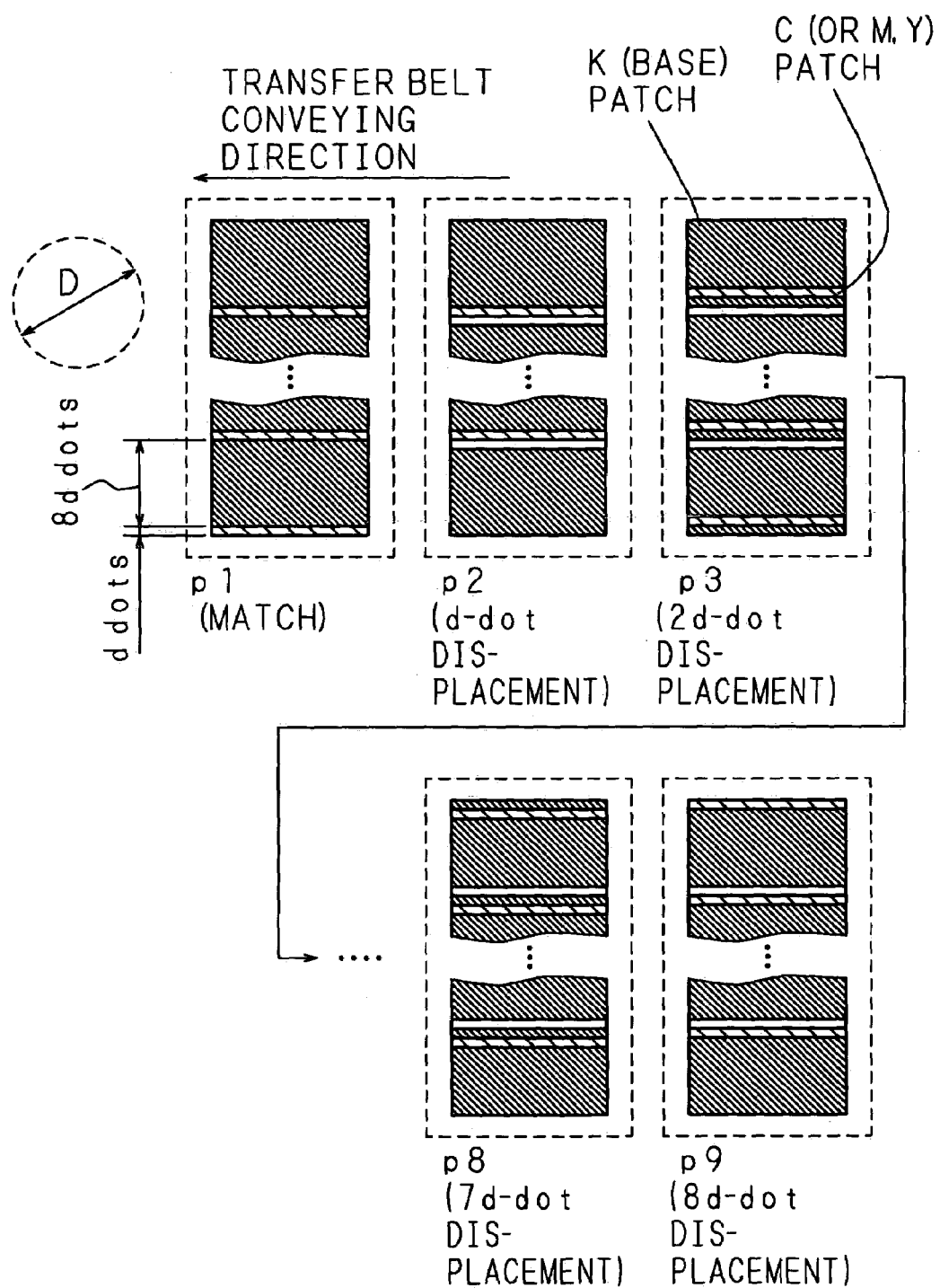
FIG. 12 is an explanatory view showing base patch images and correction patch images, formed by the second color adjustment, in the main scanning direction.

FIG. 12 is an explanatory view showing base patch images and correction patch images, formed by the second color adjustment, in the main scanning direction. As the second color adjustment, each of the correction patch images is displaced by the pitch of the image forming pattern, and the state where no overlapping is seen at the forming positions of a base patch image and a correction patch image is searched for. By such color adjustment, the timing of exposure at which a color component image to be a base and a color component image to be a subject for adjustment (correction) are perfectly aligned with each other in the main scanning direction is obtained and adjustment (correction) is performed.

It is noted that the color adjustment may be performed not necessarily for both the main and sub scanning directions, but for only one of the directions. Accordingly, correction of color misregistration can be performed in one or both of the sub scanning direction and the main scanning direction as required, so that a good image quality can be obtained. Furthermore, the patch image used is not limited to the line pattern as described in the embodiment. A line parallel to the sub scanning direction and a line parallel to the main scanning direction may be formed and the resulting cross-shaped base and correction patch images may be used for color adjustment.

When, however, only two times of color adjustments are performed to complete the adjustment as shown in FIG. 8, eleven times of adjustments are required in the first color adjustment and nine times of adjustments are required in the second color adjustment. In the present embodiment, the adjustable range of color adjustment is narrow, i.e. from 0 to 99 dots. This allows the number of adjustment times to be small, i.e. twenty times. However, if the resolution is increased to have 0-999 dots, eleven times of adjustments in the first color adjustment and ninety times of adjustments in the second color adjustment, i.e. 101 times of adjustments in total, will be required. This would require more time for adjustment and also incur waste of developing agent. Moreover, as shown in FIG. 8, if the ratio of the correction patch image (d dots) and the transfer belt 7 portion (d dots) where no correction images are formed to the base patch images (8d dots) is low in the second color adjustment, no notable extreme value appears, possibly causing a detection error. Thus, a procedure of performing several times (three times or more) of color adjustments in order to shorten the time required for adjustment and to improve detection accuracy will be described below.

Figure 13:
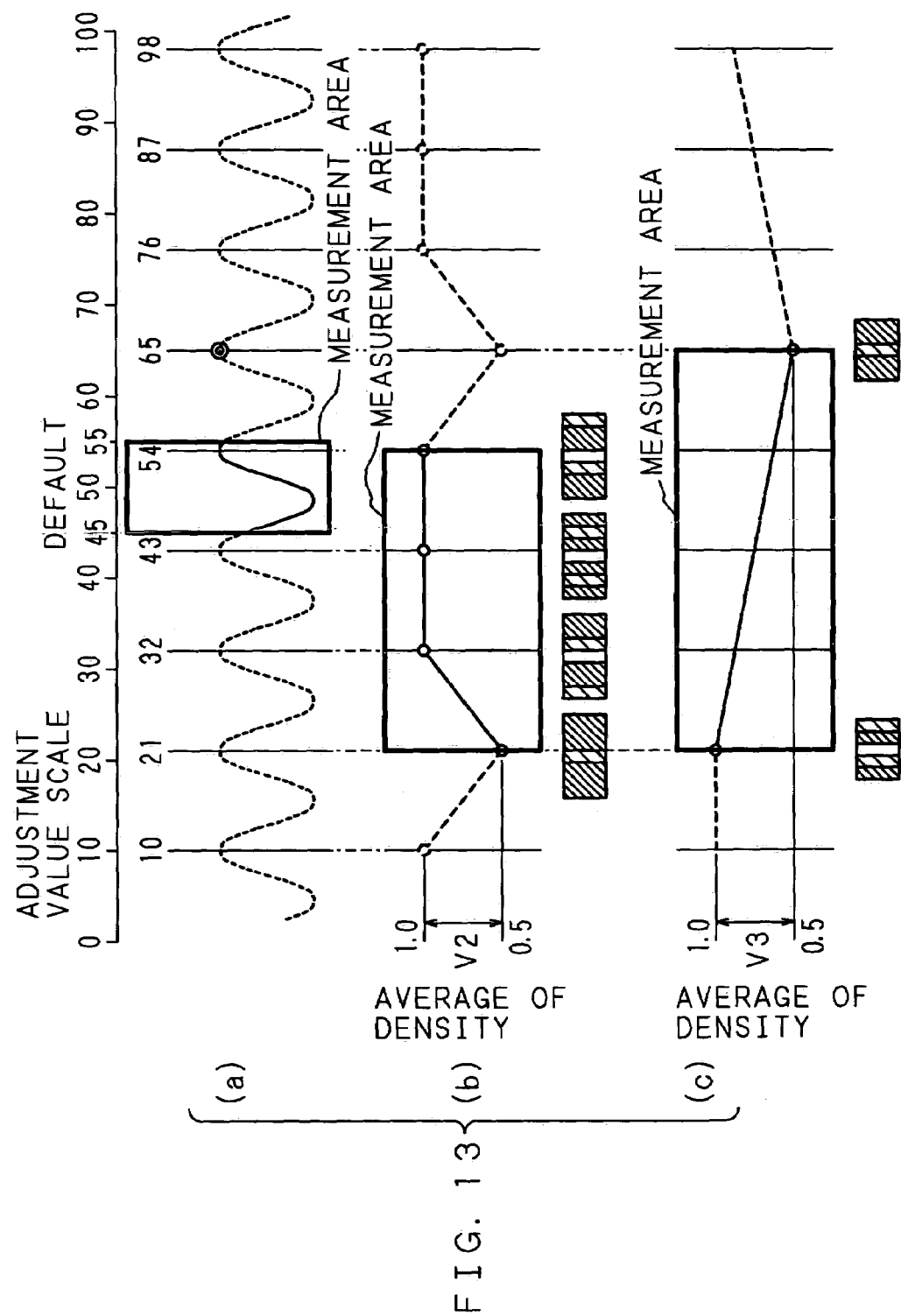
FIG. 13 is an explanatory view showing an adjustment procedure when the third color adjustment is performed.

FIG. 13 is an explanatory view showing an adjustment procedure when the third color adjustment is performed. FIGS. 13(a), 13(b) and 13(c) indicate the images obtained in the first, second and third color adjustments, respectively. In the example where the first, second and third color adjustments are performed, the second color adjustment will be described as a new second color adjustment so as to clearly differentiate this example from the earlier example where only the first and second color adjustments are performed. Moreover, in the present embodiment, description will be made on the assumption that the true adjustment value is "65."

According to the present embodiment, the above-described first color adjustment is performed for the area enclosed by the solid line in FIG. 13(a). This adjustment finds the first adjustment value of "54." Nine adjustment values including this "54," and further including "10," "21," "32," "43," "65," "76," "87," and "98" are the adjustment value candidates. The first color adjustment is performed by the same process as the one described above. In the first color adjustment, the first adjustment value of "54," an extreme value, can be obtained. Then, the adjustment value candidates having periodical relation with the first adjustment value, i.e., adjustment value candidates periodically having extreme values at every first interval ±"11," such as "10," "21," "32," "43," "65," "76," "87," and "98," are determined.

Figure 14:
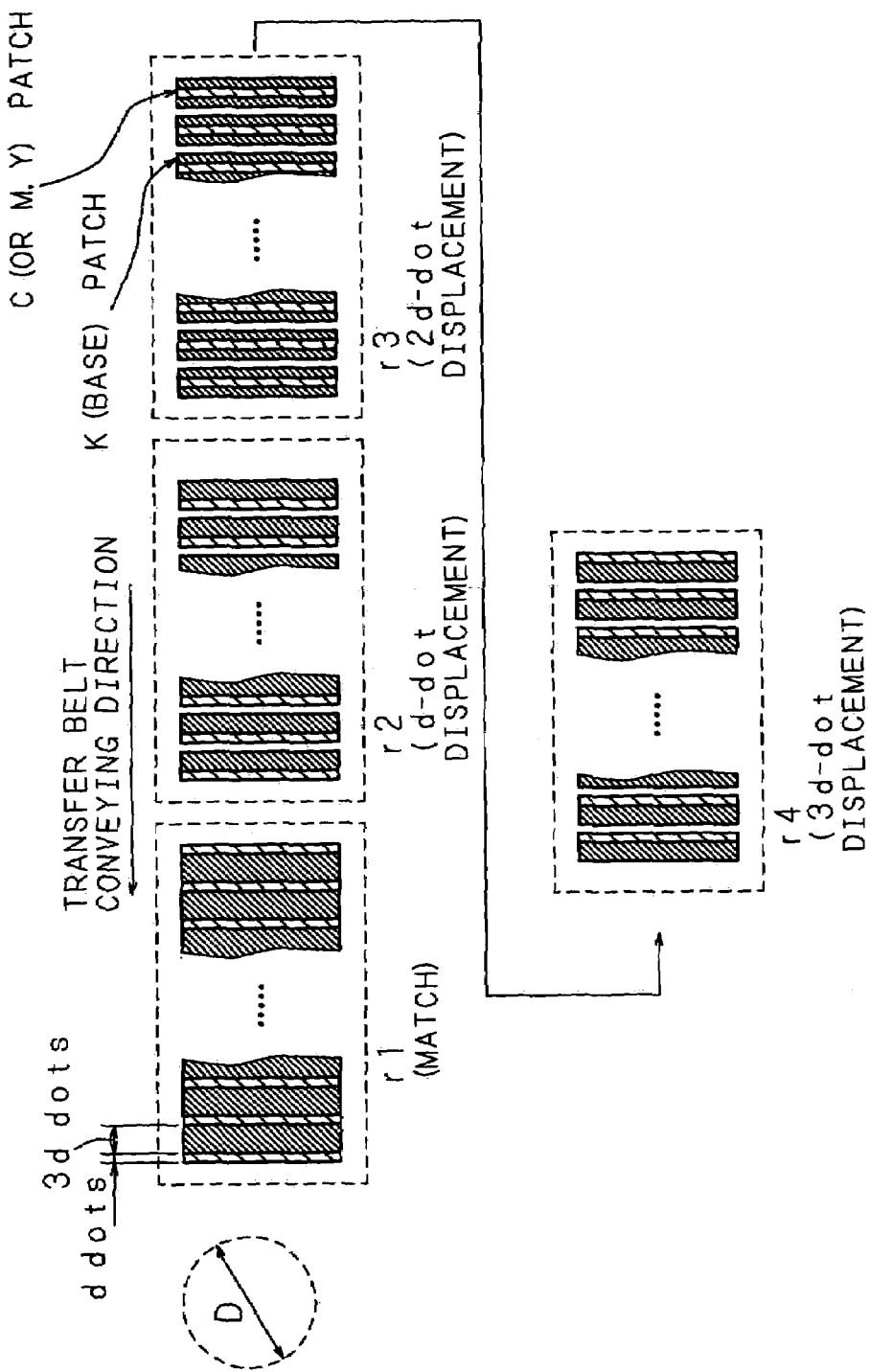
FIG. 14 is an explanatory view showing the image of base patch images and correction patch images formed in the sub scanning direction.
Figure 15:
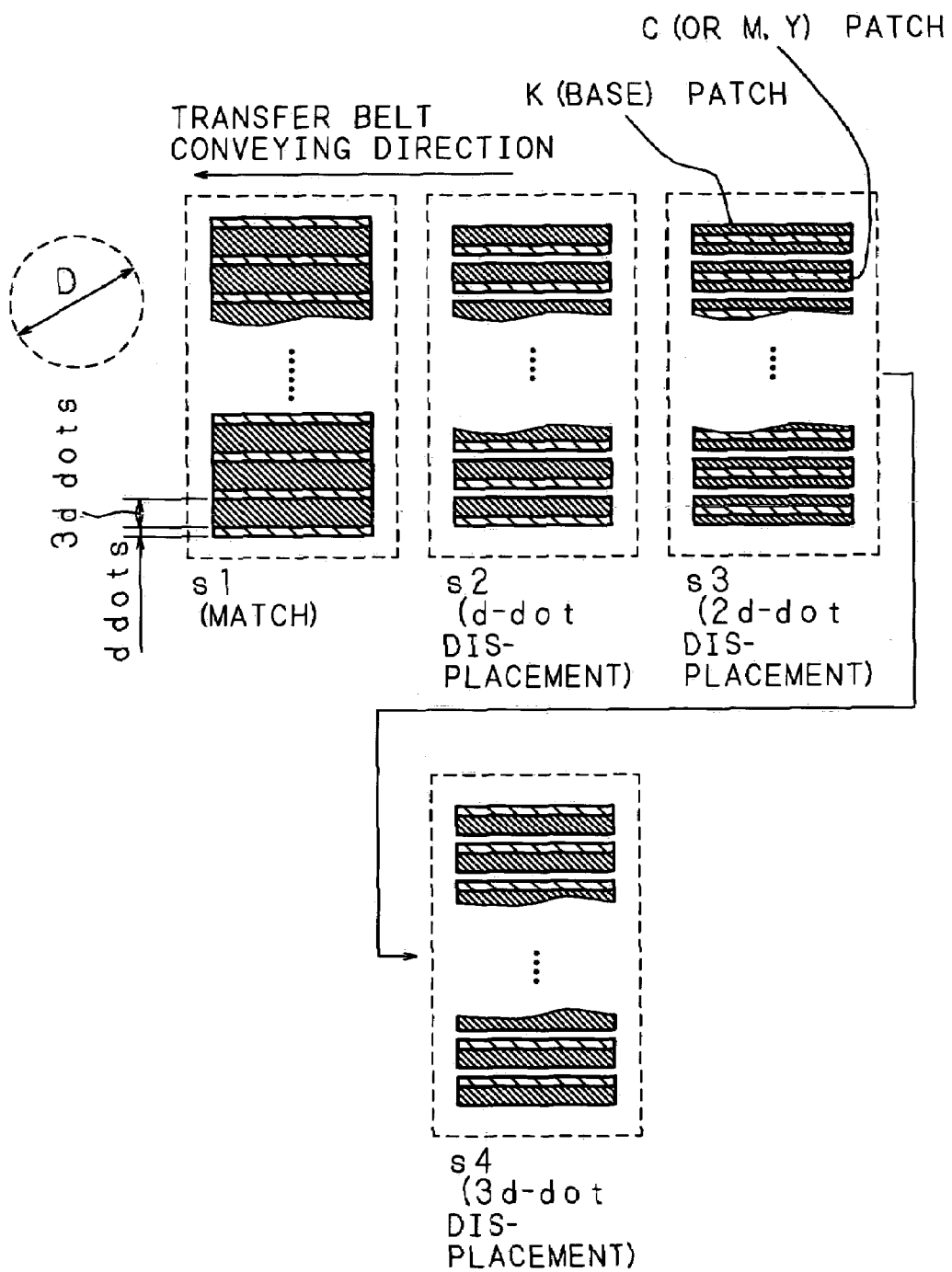
FIG. 15 is an explanatory view showing base patch images and correction patch images formed by the second color adjustment in the main scanning direction.

Then, a new second color adjustment is performed in place of the second color adjustment described above, followed by the third color adjustment. FIG. 14 is an explanatory view showing the image of base patch images and correction patch images formed in the sub scanning direction, and FIG. 15 is an explanatory view showing base patch images and correction patch images formed by the second color adjustment in the main scanning direction. In the new second color adjustment, as shown in FIG. 14 (sub scanning direction) and FIG. 15 (main scanning direction), an amount of displacement for each correction patch image is set as n+m=d, i.e. 11 dots, the first interval. In the new second color adjustment, one pitch (the unit of repetition) is set as 4d dots, which is an integer multiple of the first interval. Then, the new detection pattern is used to narrow the measurement area so as to obtain the next predicted value. In the new detection pattern, a plurality of base lines for 3d (33 dots) are formed with a pitch of 4d (44 dots) (a base line has the width of 3d, while a portion with no line is formed for the width of d). That is, when one unit of repetition is set as the pitch of 4d, each base line is formed with the width of 3d. Then, a plurality of correction lines, each having the width of d (11 dots) are formed with the pitch of 4d (each correction line has the width of d, while a portion with no line is formed for the width of 3d.) That is, when one unit of repetition is set as the pitch of 4d, each correction line is formed with the width of d.

The CPU 51 extracts a plurality of selective adjustment values that are subject to adjustment from the adjustment value candidates of "10," "21," "32," "43," "54," "65," "76," "87," and "98." Thus, adjustment is not performed, for all of the adjustment values (nine adjustment values) but is performed by extracting a predetermined number of, for example, four adjustment values as selective adjustment values. In the present embodiment, the adjustment values of "21," "32," "43" and "54" are extracted. Then, the CPU 51 outputs the base color with the width of 3d dots and the pitch of 4d dots in accordance with the predetermined adjustment value, to form intermediate base images (base lines). The CPU 51 also outputs the correction color with the width of d dots and the pitch of 4d dots in accordance with the selective adjustment values ("21," "32," "43" and "54"), to form intermediate correction images (correction lines).

The new detection patterns for four conditions in total that are made by shifting the timing of formation of correction lines d dots by d dots are measured in density by the registration detection sensor 21. An extreme value obtained as a result of the density measurement for these four conditions (the circuit may be configured such that the extreme value is a maximum, though it is minimum in the description above) is set as an intermediate adjustment value (the second potential matching point) ("21" in FIG. 13).

In the new detection pattern, when the correction lines are aligned with the base lines, i.e., when, in other words, the surface of the transfer belt 7 having no image shows, the ratio of the area for the base patch images and correction patch images formed on the transfer belt 7 to the area for the surface of the transfer belt 7 is 3:1 per pitch. Thus, the ratio of the surface of the transfer belt 7 can be made larger compared to the detection pattern described earlier. Accordingly, the difference in output from the registration detection sensor 21 between the case where the correction patch images are aligned with the base patch images and the case where they are not aligned with each other can be increased. Specifically, the difference V2 between the output by the registration detection sensor 21 obtained at the intermediate adjustment value (the second potential matching point of "21") and that obtained at the other adjustment values is approximately 0.3V. Thus, in the second color adjustment, detection accuracy can be improved by limiting the adjustment range to a predetermined range.

The new second color adjustment can find that candidates for the optimal adjustment value are the intermediate adjustment value "21" and the value "65" which has periodical relation with the intermediate adjustment value. Thus, the adjustment values to be candidates appear at every pitch (±44 dots) that is used in the new second color adjustment, which is corresponding to an integer multiple of the first interval (11 dots). An additional description will be made for the method of deriving the number of cycles (periods) indicated above. First, the pitch $P_{i-1}$ used in the previous color adjustment is read out. In the present example, the pitch $P_1$ in the first color adjustment is 11, whereas the pitch $P_2$ in the second color adjustment is 4d (the width of the intermediate base image of 3d+the width of the intermediate correction image of d in the second color adjustment=4d=44). The number of cycles is calculated by pitch $P_i$÷d×pitch $P_{i-1}$, and is 44 by 4d÷d×11 in the example above. Here, intermediate adjustment value candidates are extracted by adding or subtracting a multiple of "44," i.e. the calculated number of cycles, to/from the intermediate adjustment value "65" within the adjustable range of "0"-"99" (step S215). This extracts two intermediate adjustment value candidates of "21" and "65." This means that, when the intermediate base images with the width of 3d and the pitch of 4d are formed and the intermediate adjustment value of "21" having an extreme value is determined, an extreme value appears periodically (at every 44 dots), allowing the other adjustment values to be extracted. That is, . . . "–67," "–23," "21," "65," "109," . . . are listed as candidates. Among them, "21" and "65" that fall within the adjustable range of "0"-"99" are extracted. These are the final candidates for the intermediate adjustment value. Then, the final adjustment value is determined (the third color adjustment). Note that the final adjustment value is determined if the number of intermediate adjustment value candidates is less than a predetermined number (less than three for example), such as "21" and "65." If, however, the number of candidates is the predetermined number or more, color adjustment is repeated, further selecting adjustment values from the candidates until the number of candidates is lowered to less than the predetermined number.

As shown in FIG. 13(*c*), in the third color adjustment, the CPU 51 outputs the base color with the width of 2d dots and the pitch of 3d dots in accordance with a predetermined adjustment value, to form the final base images (base lines). The CPU 51 also outputs the correction color with the width of d dots and the pitch of 3d dots in accordance with each of the extracted intermediate adjustment value candidates of "21" and "65," to form the final correction images (correction lines). It is noted that, in the processes from the second color adjustment downward, when the intermediate adjustment value candidates are determined, the pitch for each of the intermediate base images, intermediate correction images, final base images and final correction images to be formed may be obtained, in principle, by multiplying the first interval of d with the number of intermediate adjustment value candidates. In this example, the pitch is 4d in the second color adjustment. It is, however, not limited thereto but may also be 5d, 6d or the like. It should be noted that, if the pitch is a common factor of the number of cycles, the positional relationship between the base images and the correction images remains unchanged even if the correction color is output in accordance with the intermediate adjustment value candidates to form correction images. This makes it impossible to extract one adjustment value from the adjustment value candidates. Accordingly, in the second color adjustment downward, when the intermediate adjustment value candidates are determined, the pitch for each of the intermediate base images, intermediate correction images, final base images and final correction images to be formed is obtained by, in principle, multiplying the first interval of d with the number of intermediate adjustment value candidates. This value is 4d in the second color adjustment. It is, however, not limited thereto but may also be 5d, 6d or the like. It should be noted that the pitch is preferably set as a number other than a common factor of the number of cycles. In the example shown in FIG. 13, because the number of cycles is 44 in the third embodiment, the pitch cannot be 2d (22) which is a common factor, and it should be 3d instead.

Figure 16:
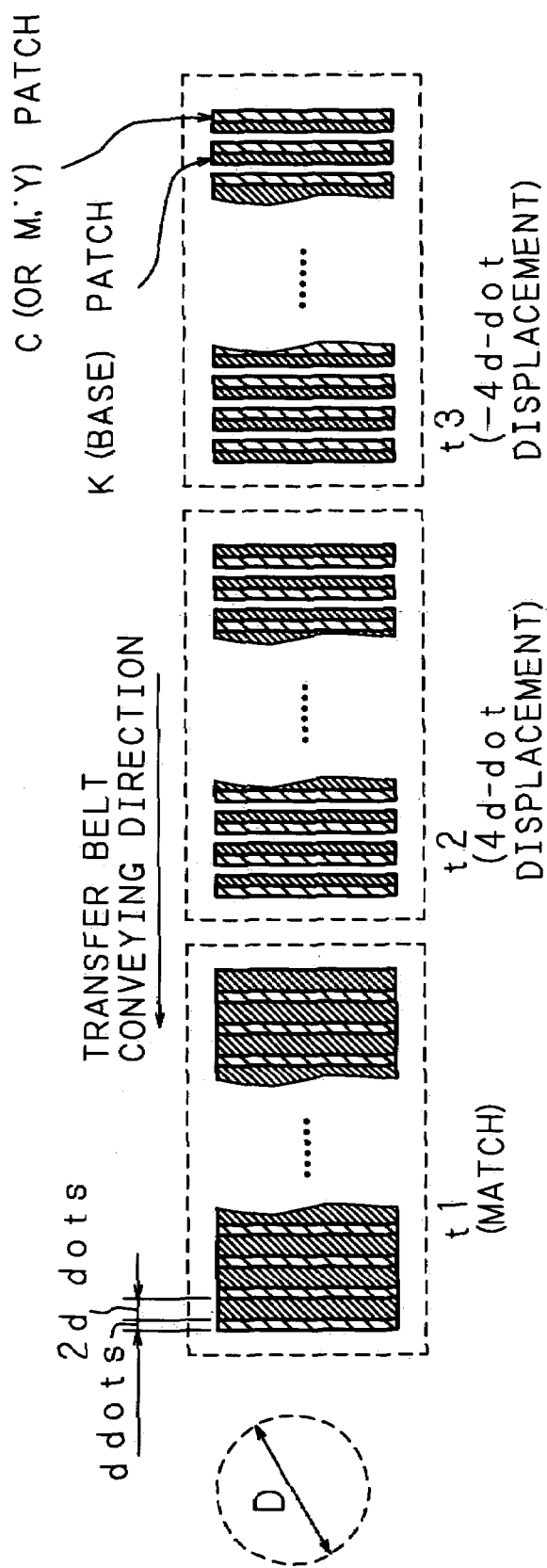
FIG. 16 is an explanatory view showing the image of base patch images and correction patch images formed in the sub scanning direction.
Figure 17:
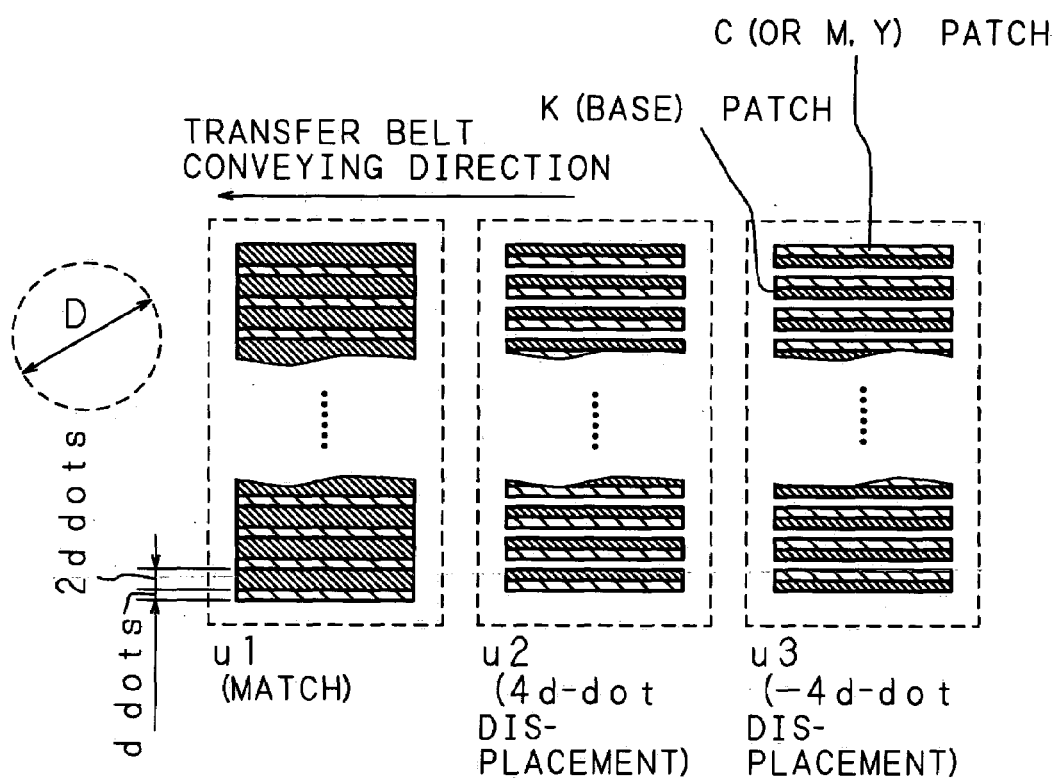
FIG. 17 is an explanatory view showing the base patch images and correction patch images formed by the second color adjustment in the main scanning direction.

FIG. 16 is an explanatory view showing the image of base patch images and correction patch images formed in the sub scanning direction, whereas FIG. 17 is an explanatory view showing the base patch images and correction patch images formed by the second color adjustment in the main scanning direction. For the present detection pattern, as shown in FIG. 16 (sub scanning direction) and FIG. 17 (main scanning direction), a plurality of base lines, each having the width of 2d (22 dots), are formed with the pitch of 3d (33 dots) (a base line having the width of 2d and a no-line portion having the width of d are repeatedly formed). That is, each base line is formed with the width of 2d when one unit of repetition is set as the pitch of 3d. Then, a plurality of correction lines, each having the width of d (11 dots), are formed with the pitch of 3d (a correction line having the width of d and a no-line portion having the width of 2d are repeatedly formed). That is, each correction line is formed with the width of 1d when one unit of repetition is set as the pitch of 3d.

Each of thus formed base lines and correction lines are measured for its density by the registration detection sensor 21. As a result of the density measurement with these two conditions in total, an extreme value obtained here is a true matching point ("65") as a final adjustment value. In the third color adjustment, when the correction lines are aligned with the base lines, the ratio of the area for the base patch images and correction patch images formed on the transfer belt 7 to the area for surface of the transfer belt 7 is 2:1 per pitch. Accordingly, the rate of the surface of the transfer belt 7 can be made higher than the case with the above-described detection pattern. Thus, the difference in output from the registration detection sensor 21 between the case where the correction patch images are aligned with base patch images and the case where they are not aligned with each other can be increased. Specifically, the difference V3 between the output from the registration detection sensor 21 obtained at the true matching point ("65") and that obtained at the other points is approximately 0.3V.

As has been described above, by performing several times of adjustments after the first color adjustment, the number of adjustments is reduced from nine to six, as shown in FIG. 13, and an extreme value significantly appears, improving the detection accuracy. In the example above, since the adjustable range was set between 0 and 99, the number of adjustments is not dramatically reduced. However, as the adjustable range is widened, the adjustment method according to the present invention has larger effects. An example where the adjustable range is between 0 and 999 will briefly be described below.

Figure 18A:
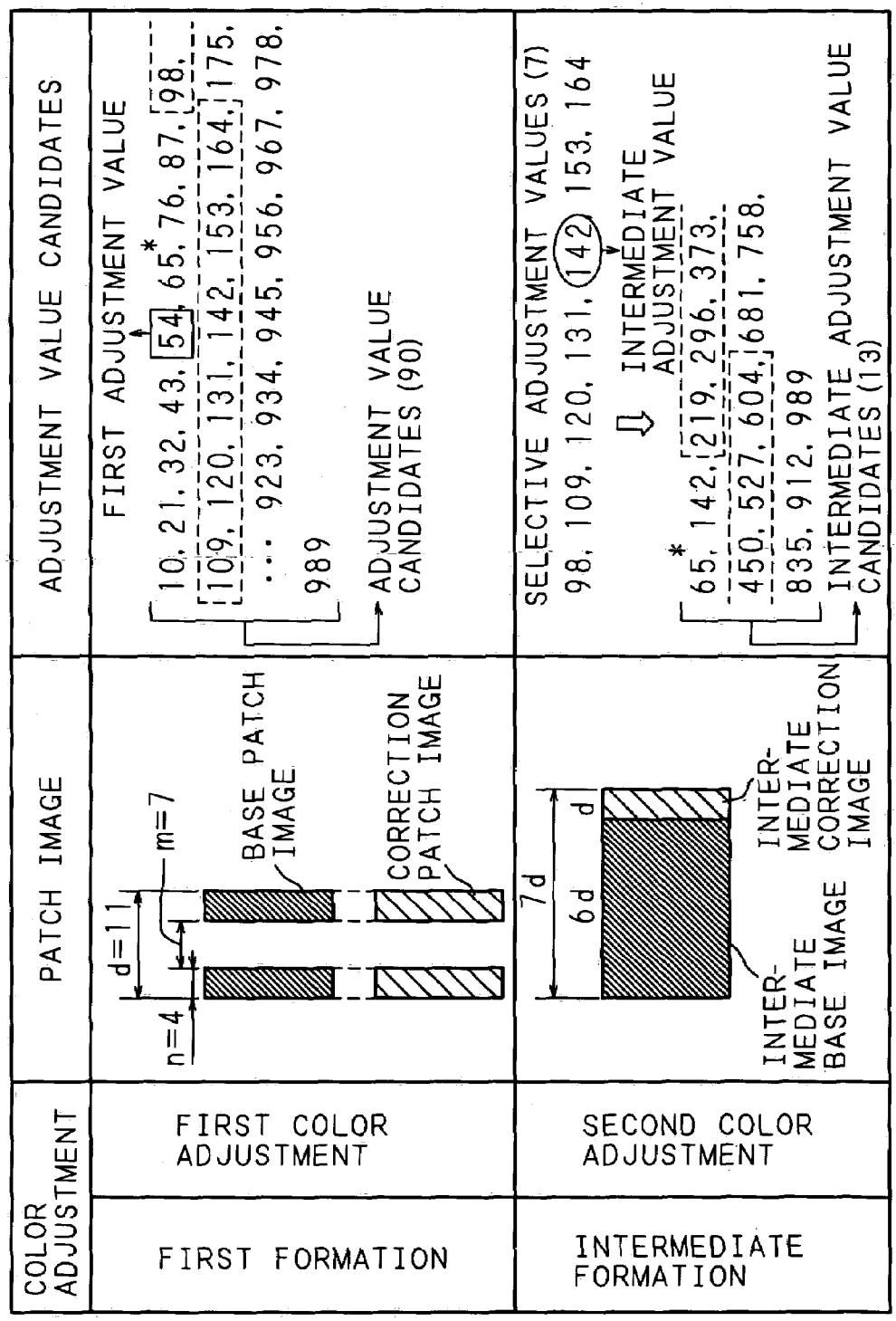
FIGS. 18A and 18B are explanatory views showing the procedure in performing several times of color adjustments.
Figure 18B:
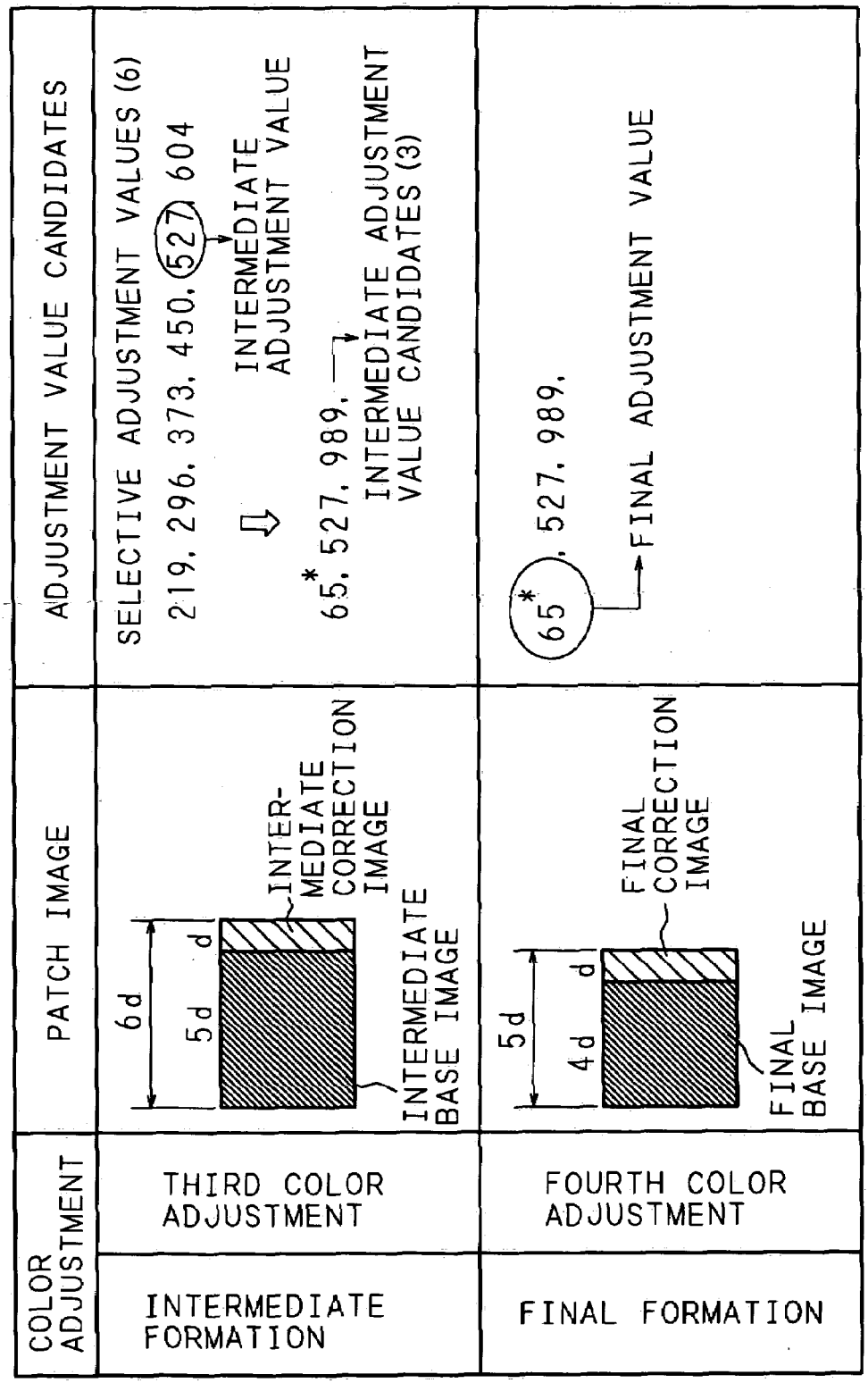

FIGS. 18A and 18B are explanatory views showing the procedure in performing several times of color adjustments. In the present example, description will be made on the assumption that the adjustment value may be adjustable in the range between 0 dots and 999 dots, and that the final adjustment value (true matching point) is "65." In the first color adjustment, images are formed for a predetermined range of the entire adjustable range of "0"-"999." For instance, as in the example above (see FIG. 13), images are formed within the range of the adjustment values of "45"-"55." The CPU 51 outputs base patch images, each having the width of 4 dots, with the first interval d=11 dots (a base patch image of 4 dots is formed and no base patch image is formed for 7 dots) in accordance with the predetermined adjustment value, to form the images on the transfer belt 7. Likewise, the CPU 51 outputs correction patch images, each having the width of 4 dots, with the first interval d=11 dots (a correction patch image of 4 dots is formed and no correction patch image is formed for 7 dots) by first setting the adjustment value as "45," to form the images on the transfer belt 7. The CPU 51 stores the average of density output from the registration detection sensor 21 into the RAM 52. This is also performed for the adjustment values of "46" to "55," to determine the adjustment value (the first adjustment value; 54) at which the average of density stored in the RAM 52 has an extreme value.

The CPU 51 extracts a plurality of adjustment value candidates that have periodical relation with the determined first adjustment value "54" in the adjustable range of "0" to "999." Specifically, the adjustment values appearing at cycles of the first interval d=11 starting from the first adjustment value "54" are extracted within the adjustable range of "0" to "999." In the present example, as shown in FIG. 18A, the values of "10," "21," "32," "43," "54," "65," "76," "87," "98," "109" . . . , "956," "967," "978," and "989" that are present at ±11 from the first adjustment value "54." In this example, the number of adjustment value candidates is ninety.

Here, the CPU 51 extracts a plurality of selective adjustment values that are subject to adjustment from ninety adjustment value candidates so as to move on to the second color adjustment. For instance, seven consecutive selective adjustment values of "98," "109," "120," "131," "142," "153," and "164" are extracted from the ninety adjustment values. Note that the number of selective adjustment values is not limited to seven, but may also be, for example, ten. The CPU 51 forms intermediate correction images in accordance with the extracted selective adjustment values of "98," "109," "120," "131," "142," "153," and "164."

The CPU 51 outputs intermediate base images, each having the width of 6d (d=11 dots) dots, with the pitch of 7d dots (a base patch image of 6 dots is formed and no base patch image is formed for d dots), i.e. an integer multiple of the first interval, in accordance with the predetermined adjustment value, to form the images on the transfer belt 7. Likewise, the CPU 51 outputs intermediate correction images, each having the width of d dots, with a pitch of 7d dots (a correction patch image of d dots is formed and no correction patch image is formed for 6d dots), i.e. an integer multiple of the first interval, by first setting the adjustment value as "98," to form the images on the transfer belt 7. The CPU 51 stores the average of density output from the registration detection sensor 21 into the RAM 52. This is also performed similarly for the other selective adjustment values of "109," "120," "131,", "142," "153," and "164," to determine an adjustment value (intermediate adjustment value; 142) at which the average of density stored in the RAM 52 has an extreme value.

The CPU 51 extracts a plurality of intermediate adjustment value candidates having periodical relation with the determined intermediate adjustment value "142" in the adjustable range of "0"-"999." That is, an extreme value output from the registration detection sensor 21 appears at every 77 dots that is obtained by multiplying the pitch ($P_{i-1}$=11) in the first color adjustment with a value obtained by dividing 7d (the sum of the width of each intermediate base image and the width of each intermediate correction image), which is the pitch number for the intermediate base images and the intermediate correction images, by d (7d÷d× $P_{i-1}$=77). Thus, thirteen intermediate adjustment value candidates of "65," "142," "219," "296," "373," "450," "527," "604," "681," "758," "835," "912," and "989" are determined.

Here, assuming that only one color adjustment is required after the first color adjustment to complete the color adjustment process, base patch images each having the width of 89d dots must be formed with the pitch of 90d dots. By contrast, correction patch images would be formed with the width of d dots and the pitch of 90d dots. In such an example, the rate of forming base patch images is extremely high (base patch image: correction patch image=89:1). Hence, it would be difficult to see the difference in the average of density output from the registration sensor, which makes it impossible to detect an extreme value, degrading the detection accuracy. Moreover, it should be understood that image formation for 89d dots (979 dots) must be performed for ninety adjustment values, also causing waste of adjustment time and developing agent.

In the present invention, it is determined whether or not the number of intermediate adjustment value candidates determined in the color adjustments performed after the first color adjustment is a predetermined number or less (e.g. four or lower). In this example, since thirteen adjustment values still exist, an intermediate color adjustment is performed again by selecting adjustment values as in the process described above. The CPU 51 extracts a predetermined number of (e.g. six) values from the intermediate adjustment value candidates of "65," "142," "219," "296," "373," "450," "527," "604," "681," "758," "835," "912," and "989" as selective adjustment values.

For instance, six consecutive selective adjustment values of "219," "296," "373," "450," "527," and "604" are extracted from the thirteen adjustment values. Note that the number of selective adjustment values is not limited to six, but may also be e.g. five. The CPU 51 forms intermediate correction images in accordance with the extracted selective adjustment values of "219," "296," "373," "450," "527," and "604."

The CPU 51 outputs intermediate base images, each having the width of 5d (d=11 dots), with a pitch of 6d dots (a base patch image of 5d dots is formed and no base patch image is formed for d dots), i.e. an integer multiple of the first interval, in accordance with the predetermined adjustment value, to form the images on the transfer belt 7. Likewise, the CPU 51 outputs intermediate correction images, each having the width of d dots, with a pitch of 6d (a correction patch image of d dots is formed and no correction patch image is formed for 5d dots), i.e. an integer multiple of the first interval, by first setting the adjustment value as "219," to form the images on the transfer belt 7. The CPU 51 stores the average of density output from the registration detection sensor 21 into the RAM 52. This is also performed for the other selective adjustment values of "296," "373," "450," "527," and "604," to determine an adjustment value (intermediate adjustment value; 527) at which the average of density stored in the RAM 52 has an extreme value. It is noted that, though the width 5d and the pitch 6d are used for the intermediate base images formed in the third color adjustment in the present example, they are not limited thereto, and the intermediate base images may also be formed with, for example, the width of 7d and the pitch of 8d.

The CPU 51 extracts a plurality of intermediate adjustment value candidates in the adjustable range of "0" to "999" that have periodical relation with the determined intermediate adjustment value "527." An extreme value output from the registration detection sensor 21 appears at every 462 dots that is obtained by multiplying the pitch number 7d ($P_{i-1}$=77 dots) in the second color adjustment with a value obtained by dividing the pitch number 6d for the intermediate base images and intermediate correction images (the sum of the width of an intermediate base image and the width of an intermediate correction image) in the present third color adjustment by d (every "6d÷d×$P_{i-1}$=462" dots). Thus, three intermediate adjustment value candidates of "65," "527" and "989" are determined.

The CPU 51 performs the final color adjustment when the number of intermediate adjustment value candidates is lowered to less than a predetermined number. At the final stage, color adjustment is performed for all the intermediate adjustment value candidates. In the present example, image formation is performed for all the three intermediate adjustment value candidates of "65," "527" and "989." The pitch for the final base images and the final correction images may be, in principle, 3d, which is obtained by multiplying the number of final adjustment values "3" with d. However, 3d (33) is a common factor of the cycle number "462," and hence 5d (55) is employed instead to prevent the number from being a common factor. The CPU 51 outputs final base images, each having the width of 4d (d=11 dots) dots, with the pitch of 5d (a base patch image of 4d dots is formed and no correction patch image is formed for d dots), i.e. an integer multiple of the first interval, in accordance with the predetermined adjustment value, to form the images on the transfer belt 7. Likewise, the CPU 51 outputs final correction images, each having the width of d dots, with the pitch of 5d (a correction patch image of d dots is formed and no correction patch image is formed for 4d dots), i.e. an integer multiple of the first interval, by first setting the adjustment value as "65," to form the images on the transfer belt 7. The CPU 51 stores the average of density output from the registration detection sensor 21 into the RAM 52.

This is also performed similarly for the other selective adjustment values of "527" and "989" so as to determine an adjustment value (final adjustment value; 65) at which the average of density stored in the RAM 52 has an extreme value. As such, by performing color adjustment only for extracted adjustment values in a specific range and gradually narrowing the range of adjustment values down to the point where the number of adjustment value candidates is a predetermined number or less, the time for adjustment can significantly be shortened. If only one adjustment is performed after the first color adjustment, color adjustment must be performed for 101 adjustment values. However, by performing several times of color adjustments after the first color adjustment as in the present example, the color adjustment may be performed only for 27 adjustment values in order to obtain a result.

The procedure of the correction process according to the present invention will be described below using flowcharts. It is noted that description will be made on the assumption that the range of color adjustment is 0-999 dots and the adjustment value for true matching is "65" as in the description above. Moreover, in the first color adjustment, the pitch (the first interval) for patch images is set as 11 dots, both the base patch images and the correction patch images have the line width of 4 dots and the line interval of 7 dots.

Figure 19:
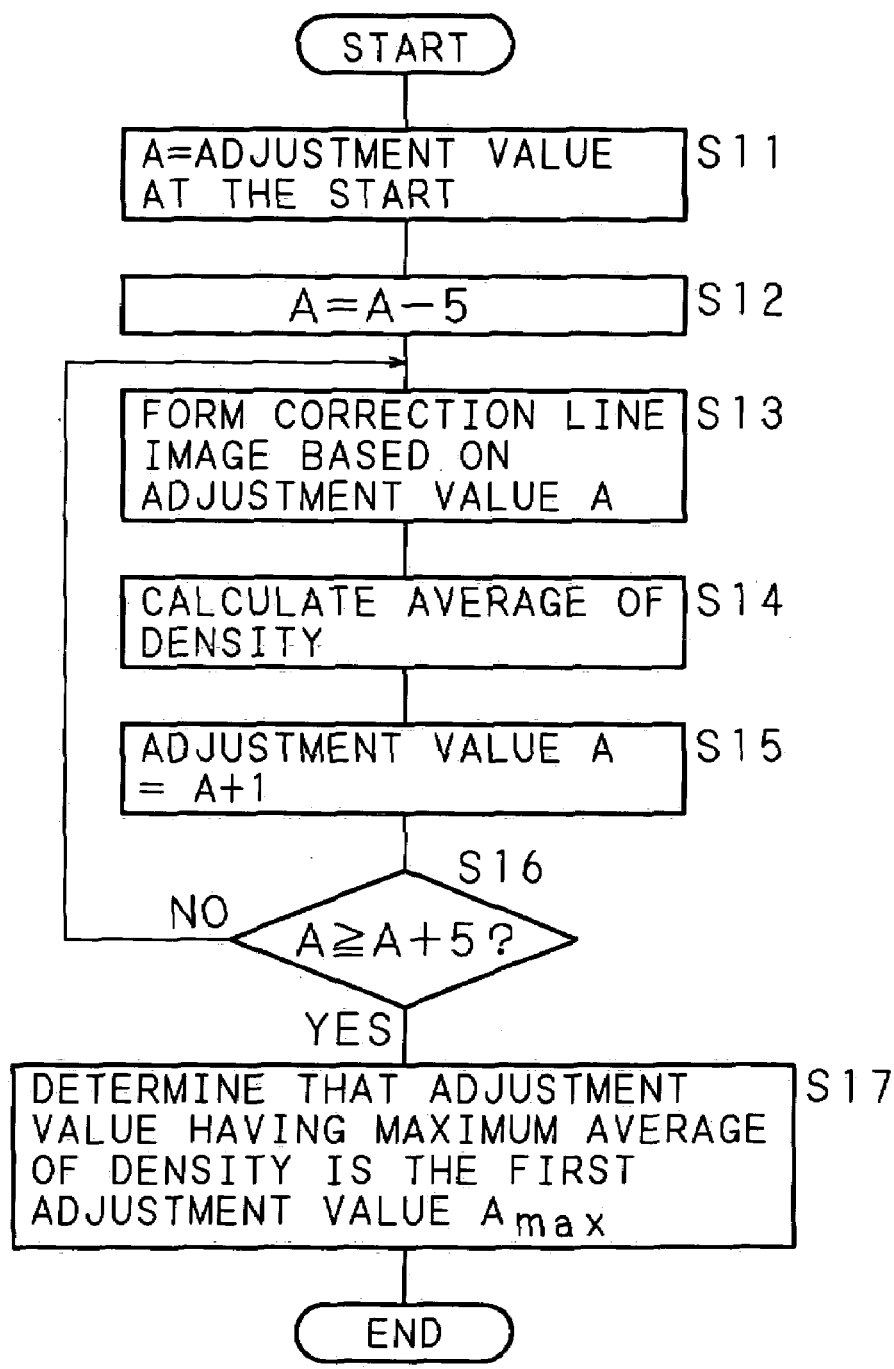
FIG. 19 is a flowchart showing the procedure of the first color adjustment.

FIG. 19 is a flowchart showing the process procedure of the first color adjustment. First, the CPU 51 determines an arbitrary position in the range of color adjustment for a correction color as an adjustment value A at the start and stores the value A into the RAM 52 (step S11). Note that A=50 is stored in the RAM 52 as a default adjustment value. Here, the adjustment value indicates the adjustment value for the timing of exposure by the exposure unit 1 in the image forming station that forms correction patch images.

The CPU 51 performs a process of subtracting 5 from the adjustment value A at the start (step S12). Thus, if the initial value of A is "50," it will be "45." Note that the adjustment value after subtraction is stored into the RAM 52. Next, CPU 51 refers to the adjustment value table 52T to read out an adjustment value for a base color, and performs light exposure at the timing of exposure based on the adjustment value, to form a base line image for the base color. The CPU 51 also reads out the adjustment value A of "45" that has undergone the subtraction and been stored in the RAM 52, and performs light exposure at the timing of exposure based on the adjustment value A, to form a correction line image for a correction color (step S13). Thus, the correction line is formed at the timing corresponding to a −5 dot-displaced position from the position where the correction line is formed based on the default adjustment value A (50).

The CPU 51 stores the density signal output from the registration detection sensor 21 into the RAM 52, calculates the average of density after a certain period f time has elapsed (step S14), and stores the calculated value into the RAM 52 by associating it with the adjustment value A. Thereafter, the CPU 51 increments the adjustment value A (step S15). The CPU 51 determines whether or not the adjustment value A after increment is equal to or higher than the value obtained by adding 5 to the initial adjustment value (step S16). Comparison is made to see if the adjustment value A is now (A+5) or "55." At S16, if the adjustment value A is lower than (A+5) (NO at step S16), the process goes back to S13 to repeat S13 to S16 by adding 1 dot by 1 dot to A.

If, on the other hand, the adjustment value A is equal to or higher than (A+5) at S16 (YES at step S16), the adjustment value having the maximum average of density, of the average values of density stored in the RAM 52, is determined as the first adjustment value $A_{max}$ (step S17). Here, detection of the density of images is performed while forming images with different positions of correction lines dot by dot for eleven times (eleven dots), i.e. from the adjustment values of "45" to "55." In the example shown in FIG. 18A, a matching point (a potential matching point) is $A_{max}$, and the adjustment value A of "54" for the ninth time is then determined as the first adjustment value.

Figure 20A:
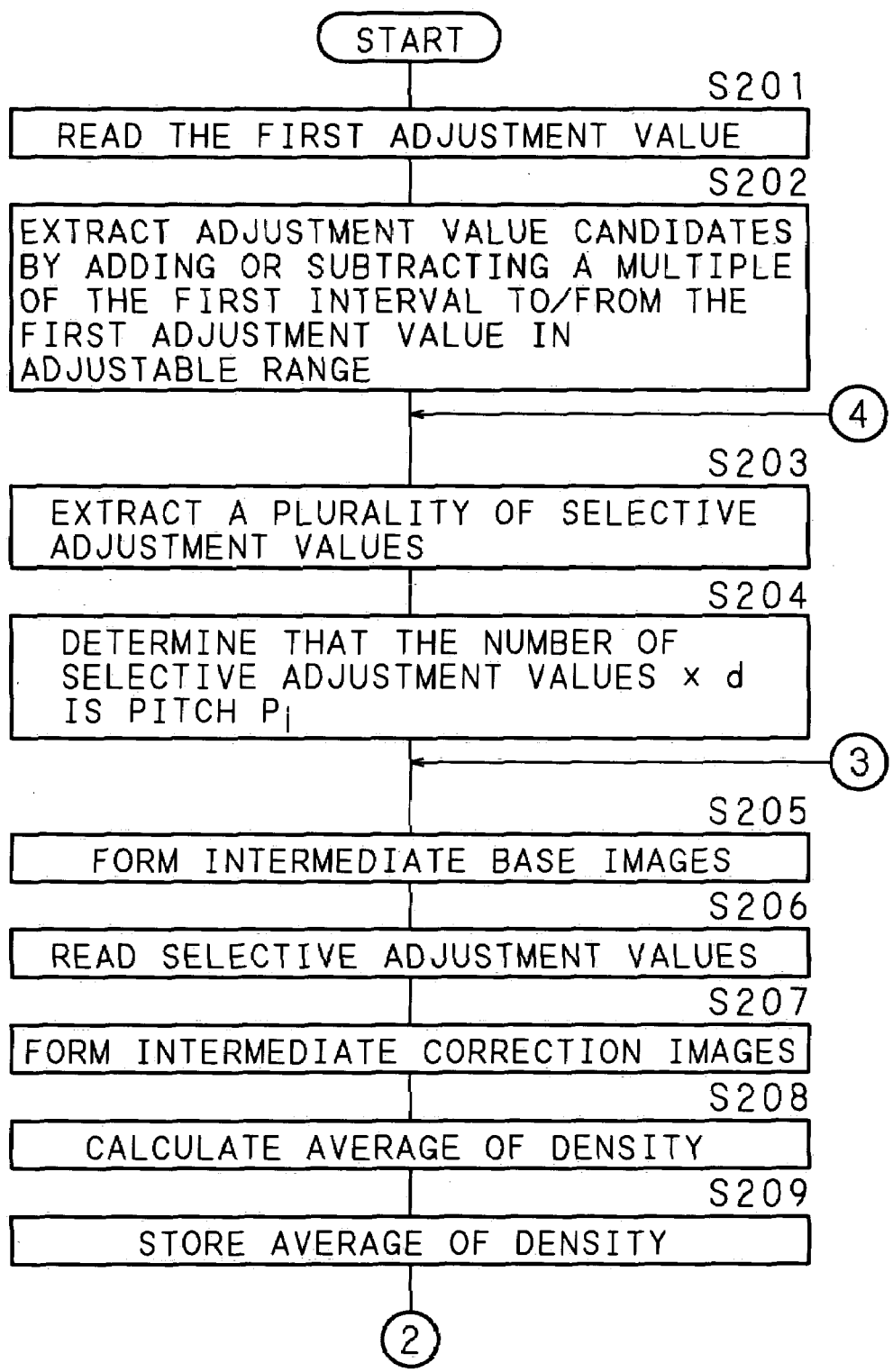
FIGS. 20A to 20C are flowcharts showing the procedure of color adjustment processes performed after the first color adjustment.
Figure 20B:
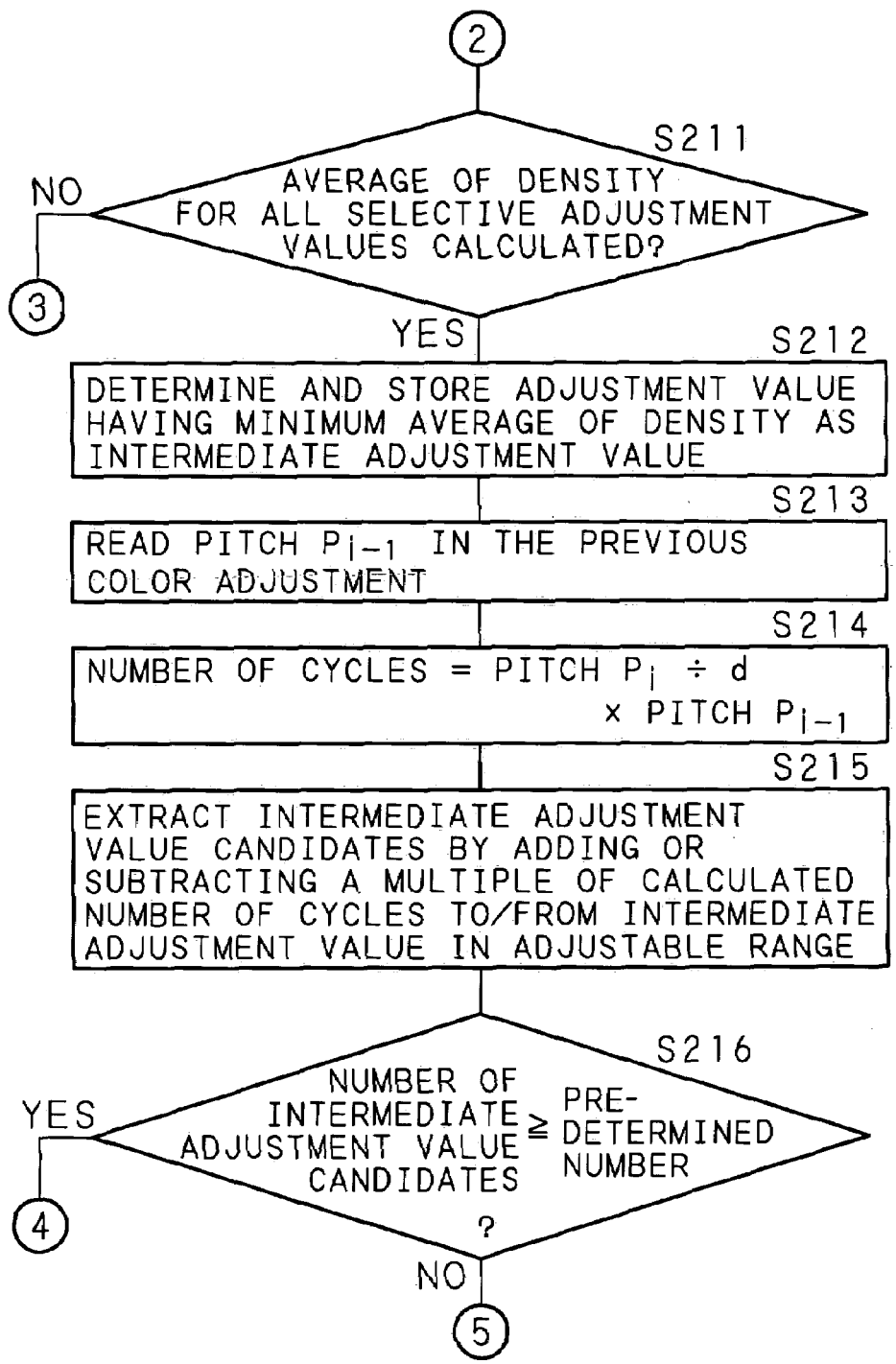
Figure 20C:
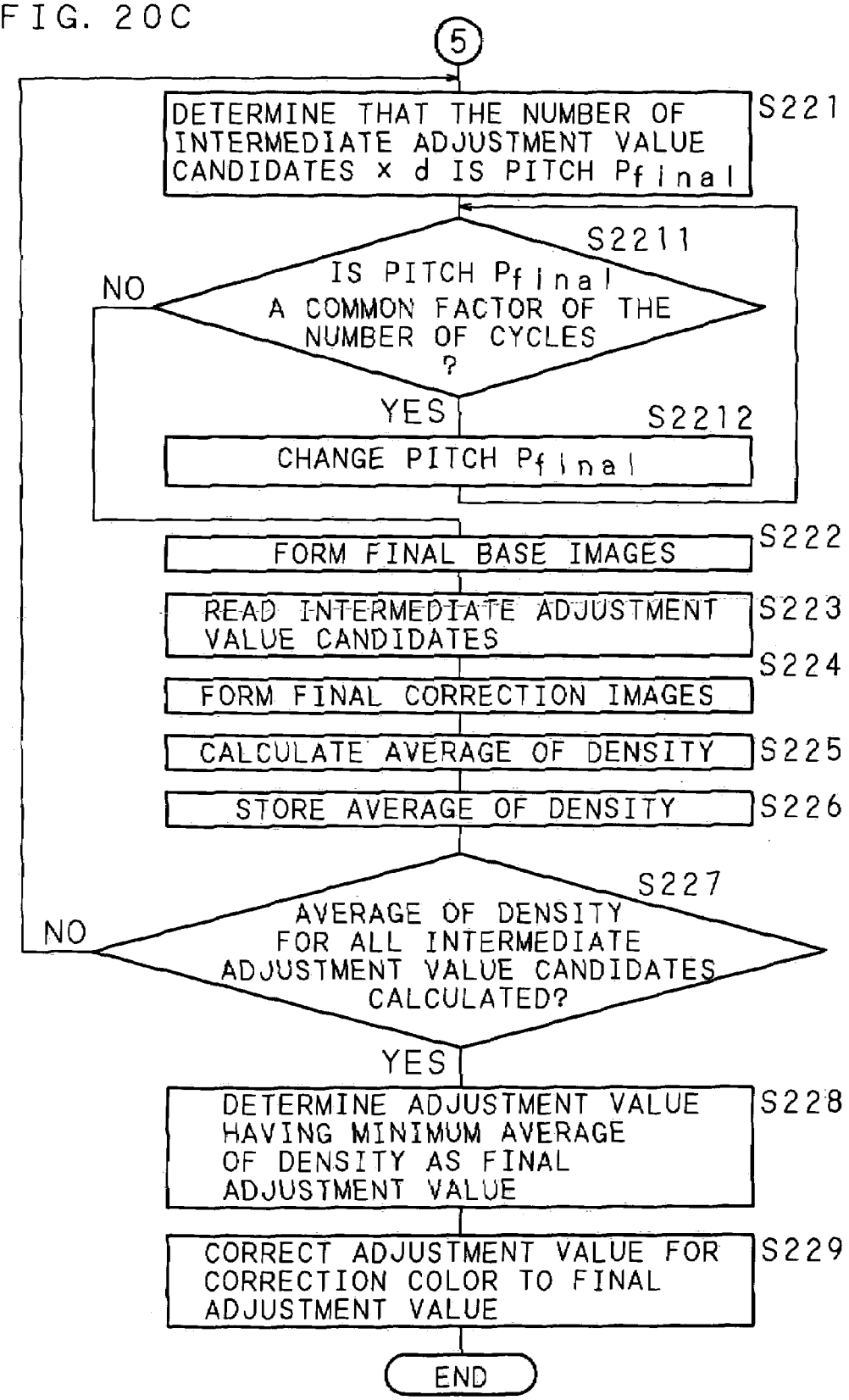

FIGS. 20A to 20C are flowcharts illustrating the procedure of color adjustment processes succeeding the first color adjustment. After the first color adjustment, the CPU 51 reads out the first adjustment value "54" determined at step S17 (step S201). The CPU 51 adds or subtracts a multiple of the first interval "11" to/from the first adjustment value "54" that was read out within the adjustable range of "0"-"999" to extract adjustment value candidates (step S202). Thus, the adjustment values to be candidates appear periodically, one period corresponding to the first interval, so that the process of adding or subtracting a multiple of the first interval "11" to/from the first adjustment value "54" is performed. Accordingly, ninety adjustment value candidates such as "10," "21," "32," "43," "54," "65," "76," "87," "98," "109," "120," "131," "142," "153," "164," "175," "186,"..."923," "934," "945," "956," "967," "978," and "989" are extracted.

Subsequently, the CPU 51 extracts a plurality of selective adjustment values from the extracted adjustment value candidates (step S203). The number of values to be extracted is stored in advance in the ROM 55. For instance, approximately seven to ten adjustment values are extracted. In the example described above, seven adjustment values of "98," "109," "120," "131," "142," "153," and "164" are extracted. The number of values to be extracted may be determined in consideration of the adjustment range, the detection range for the registration detection sensor 21, and so forth.

The CPU 51 determines the pitch $P_i$ by multiplying the number of selective adjustment values "7" with the first interval d=11 (step S204). In the example above, for the second color adjustment, the pitch is represented by $P_2$=7d, and base images and correction images are formed with the interval of 7d. The CPU 51 reads out a predetermined adjustment value from the adjustment table 52T. Based on the read adjustment value, the CPU 51 outputs intermediate base images, each having the width of 6d (d=11 dots) dots, with the pitch of 7d dots (a base patch image of 6d dots is formed and no base patch image is formed for d dots), i.e. an integer multiple of the first interval, to form the images on the transfer belt 7 (step S205).

Subsequently, the CPU 51 reads out one of the extracted selective adjustment values (step S206). Then, based on the read selective adjustment value "98," the CPU 51 outputs intermediate correction images, each having the width of d dots, with the pitch of 7d (a correction patch image of d dots is formed and no correction patch image is formed for 6d dots), i.e. an integer multiple of the first interval, to form the images on the transfer belt 7 (step S207). The CPU 51 detects the density output from the registration detection sensor 21 to calculate the average of density (step S208). The CPU 51 stores the calculated average of density into the RAM 52 by associating it with the selective adjustment value "98" that is subject to adjustment (step S209). Note that, though the intermediate base images are output and formed with the width of 6d (d=11 dots) dots and the pitch of 7d dots which is an integer multiple of the first interval while the intermediate correction images are output and formed with the width of d dots and the pitch of 7d which is an integer multiple of the first interval in the present embodiment, the pattern is not necessarily limited thereto.

Thereafter, the CPU 51 determines whether or not the process of calculating the average of density at step S208 has been executed for all the selective adjustment values of "98," "109," "120," "131," "142," "153," and "164" (step S211). If the process is not terminated for all the selective adjustment values (NO at step S211), the process goes back to step S205 to repeat the process steps described above. If, on the other hand, the process is terminated for all the selective adjustment values (YES at step S211), one adjustment value that has the minimum average of density is extracted from the average of density stored in the RAM 52. The extracted adjustment value is then determined as the intermediate adjustment value and stored into the RAM 52 (step S212). In the example described above, the adjustment value of "142" that has an extreme value is determined as the intermediate adjustment value. It is noted that, in the second color adjustment, an adjustment value at which the average of density output from the registration detection sensor 21 is minimum is determined as the intermediate adjustment value. However, whether the extreme value takes the minimum value or the maximum value depends on the color of the transfer belt 7, the base color and the correction color to be formed, and the like. Therefore, the adjustment value that takes the maximum or minimum value may be extracted depending on various conditions.

The CPU 51 reads out the pitch $P_{i-1}$ used in the previous color adjustment (step S213). In the present example, the pitch $P_1$ in the first color adjustment is 11, whereas the pitch $P_2$ in the second color adjustment is 7d (77). The CPU 51 calculates the number of cycles so as to extract intermediate adjustment value candidates that have periodical relation with the determined intermediate adjustment value candidates. The number of cycles is calculated by pitch $P_i \div d \times$ pitch $P_{i-1}$ (step S214). In the example above, the number of cycles is 77, calculated by 7d÷d×11. The CPU 51 adds or subtracts a multiple of the calculated number of cycles "77" to/from the intermediate adjustment value "142" within the adjustable range of "0"-"999" (step S215). This extracts thirteen intermediate adjustment value candidates of "65," "142," "219," "296," "373," "450," "604," "681," "758,"

"835," "912," and "989." That is, when the intermediate base images with the width of 6d and the pitch of 7d are formed and the intermediate adjustment value "142" having an extreme value is determined, an extreme value appears periodically (every 77 dots), allowing the other adjustment values to be extracted.

The CPU 51 determines whether or not the number of intermediate adjustment value candidates extracted at step S215 is a predetermined number or more (step S216). This number is stored in the ROM 55 in advance and ranges, for example, from three to six. Note that, in the present embodiment, the description will be made on the assumption that the predetermined number is four. If the number of intermediate adjustment value candidates is the predetermined number or more (YES at step S216), the process goes back to step S203 to repeatedly execute the process steps from step S203 to step S216. In the present example, the number of intermediate adjustment value candidates is thirteen, which is higher than four. Accordingly, the processes of forming intermediate base images and intermediate correction images again and extracting intermediate adjustment values and intermediate adjustment value candidates are repeated. The process steps from S203 to S216 will now be described below for the third color adjustment.

Here, the CPU 51 extracts a plurality of selective adjustment values from the extracted thirteen intermediate adjustment value candidates of "65," "142," "219," "296," "373," "450," "527," "604," "681," "758," "835," "912," and "989" (step S203). The number of values to be extracted is stored in the ROM 55 in advance based on the number of color adjustments. For instance, in the third color adjustment, five to seven adjustment values are stored. In the example above, six adjustment values of "219," "296," "373," "450," "527," and "604" are extracted.

The CPU 51 multiplies the number of selective adjustment values "6" with the first interval d=11 to determine the pitch $P_i$ (step S204). In the example above, in the third color adjustment, the pitch is represented by pitch $P_3$=6×d, and hence the base images and correction images are formed with the interval of 6d. The CPU 51 reads out a predetermined adjustment value from the adjustment value table 52T. Based on the read adjustment value, the CPU 51 outputs intermediate base images, each having the width of 5d dots (d=11 dots), with the pitch of 6d dots (a base patch image of 5d dots is formed and no base patch image is formed for d dots) which is an integer multiple of the first interval, to form the images on the transfer belt 7 (step S205).

Subsequently, the CPU 51 reads out one of the extracted selective adjustment values (step S206). Then, based on the read selective adjustment value "219," the CPU 51 outputs intermediate correction images, each having the width of d dots, with the pitch of 6d (a correction patch image of d dots is formed and no correction patch image is formed for 5d dots) which is an integer multiple of the first interval, to form the images on the transfer belt 7 (step S207). The CPU 51 detects the density output from the registration detection sensor 21 and calculates the average of density (step S208). The CPU 51 then stores the calculated average of density into the RAM 52 by associating it with the selective adjustment value "219" that is subject to adjustment (step S209).

Thereafter, the CPU 51 determines whether or not the process of calculating the average of density at step S208 is executed for all the selective adjustment values of "219," "296," "373," "450," "527," and "604" extracted at step S203 (step S211). If the process is not yet terminated for all the selective adjustment values (NO at step S211), the process goes back to step S205 to repeat the process steps above. If, on the other hand, the process is terminated for all the selective adjustment values (YES at step S211), one adjustment value that has the minimum average of density is extracted from the average of density stored in the RAM 52. The extracted adjustment value is determined as the intermediate adjustment value and stored into the RAM 52 (step S212). In the example described above, the adjustment value "527" that has an extreme value is determined as the intermediate adjustment value.

The CPU 51 reads out the pitch $P_{i-1}$ used in the previous color adjustment (step S213). In the present example, the pitch $P_2$ in the second color adjustment (i.e. the sum of the width 6d of each intermediate base image and the width d of each intermediate correction image) is 77. The pitch $P_3$ in the third color adjustment is 6d (66). The CPU 51 calculates the number of cycles so as to extract intermediate adjustment value candidates that have periodical relation with the intermediate adjustment value candidates determined at step S212. The number of cycles is calculated by pitch $P_i$÷d× pitch $P_{i-1}$ (step S214). In the example above, the number of cycles is 462, calculated by 6d÷d×77 (the sum of the width of each base image and the width of each correction image in the previous color adjustment). The CPU 51 extracts intermediate adjustment value candidates by adding or subtracting a multiple of the calculated number of cycles "330" to/from the intermediate adjustment value "527" within the adjustable range of "0"-"999" (step S215). This extracts three intermediate adjustment value candidates of "65," "527" and "989." Thus, when intermediate base images each having the width of 5d are formed with the pitch of 6d and the intermediate adjustment value "527" having an extreme value is determined, an extreme value appears periodically (every 462 dots), allowing the other adjustment values to be extracted.

The CPU 51 determines whether or not the number of intermediate adjustment value candidates extracted at step S215 is a predetermined number or more (step S216). If the number of intermediate adjustment value candidates is less than the predetermined number (NO at step S216), the final color adjustment is performed. The CPU 51 determines a pitch $P_{final}$ for the final base images and the final correction images to be formed in the final color adjustment. The pitch $P_{final}$ for the final color adjustment is determined by multiplying the number of intermediate adjustment value candidates of interest "3" with d (step S221). Since the intermediate adjustment value candidates are the three of "65," "527" and "989" in the present example, the pitch $P_{final}$ in the final color adjustment is 3d. It should be noted that, as described above, the pitch for the final base images and the final correction images may be, in principle, 3d, the number obtained by multiplying the number of final adjustment values "3" with d. However, 3d (33) is a common factor of the number of cycles "462," so that 5d (55) is employed instead to prevent the value from being a common factor. Specifically, the CPU 51 determines whether or not the pitch $P_{final}$ is a common factor of the number of cycles calculated at step S214 (step S2211). If it is a common factor (YES at step S2211), the pitch $P_{final}$ is changed by, for example, adding d thereto (step S2212). Thereafter, the process further goes back to step S2211 to repeatedly perform the process until the pitch $P_{final}$ assumes a number other than a common factor of the number of cycles calculated at step S214. If the pitch $P_{final}$ is not a common factor (NO at step S2211), the process skips step S2212.

For the final color adjustment, the CPU 51 reads out a predetermined adjustment value from the adjustment value table 52T. Based on the read adjustment value, the CPU 51 outputs final base images, each having the width of 4d (d=11 dots) dots, with the pitch of 5d dots (a base patch image of 4d dots is formed and no base patch image is formed for d dots) which is an integer multiple of the first interval, to form the images on the transfer belt 7 (step S222).

Subsequently, the CPU 51 reads out one of the extracted intermediate adjustment value candidates (step S223). Then, based on the read intermediate adjustment value candidate "65," the CPU 51 outputs final correction images, each having the width of d dots, with the pitch of 5d (a correction patch image of d dots is formed and no correction patch image is formed for 4d dots) which is an integer multiple of the first interval, to form the images on the transfer belt 7 (step S224). The CPU 51 detects the density output from the registration detection sensor 21 and calculates the average of density (step S225). The calculated average of density is stored into the RAM 52 by associating it with the intermediate adjustment value candidate "65" that is the subject for adjustment (step S226).

Thereafter, the CPU 51 determines whether or not the process of calculating the average of density at step S225 is executed for all the intermediate adjustment value candidates of "65," "527" and "989" (step S227). If the process is not yet terminated for all the intermediate adjustment value candidates (NO at step S227), the process goes back to step S221 to repeat the process steps above. If, on the other hand, the process is terminated for all the intermediate adjustment value candidates (YES at step S227), one adjustment value that has the minimum average of density is extracted from the average of density stored in the RAM 52. This adjustment value is determined as the final adjustment value (step S228), and is stored into the RAM 52. In the example described above, the adjustment value "65" that has an extreme value is determined as the final adjustment value. Finally, the CPU51 corrects the final adjustment value as the adjustment value for a correction color (step S229). Specifically, the CPU 51 performs the process of replacing the adjustment value for a color of a subject for adjustment in the adjustment value table 52T with the final adjustment value "65." By similarly performing the processes above also for the other colors, the time for adjustment can significantly be shortened and waste of developing material can be prevented, while the detection accuracy is maintained.

The color adjustment here is a technique of adjustment at the initial stage, and is performed after assembly of the image forming apparatus 100, or when installed at a place where the apparatus is actually used, or after replacement of parts or at maintenance. After the color adjustment, the adjustment values above are stored into the adjustment value table 52T in the image forming apparatus 100, and images are formed based on these adjustment values. The color adjustment described above includes the first color adjustment and the color adjustments succeeding the first color adjustment. Although, in the present embodiment, an image forming apparatus employs a direct transfer system in which a paper is carried on the transfer belt 7 and toner images formed on the respective photosensitive drums are layered one after another on the paper, the present invention can also be applicable to an image forming apparatus employing an intermediate transfer system in which toner images formed on the respective photosensitive drums are layered and transferred onto a transfer belt and then are collectively transferred again onto a paper to form a multi-color image, which can, needless to say, present a similar effect.

Second Embodiment

In the first embodiment, the first color adjustment is performed followed by several times of color adjustments. The several times of color adjustments performed after the first color adjustment may, however, be omitted. The second embodiment relates to a technique of omitting the processes after the first color adjustment as required.

For instance, when the power is input into the image forming apparatus after the initial color adjustment and adjustment is performed before image formation, it is rare to have significant color misalignment. Thus, the color adjustments after the first color adjustment are omitted. It may also be possible that only the first color adjustment is performed in usual cases, while both the first color adjustment and the color adjustments after the first color adjustment are carried out when a predetermined period of time has elapsed since the power input or when a predetermined or a larger number of images are formed. Such a structure allows the time required for color adjustment to significantly be shortened by omitting the succeeding color adjustments in usual cases.

Moreover, the succeeding color adjustments may also be performed in addition to the first color adjustment when the temperature or moisture reaches a predetermined value, or when a rapid change in temperature or moisture is detected by the temperature and moisture sensor 22 shown in FIG. 1 that is installed in the image forming apparatus 100. Furthermore, the first and succeeding color adjustments may forcibly be carried out after maintenance, e.g. replacement of a process unit such as a photosensitive drum or a development unit by a maintenance person or a user, or when obvious color misregistration is seen. In such cases, whether to completely perform the first and succeeding color adjustments (i.e., to form intermediate base images and intermediate correction images) or to perform only the first color adjustment may be selected. It is noted that, except for at the time of power input and forcible color adjustment, color adjustment is not carried out immediately when it is determined that a condition of color adjustment as described above is satisfied, but is usually carried out after an image forming job in progress is terminated or before the next job for forming an image is started.

Figure 21A:
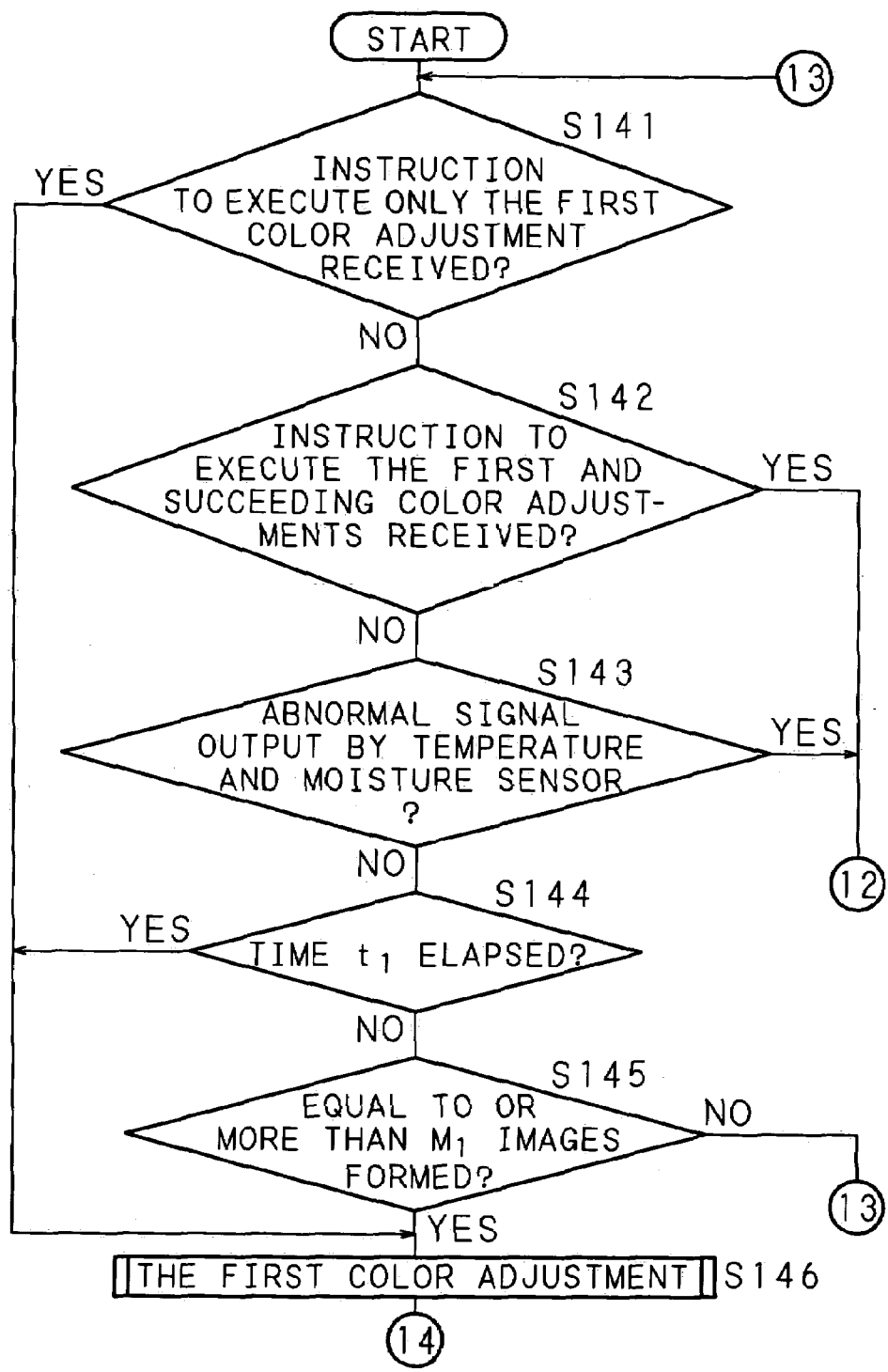
FIGS. 21A and 21B are flowcharts showing the procedure of a correction process according to the second embodiment.
Figure 21B:
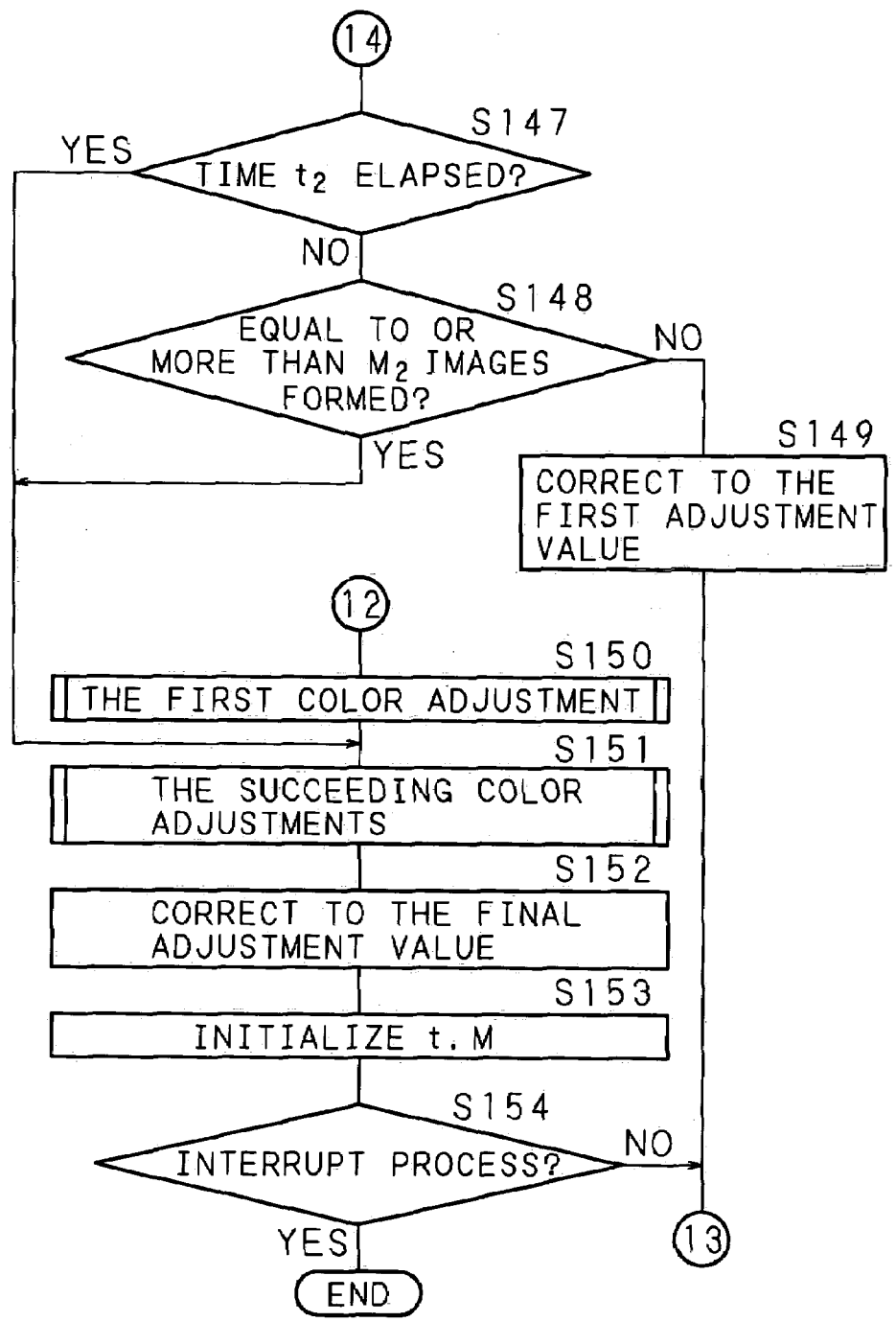

FIGS. 21A and 21B are flowcharts showing the procedure of the correction process according to the second embodiment. First, the CPU 51 determines whether or not an instruction to execute only the first color adjustment is received from the operation unit 53 (step S141). A message read from the ROM 55 is displayed on the display unit 54 by menu operation by the operation unit 53, allowing a maintenance person or a user to select either "to perform only the first color adjustment" or "to perform both the first and succeeding color adjustments."

If the instruction to execute only the first color adjustment is received (YES at step S141), the process moves on to step S146, performing the first color adjustment as described at steps S11-S17 to determine the first adjustment value (step S146). The subsequent processes will be described later. If, on the other hand, the instruction to execute only the first color adjustment is not received at step S141 (NO at step S141), it is determined whether or not the instruction to execute the first and succeeding color adjustments is received (step S142). If the instruction to execute the first and succeeding color adjustments is received (YES at step S142), the first color adjustment described above is executed (step S150) and the succeeding color adjustments described with reference to S201-S229 are executed so as to determine the final adjustment value (step S151). The processes subsequent thereto will also be described later.

If it is determined that the instruction to execute the first color adjustment and the succeeding color adjustments is not received from the operation unit 53 (NO at step S142), it is determined whether or not an abnormal signal is output from the temperature and moisture sensor 22 to the CPU 51 (step S143). If the abnormal signal is output (YES at step S143), the first color adjustment is executed (step S150) and the color adjustments succeeding the first color adjustment are further executed so as to determine the final adjustment value (step S151). If, on the other hand, no abnormal signal is output (NO at step S143), it is determined whether or not the time output from the clock unit 58 indicates that time $t_1$ has elapsed (step S144). If it is determined that the time $t_1$ has elapsed (YES at step S144), the first color adjustment is performed to determine the first adjustment value (step S146). If, on the other hand, it is determined that time $t_1$ has not elapsed (NO at step S144), it is now determined whether or not the number of formed images output from a formed image counter (not shown) is equal to or more than $M_1$ (step S145).

If the number of formed images is less than $M_1$ (NO at step S145), the process moves on to step S141 to repeat the process steps above. If, on the other hand, the number of formed images is equal to or more than $M_1$ (YES at step S145), the first color adjustment process is performed (step S146). Then, it is further determined whether or not the time output from the clock unit 58 indicates that time $t_2$ ($t_2>t_1$) has elapsed (step S147). If it is determined that the time $t_2$ has elapsed (YES at step S147), the color adjustments succeeding the first color adjustment are executed in addition to the first color adjustment of step S146, to determine the final adjustment value (steps S151, S152). If, on the other hand, it is determined that the time $t_2$ has not elapsed (NO at step S147), it is now determined whether or not the number of formed images output from the formed image counter (not shown) is equal to or more than $M_2$ ($M_2>M_1$) (step S148).

If the number of formed images is less than $M_2$ (NO at step S148), the first adjustment value determined at step S146 is set as an adjustment value for correction (step S149). Specifically, the CPU 51 renews the contents of the adjustment value table 52T, setting the first adjustment value as the adjustment value corresponding to the exposure unit 1 of a subject for correction. Thereafter, the process goes back to step S141 to repeat the processes above. If, on the other hand, the number of formed images is equal to or more than $M_2$ (YES at step S148), the color adjustments succeeding the first color adjustment are performed in addition to the first color adjustment of step S146, to correct the adjustment value to the final adjustment value (steps S151, S152). Specifically, the CPU 51 renews the contents of the adjustment value table 52T, setting the final adjustment value as the adjustment value corresponding to the exposure unit 1 of a subject for correction. It is noted that the time $t_1$ and $t_2$, and the numbers $M_1$ and $M_2$ are stored in the ROM 55 in advance. Moreover, these values may appropriately be changed using the operation unit 53.

Subsequently, the values of t and M are initialized (step S153). Thereafter, it is determined whether or not there is an interrupt process by e.g. forceful termination (step S154). If there is no interrupt process (NO at step S154), the process moves on to step S141 to continue the process. If, on the other hand, there is an interrupt process (YES at step S154), the control program 52P is forcefully terminated, and the series of processes are terminated.

As such, color adjustment to be performed is selectively determined by the instruction from a maintenance person or a user, or under a predetermined condition, whether to execute only the first color adjustment or to execute the first and succeeding color adjustments. Accordingly, the combination of the first and succeeding color adjustments is executed to obtain the final adjustment value if precise color adjustment is required, while only the first color adjustment is executed to obtain the first adjustment value if fine adjustment is performed in a short time. The obtained adjustment values are set as the adjustment values, respectively, for renewing the contents of the adjustment value table 52T.

The structure as described above is employed in the second embodiment. Since the structure and function other than the ones described above are similar to those described in the first embodiment, corresponding portions are denoted by the same reference numbers while the detailed description thereof will not be repeated.

Third Embodiment

Figure 22:
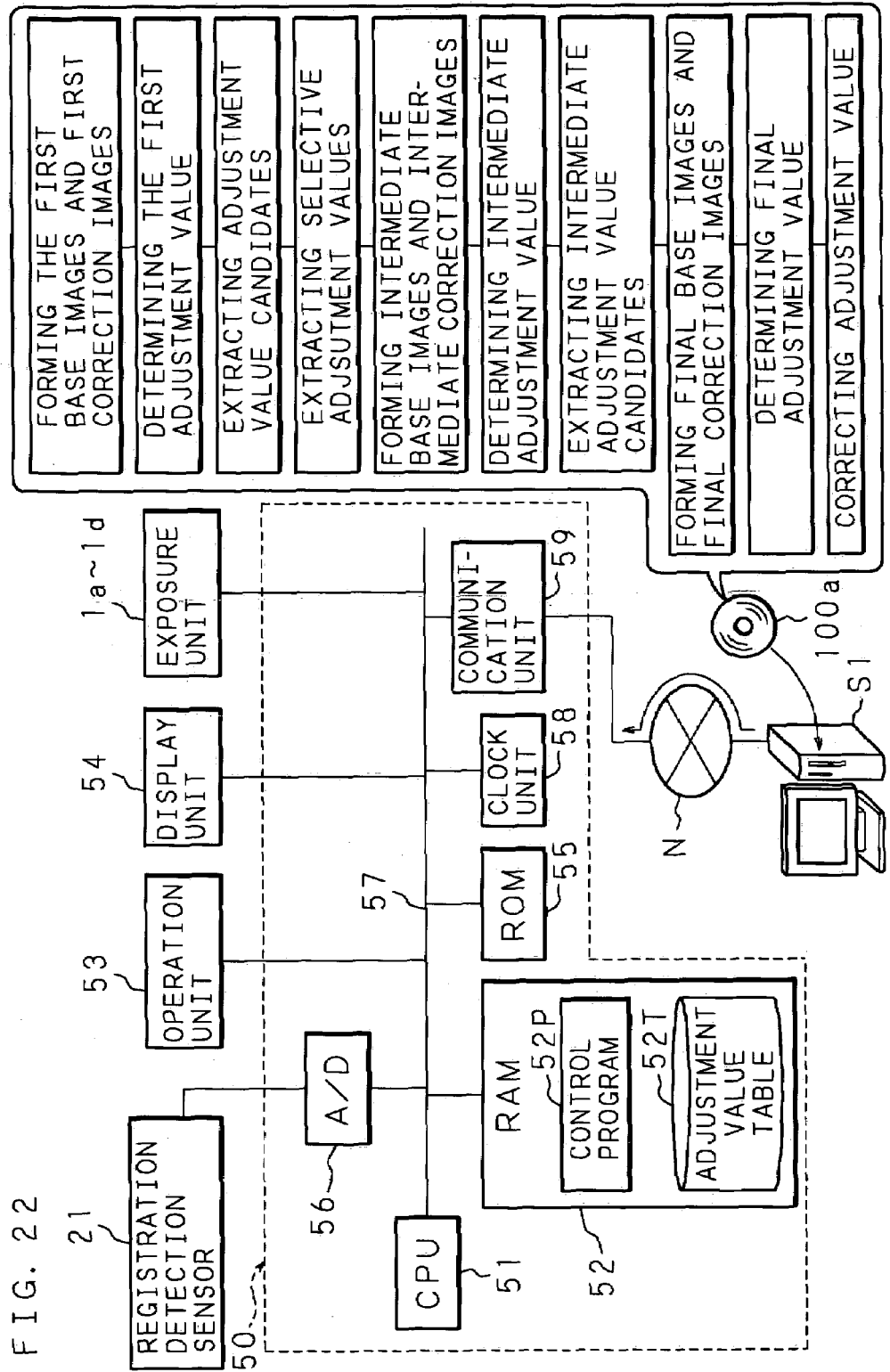
FIG. 22 is a block diagram showing the hardware configuration of a control portion according to the third embodiment.

FIG. 22 is a block diagram showing the hardware configuration of the control portion 50 according to the third embodiment. The computer program for execution of the color adjustment process by the image forming apparatus 100 according to the first embodiment may be provided by downloading a computer program installed in a personal computer S1 connected via a communication unit 59 and LAN (Local Area Network) or a communication network N such as the Internet, as in the third embodiment. Details thereof will be described below.

A recording medium 100a (CD-ROM, MO, DVD-ROM or the like) recording a program for making the control portion 50 of the image forming apparatus 100 shown in FIG. 22 form the first base images and the first correction images, determine the first adjustment value, extract adjustment value candidates, extract selective adjustment values, form intermediate base images and intermediate correction images, determine intermediate adjustment values, extract intermediate adjustment value candidates, form final base images and final correction images, determine the final value, and correct an adjustment value is installed in a hard disk (not shown) in a personal computer S1. Thus provided computer program in the recording medium 100a is transmitted to the control portion 50 of the image forming apparatus 100. The control portion 50 of the image forming apparatus 100 loads the transmitted computer program onto the RAM 52 for execution of the correction process described above. This can realize the correction process of the present invention as described above with the image forming apparatus 100.

The structure as described above is employed in the third embodiment. Since the structure and function other than the ones described above are similar to those described in the first embodiment, corresponding portions are denoted by the same reference numbers while the detailed description thereof will not be repeated.

Fourth Embodiment

Figure 23A:
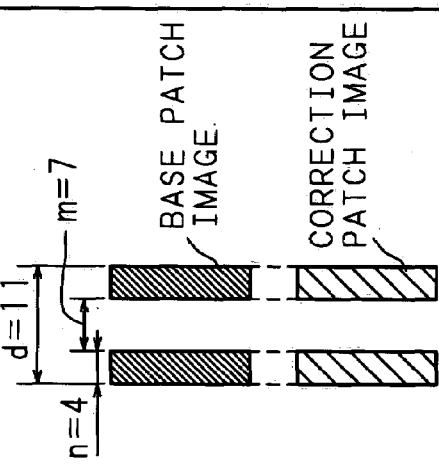
FIGS. 23A and 23B are explanatory views showing the procedure in performing several times of color adjustments.
Figure 23B:
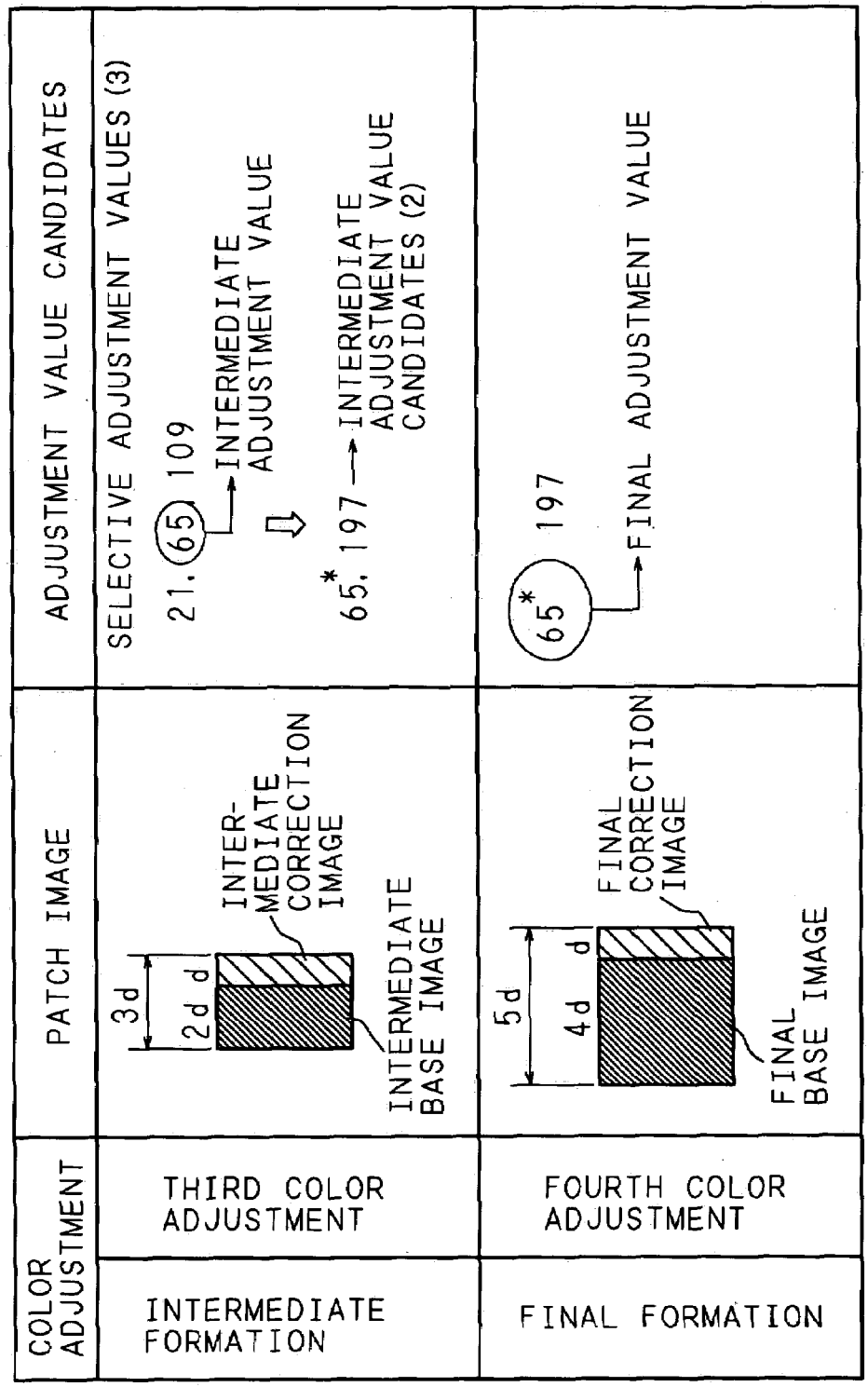

In the first embodiment, description was made for the examples where an adjustment value is adjustable in the ranges of 0-99 dots and of 0-999 dots. However, the adjustable range is not limited thereto. The adjustment may also be possible in the range of e.g. 0-199 dots as will be described below. FIGS. 23A and 23B are explanatory views showing the procedure performed when several times of color adjustments are carried out. Color adjustment in the example where the adjustable range is set as 0-199 dots will be described with reference to FIGS. 23A and 23B and the flowcharts in FIGS. 20A to 20C. Note that the process of the first color adjustment (steps S11-S17, FIG. 19) is the same as the one in the earlier example, so that the detailed description thereof will not be repeated.

After the first color adjustment, the CPU 51 reads out the first adjustment value "54" determined at step S17 (step S201). The CPU 51 extracts adjustment value candidates by adding or subtracting a multiple of the first interval "11" to/from the first adjustment value "54" read within the adjustable range of "0"-"199" (step S202). That is, the, adjustment values to be candidates appear periodically, one period corresponding to the first interval, so that the process of adding or subtracting a multiple of the first interval "11" to/from the first adjustment value "54" is performed. This extracts eighteen adjustment value candidates of "10," "21," "32," "43," "54," "65," "76," "87," "98," "109," "120," "131," "142," "153," "164," "175," "186," and "197."

Subsequently, the CPU 51 extracts a plurality of selective adjustment values from the extracted adjustment value candidates (step S203). The number of values to be extracted is stored in the ROM 55 in advance, and, for example, three to five adjustment values are extracted. In the present embodiment, four adjustment values of "87," "98," "109," and "120" are extracted. The number of values to be extracted may be determined in consideration of the range of adjustment, the range of detection by the registration detection sensor 21, and the like.

The CPU 51 determines the pitch $P_i$ by multiplying the number of selective adjustment values "4" with the first interval d=11 (step S204). In the example above, in the second color adjustment, the pitch is represented by pitch $P_2$=4d, and base images and correction images are formed with the interval of 4d. The CPU 51 reads out a predetermined adjustment value from the adjustment value table 52T. Based on the read adjustment value, the CPU 51 outputs intermediate base images, each having the width of 3d (d=11 dots) dots, with the pitch of 4d dots (a base patch image of 3 dots is formed and no base patch image is formed for d dots) which is an integer multiple of the first interval, to form the images on the transfer belt 7 (step S205).

Subsequently, the CPU 51 reads out one of the extracted selective adjustment values (step S206). Then, based on the read selective adjustment value "97," the CPU 51 outputs intermediate correction images, each having the width of d dots, with the pitch of 4d (a correction patch image of d dots is formed and no correction patch image is formed for 3d dots) which is an integer multiple of the first interval, to form the images on the transfer belt 7 (step S207). The CPU 51 detects the density output from the registration detection sensor 21 and calculates the average of density (step S208). The calculated average of density is stored into the RAM 52 by associating it with the selective adjustment value "87" that is subject to adjustment (step S209).

Thereafter, the CPU 51 determines whether or not the process of calculating the average of density at step 208 is executed for all the selective adjustment values of "87," "98," "109," and "120" extracted at step S203 (step S211). If the process is not terminated for all the selective adjustment values (NO at step S211), the process goes back to step S205 to repeat the process steps above. If, on the other hand, the process is terminated for all the selective adjustment values (YES at step S211), one adjustment value that has the minimum average of density is extracted from the average of density stored in the RAM 52. This adjustment value is determined as the intermediate adjustment value and is stored into the RAM 52 (step S212). In the present embodiment, the adjustment value "142" that has an extreme value is determined as the intermediate adjustment value. It is noted that, in the second color adjustment, the adjustment value at which the average of density output form the registration detection sensor 21 takes the minimum value is set as the intermediate adjustment value. However, whether it takes the minimum value or the maximum value depends on a color of the transfer belt 7, a base color and correction color to be formed, and the like. Accordingly, an adjustment value that takes the maximum value or the minimum value may be extracted depending on various conditions.

The CPU 51 reads out the $P_{i-1}$ used in the previous color adjustment (step S213). In the present embodiment, the pitch $P_1$ in the first color adjustment is 11 whereas the pitch $P_2$ in the second color adjustment is 4d (44). The CPU 51 calculates the number of cycles so as to extract intermediate adjustment value candidates that have periodic relation with the determined intermediate adjustment value candidates. The number of cycles is calculated by pitch $P_i \div d \times$ pitch $P_{i-1}$ (step S214). In the present embodiment, the number of cycles is 44, calculated by 4d÷d×11. The CPU 51 extracts intermediate adjustment value candidates by adding or subtracting a multiple of the calculated number of cycles "44" to/from the intermediate adjustment value "109" within the adjustable range of "0"-"199" (step S215). This extracts five intermediate adjustment value candidates of "21," "65," "109," "153," and "197." Thus, when intermediate base images with the width of 3d and the pitch of 4d are formed and the intermediate adjustment value "109" having an extreme value is determined, an extreme value appears periodically (every 44 dots), allowing the other adjustment value to be extracted.

The CPU 51 determines whether or not the number of intermediate adjustment value candidates extracted at step S215 is a predetermined number or more (step S216). This number is stored in the ROM 55 in advance, and is e.g. three to five. Note that, in the present embodiment, description will be made on the assumption that the predetermined number is four. If the number of intermediate adjustment value candidates is a predetermined number or more (YES at step S216), the process goes back to step S203 to repeatedly execute the process steps from S203 to S216. In the present example, the number of intermediate adjustment value candidates is five according to the second color adjustment, which is higher than four, so that the process of forming intermediate base images and intermediate correction images and extracting intermediate adjustment values and intermediate adjustment value candidates is repeated again. The process steps from S203 to S216 for the third color adjustment will be described below.

Here, the CPU 51 extracts a plurality of selective adjustment values from the extracted five intermediate adjustment value candidates of "21," "65," "109," "153," and "197" (step S203). The number of values to be extracted is stored in the ROM 55 in advance according to the number of color adjustment times. For instance, in the third color adjustment, three to four adjustment values are stored. In the present embodiment, three adjustment values of "21," "65" and "109" are extracted.

The CPU 51 determines the pitch $P_i$ by multiplying the number of selective adjustment values "3" with the first interval d=11 (step S204). In the example above, in the third color adjustment, the pitch is represented by pitch $P_3$=3×d, and hence base images and correction images are formed with the interval of 3d. The CPU 51 reads out a predetermined adjustment value from the adjustment value table 52T. Based on the read adjustment value, the CPU 51 outputs intermediate base images, each having the width of 2d (d=11 dots) dots, with the pitch of 3d dots (a base patch image of 2d dots is formed and no base patch image is formed for d dots), i.e. an integer multiple of the first interval, to form the images on the transfer belt 7 (step S205).

Subsequently, the CPU 51 reads out one of the extracted selective adjustment values (step. S206). Then, based on the read selective adjustment value "21," the CPU 51 outputs intermediate correction images, each having the width of d dots, with the pitch of 3d dots (a correction patch image of d dots is formed and no correction patch image is formed for 2d dots), i.e. an integer multiple of the first interval, to form the images on the transfer belt 7 (step S207). The CPU 51 detects the density output from the registration detection sensor 21 and calculates the average of density (step S208). The calculated average of density is stored into the RAM 52 by associating it with the selective adjustment value "21" that is subject to adjustment (step S209).

Thereafter, the CPU 51 determines whether or not the process of calculating the average of density at step S208 has been executed for all the extracted selective adjustment values of "21," "65" and "109" (step S211). If the process is not yet terminated for all the selective adjustment values (NO at step S211), the process goes back to step S205 to repeat the process steps above. If, on the other hand, the process is terminated for all the selective adjustment values (YES at step S211), one adjustment value that as the minimum average of density is extracted from the average of density stored in the RAM 52. This adjustment value is determined as the intermediate adjustment value and stored into the RAM 52 (step S212). In the example described above, the adjustment value "65" that has an extreme value is determined as the intermediate adjustment value.

The CPU 51 reads out the pitch $P_{i-1}$ used in the previous color adjustment (step S213). In the present embodiment, the pitch $P_2$ (the sum of the width 3d of each intermediate base image and the width d of each intermediate correction image) in the second color adjustment is 44, whereas the pitch $P_3$ in the third color adjustment is 3d (33). The CPU 51 calculates the number of cycles so as to extract intermediate adjustment value candidates that have periodical relation with the determined intermediate adjustment value candidates. The number of cycles is calculated by pitch $P_i \div d \times$ pitch $P_{i-1}$ (step S214). In the example above, the number of cycles is 132, calculated by 3d÷d×44 (the sum of the width of each base image and the width of each correction image in the previous color adjustment). The CPU 51 extracts intermediate adjustment value candidates by adding or subtracting a multiple of the calculated number of cycles "132" to/from the intermediate adjustment value "65" within the adjustable range of "0"-"199" (step S215). This extracts two intermediate adjustment value candidates of "65" and "197". Thus, if intermediate base images with the width of 2d and the pitch 3d are formed and the intermediate adjustment value of "65" that has an extreme value is determined, an extreme value appears periodically (every 132 dots), allowing the other adjustment values to be extracted.

The CPU 51 determines whether or not the number of intermediate adjustment value candidates extracted at step S215 is a predetermined number or more (step S216). If the number of adjustment value candidates is less than the predetermined number (NO at step S216), the final color adjustment is performed. The CPU 51 determines the pitch $P_{final}$ for the final base images and the final correction images to be formed in the final color adjustment. The pitch $P_{final}$ in the final color adjustment is determined by multiplying the number of intermediate adjustment value candidates of interest "2" with d (step S221). In the present embodiment, there are two intermediate adjustment value candidates of "65" and "197," and hence the pitch $P_{final}$ in the final color adjustment is 2d. As described above, the pitch for the final base images and the final correction images may be, in principle, 2d, that is obtained by multiplying the number of final adjustment values "2" with d. However, 2d (22) is a common factor of the number of cycles "132," so that 5d (55) is employed instead to prevent the value from being a common factor. Specifically, the CPU 51 determines whether or not the pitch $P_{final}$ is a common factor of the number of cycles calculated at step S214 (step S2211). If it is a common factor (YES at step S2211), the pitch $P_{final}$ is changed by, for example, adding d thereto (step S2212). Thereafter, the process further goes back to step S2211 to repeat the process steps above until the pitch $P_{final}$ assumes a number other than a common factor of the number of cycles calculated at step S214 (3d and 4d are also common factors in the present embodiment). If the pitch $P_{final}$ is not a common factor (NO at step S2211), the process skips step S2212.

For the final color adjustment, the CPU 51 reads out a predetermined adjustment value from the adjustment value table 52T. Based on the read adjustment value, the CPU 51 outputs final base images, each having the width of d (d=11 dots) dots, with the pitch of 5d dots (a base patch image of d dots is formed and no base patch image is formed for 4d dots), i.e. an integer multiple of the first interval, to form the images on the transfer belt 7 (step S222).

Subsequently, the CPU 51 reads out one of the extracted intermediate adjustment value candidates (step S223). Then, based on the read intermediate adjustment value candidate "65," the CPU 51 outputs final correction images, each having the width of d dots, with the pitch of 5d (a correction patch image of d dots is formed and no correction patch image is formed for 4d dots), i.e. an integer multiple of the first interval, to form the images on the transfer belt 7 (step S224). The CPU 51 detects the density output from the registration detection sensor 21 and calculates the average of density (step S225). The calculated average of density is stored into the RAM 52 by associating it with the intermediate adjustment value candidate "65" that is the subject for adjustment (step S226).

Thereafter, the CPU 51 determines whether or not the process of calculating the average of density at step S225 is executed for all the intermediate adjustment value candidates of "65" and "197" (step S227). If the process is not yet terminated for all the intermediate adjustment value candidates (NO at step S227), the process goes back to step S221 to repeat the process steps above. If, on the other hand, the process is terminated for all the intermediate adjustment value candidates (YES at step S227), one adjustment value that has the minimum average of density is extracted from the average of density stored in the RAM 52. This adjustment value is determined as the final adjustment value (step S228) and is stored into the RAM 52. In the present embodiment, the adjustment value "65" having an extreme value is determined as the final adjustment value. Finally, the CPU 51 corrects the final adjustment value as the adjustment value for a correction color (step S229). Specifically, the CPU 51 performs the process of replacing the adjustment value for a color of a subject for adjustment in the adjustment value table 52T with the final adjustment value "65."

As has been described in detail, in the present invention, a plurality of first base images for a base color such as black for example are formed in accordance with a predetermined adjustment value. A plurality of the first correction images for a correction color which is to be a subject for correction are formed on the first base images in accordance with a predetermined adjustment value. Here, if there is no displacement, each of the first base images are perfectly aligned with each of the first correction images. In order to check the degree of alignment, the adjustment value for the correction color is changed for output within a predetermined range, i.e., the first correction images are formed with displacements within a predetermined range to check the alignment state.

Then, based on the density output from a sensor that outputs the density of the image forming portion, the first adjustment value is determined from the changed adjustment value. The first adjustment value that outputs an extreme value appears periodically in the adjustable range of an adjustment value. Thus, a plurality of adjustment value candidates having periodical relation with the first adjustment value determined within the predetermined range are extracted in the entire adjustable range of an adjustment value. In the present invention, a plurality of selective adjustment values that are subject to adjustment are extracted from the extracted adjustment value candidates. Then, color adjustment is performed for the selective adjustment values extracted from the adjustment value candidates. Here, intermediate base images for the base color are formed in accordance with the predetermined adjustment value while intermediate correction images for the correction color are formed in accordance with the extracted selective adjustment values. Then, an intermediate adjustment value that has an extreme value is determined from the plurality of selective adjustment values based on the density output from the sensor.

Likewise, an intermediate adjustment value having an extreme value appears periodically. Hence, a plurality of intermediate adjustment value candidates having periodical relation with the determined intermediate adjustment value are extracted in the adjustable range of an adjustment value. If the number of extracted intermediate adjustment value candidates is a predetermined number or more, a plurality of selective adjustment values to be subject to adjustment are extracted again from the extracted intermediate adjustment value candidates. If the number of the extracted intermediate adjustment value candidates is less than the predetermined number, the time required for detection will not be very long even if the final adjustment is performed one by one for all the adjustment value candidates. Therefore, the final base images for the base color are formed in accordance with the predetermined adjustment value, while the final correction images for the correction color are formed in accordance with each of the extracted intermediate adjustment value candidates. Subsequently, the final adjustment value is determined from the intermediate adjustment values based on the density output from the sensor. The predetermined adjustment value for the correction color is corrected to thus determined final adjustment value, so that the time required for adjustment can significantly be shortened and waste of developing agent can be prevented while accuracy is improved, compared to the case where images are formed for correction for all the adjustment value candidates after the first adjustment value is determined.

Moreover, in the present invention, the first base images are formed with the first interval, while the first correction images are formed with the adjustment value successively changed in the range of the first interval. Then, the change in the density output from the sensor will be such that the data having an extreme value at a position with no displacement is repeatedly obtained at such intervals (cycles). In other words, if one first adjustment value corresponding to the extreme value is determined, candidates for the final first adjustment value may be obtained as periodical values without the need for image formation in the entire adjustment area. With such a structure, the adjustment value to be corrected can more efficiently be determined, allowing color adjustment in a short time as a result.

Furthermore, in the present invention, the first base images and the first correction images are formed to have the same shape. Thus, an extreme value of the density output from the sensor shows a significant peak when the first base image and the first correction image are perfectly aligned with each other, allowing determination of the adjustment value with higher accuracy.

Additionally, in the present invention, it is determined whether or not formation of the intermediate base images and the intermediate correction images is to be executed. That is, it is determined whether or not the color adjustments after the first color adjustment should be performed in addition to the first color adjustment. If a maintenance person, a user or the like enters an instruction, using the operation unit, not to executed the formation of the intermediate base images and the intermediate correction images, or if there is a definite condition for not forming the intermediate base images and the intermediate correction images, such as the case where the number of image formations after delivery has reached a certain number, only the first base images and the first correction images are formed to determine the first adjustment value. Then, the determined first adjustment value is employed as an adjustment value for a correction color, to make a correction. Accordingly, color adjustment can readily be carried out in a shorter time at a simple maintenance by appropriately omitting the second and later stages of color adjustment, which makes the present invention highly effective.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of correcting a predetermined adjustment value for an image forming apparatus forming an image of each of separated colors in accordance with said adjustment value, comprising:

a first formation step of forming a first base image for a base color in accordance with the predetermined adjustment value, and forming a first correction image for a correction color to be a subject for correction in accordance with a value obtained by changing the predetermined adjustment value within a predetermined range;

a first adjustment value determination step of determining a first adjustment value from the changed adjustment value based on a density output corresponding to the first base image and the first correction image from a sensor detecting the density of an image forming portion;

an adjustment value candidate extraction step of extracting a plurality of adjustment value candidates that have periodical relation with the first adjustment value determined within said predetermined range in an adjustable range of an adjustment value;

a selective adjustment value extraction step of extracting a plurality of selective adjustment values to be subject to adjustment from the extracted adjustment value candidates;

an intermediate formation step of forming an intermediate base image for the base color in accordance with the predetermined adjustment value, and forming an intermediate correction image for the correction color in accordance with said extracted selective adjustment values;

an intermediate adjustment value determination step of determining an intermediate adjustment value from said plurality of selective adjustment values based on the density output corresponding to the intermediate base image and the intermediate correction image from said sensor;

an intermediate adjustment value candidate extraction step of extracting a plurality of intermediate adjustment value candidates that have periodical relation with said determined intermediate adjustment value in an adjustable range of an adjustment value;

an execution step of repeatedly extracting a plurality of selective adjustment values to be subject to adjustment from the extracted intermediate adjustment value candidates by said selective adjustment value extraction step and executing each process at said intermediate formation step, intermediate adjustment value determination step and intermediate adjustment value candidate extraction step until the number of extracted intermediate adjustment value candidates becomes less than a predetermined number, if the number of extracted intermediate adjustment value candidates is the predetermined number or more;

a final formation step of forming a final base image for the base color in accordance with the predetermined adjustment value, and forming a final correction image for the correction color in accordance with each of said extracted intermediate adjustment value candidates, if the number of intermediate adjustment value candidates extracted by said intermediate adjustment value candidate extraction step is less than the predetermined number;

a final adjustment value determination step of determining a final adjustment value from said intermediate adjustment value candidates based on the density output corresponding to the final base image and the final correction image from said sensor; and a correction step of correcting the predetermined adjustment value for the correction color to the determined final adjustment value.

2. A method of correcting a predetermined adjustment value for an image forming apparatus forming an image of each of separated colors in accordance with said adjustment value, comprising:

a first formation step of forming a first base image for a base color in accordance with the predetermined adjustment value, and forming a first correction image for a correction color to be a subject for correction in accordance with a value obtained by changing the predetermined adjustment value within a predetermined range;

a first adjustment value determination step of determining a first adjustment value from the changed adjustment value based on a density output corresponding to the first base image and the first correction image from a sensor detecting the density of an image forming portion;

an intermediate formation step of forming an intermediate base image for the base color in accordance with the predetermined adjustment value, and forming an intermediate correction image for the correction color in accordance with a plurality of selective adjustment values that have periodical relation with said first adjustment value an intermediate adjustment value determination step of determining an intermediate adjustment value from said plurality of selective adjustment values based on the density output from said sensor corresponding to the intermediate base image and the intermediate correction image;

an intermediate adjustment value candidate extraction step of extracting a plurality of intermediate adjustment value candidates that have periodical relation with said determined intermediate adjustment value in an adjustable range of an adjustment value;

an execution step of again extracting a plurality of selective adjustment values to be subject to adjustment from the intermediate adjustment value candidates and executing said intermediate formation step, if the number of extracted intermediate adjustment value candidates is a predetermined number or more;

a final formation step of forming a final base image for the base color in accordance with the predetermined adjustment value, and forming a final correction image for the correction color in accordance with each of said extracted intermediate adjustment value candidates, if the number of extracted intermediate adjustment value candidates is less than the predetermined number;

a final adjustment value determination step of determining a final adjustment value from said intermediate adjustment value candidates based on the density output corresponding to the final base image and the final correction image from said sensor; and a correction step of correcting the predetermined adjustment value for the correction color to the determined final adjustment value.

3. An image forming apparatus forming an image of each of separated colors in accordance with a predetermined adjustment value, comprising:

a sensor detecting a density of an image forming portion; and a processor capable of performing the following operations comprising:

a first formation step of forming a first base image for a base color in accordance with a predetermined adjustment value, and forming a first correction image for a correction color to be a subject for correction in accordance with a value obtained by changing a predetermined adjustment value within a predetermined range;

a first adjustment value determination step of determining a first adjustment value from the changed adjustment value based on a density output corresponding to the first base image and the first correction image from said sensor;

an adjustment value candidate extraction step of extracting a plurality of adjustment value candidates that have periodical relation with the first adjustment value determined within said predetermined range in an adjustable range of an adjustment value;

a selective adjustment value extraction step of extracting a plurality of selective adjustment values to be subject to adjustment from the extracted adjustment value candidates;

an intermediate formation step of forming an intermediate base image for the base color in accordance with the predetermined adjustment value, and forming an intermediate correction image for the correction color in accordance with said extracted selective adjustment values;

an intermediate adjustment value determination step of determining an intermediate adjustment value from said plurality of selective adjustment values based on the density output corresponding to the intermediate base image and the intermediate correction image from said sensor;

an intermediate adjustment value candidate extraction step of extracting a plurality of intermediate adjustment value candidates that have periodical relation with said determined intermediate adjustment value in an adjustable range of an adjustment value;

an execution step of repeatedly extracting a plurality of selective adjustment values to be subject to adjustment from the extracted intermediate adjustment value candidates by said selective adjustment value extraction step and executing each process at said intermediate formation step, intermediate adjustment value determination step and intermediate adjustment value candidate extraction step until the number of extracted intermediate adjustment value candidates becomes less than a predetermined number, if the number of extracted intermediate adjustment value candidates is the predetermined number or more;

a final formation step of forming a final base image for the base color in accordance with the predetermined adjustment value, and forming a final correction image for the correction color in accordance with each of said extracted intermediate adjustment value candidates, if the number of intermediate adjustment value candidates extracted by said intermediate adjustment value candidate extraction step is less than the predetermined number;

a final adjustment value determination step of determining a final adjustment value from said intermediate adjustment value candidates based on the density output corresponding to the final base image and the final correction image from said sensor; and a correction step of correcting the predetermined adjustment value for the correction color to the determined final adjustment value.

4. The image forming apparatus according to claim 3, wherein said first formation step forms the first base image with a first interval and forms said first correction image based on a value obtained by changing an adjustment value within a range of the first interval.

5. The image forming apparatus according to claim 3, wherein said first formation step forms said first base image and first correction image having a same shape.

6. The image forming apparatus according to claim 4, wherein said intermediate formation step forms the intermediate base image for the base color in accordance with the predetermined adjustment value based on said first interval, and forms the intermediate correction image for the correction color in accordance with said extracted selective adjustment values based on said first interval.

7. The image forming apparatus according to claim 4, wherein said final formation step forms the final base image for the base color in accordance with the predetermined adjustment value based on said first interval, and forms the final correction image for the correction color in accordance with each of said extracted intermediate adjustment value candidates based on said first interval, if the number of intermediate adjustment value candidates extracted by said intermediate adjustment value candidate extraction step is less than the predetermined number.

8. The image forming apparatus according to claim 6, wherein each of said first base image, first correction image, intermediate base image, intermediate correction image, final base image, and final correction image has a rectangular shape, and each of the intermediate base image, intermediate correction image, final base image, and final correction image has a width corresponding to an integer multiple of said first interval.

9. The image forming apparatus according to claim 8, wherein said intermediate adjustment value candidates extraction step extracts a plurality of intermediate adjustment value candidates obtained by adding or subtracting an integer multiple of the sum of the widths of the intermediate base image and the intermediate correction image formed at said intermediate formation step to/from the intermediate adjustment value determined at said intermediate adjustment value determination step in an adjustable range of an adjustment value.

10. The image forming apparatus according to claim 3, wherein the processor is further capable of performing the step of determining whether or not image formation by said intermediate formation step is to be executed, wherein said correction step corrects the predetermined adjustment value for the correction color to said determined first adjustment value if it is determined that no image formation by said intermediate formation step is to be executed.

11. An image forming apparatus forming an image of each of separated colors in accordance with a predetermined adjustment value, comprising:

a sensor detecting a density of an image forming portion;

a first formation means for forming a first base image for a base color in accordance with a predetermined adjustment value, and forming a first correction image for a correction color to be a subject for correction in accordance with a value obtained by changing a predetermined adjustment value within a predetermined range;

a first adjustment value determination means for determining a first adjustment value from the changed adjustment value based on a density output corresponding to the first base image and the first correction image from said sensor;

an adjustment value candidate extraction means for extracting a plurality of adjustment value candidates that have periodical relation with the first adjustment value determined within said predetermined range in an adjustable range of an adjustment value;

a selective adjustment value extraction means for extracting a plurality of selective adjustment values to be subject to adjustment from the extracted adjustment value candidates;

an intermediate formation means for forming an intermediate base image for the base color in accordance with the predetermined adjustment value, and forming an intermediate correction image for the correction color in accordance with said extracted selective adjustment values;

an intermediate adjustment value determination means for determining an intermediate adjustment value from said plurality of selective adjustment values based on the density output corresponding to the intermediate base image and the intermediate correction image from said sensor;

an intermediate adjustment value candidate extraction means for extracting a plurality of intermediate adjustment value candidates that have periodical relation with said determined intermediate adjustment value in an adjustable range of an adjustment value;

an execution means for again extracting a plurality of selective adjustment values to be subject to adjustment from the extracted intermediate adjustment value candidates by said selective adjustment value extraction means and repeatedly executing each process at said intermediate formation means, intermediate adjustment value determination means and intermediate adjustment value candidate extraction means until the number of extracted intermediate adjustment value candidates becomes less than a predetermined number, if the number of extracted intermediate adjustment value candidates is the predetermined number or more;

a final formation means for forming a final base image for the base color in accordance with the predetermined adjustment value, and forming a final correction image for the correction color in accordance with each of said extracted intermediate adjustment value candidates, if the number of intermediate adjustment value candidates extracted by said intermediate adjustment value candidate extraction means is less than the predetermined number;

a final adjustment value determination means for determining a final adjustment value from said intermediate adjustment value candidates based on the density output corresponding to the final base image and the final correction image from said sensor; and a correction means for correcting the predetermined adjustment value for the correction color to the determined final adjustment value.

12. The image forming apparatus according to claim 11, wherein said first formation means forms the first base image with a first interval and forms said first correction image based on a value obtained by changing an adjustment value within the range of a first interval.

13. The image forming apparatus according to claim 11, wherein said first formation means forms said first base image and first correction image having a same shape.

14. The image forming apparatus according to claim 12, wherein said intermediate formation means forms the intermediate base image for the base color in accordance with the predetermined adjustment valued based on said first interval, and forms the intermediate correction image for the correction color in accordance with said extracted selective adjustment values based on said first interval.

15. The image forming apparatus according to claim 12, wherein said final formation means forms the final base image for the base color in accordance with the predetermined adjustment value based on said first interval, and forms the final correction image for the correction color in accordance with each of said extracted intermediate adjustment value candidates based on said first interval if the number of intermediate adjustment value candidates extracted by said intermediate adjustment value candidate extraction step is less than the predetermined number.

16. The image forming apparatus according to claim 14, wherein each of said first base image, first correction image, intermediate base image, intermediate correction image, final base image, and final correction image has a rectangular shape, and each of the intermediate base image, intermediate correction image, final base image, and final correction image has a width corresponding to an integer multiple of said first interval.

17. The image forming apparatus according to claim 16, wherein said intermediate adjustment value candidates extraction means extracts a plurality of intermediate adjustment value candidates obtained by adding or subtracting an integer multiple of the sum of the widths of the intermediate base image and the intermediate correction image formed at said intermediate formation means to/from the intermediate adjustment value determined at said intermediate adjustment value determination means in an adjustable range of an adjustment value.

18. The image forming apparatus according to claim 11, further comprising a means for determining whether or not image formation by said intermediate formation means is to be executed; wherein said correction means corrects the predetermined adjustment value for the correction color to said determined first adjustment value if it is determined that no image formation by said intermediate formation means is to be executed.

19. A computer-readable medium recording a computer program for correcting a predetermined adjustment value for an image forming apparatus forming an image of each of separated colors in accordance with said adjustment value, said computer program comprising:

a first formation step of making a computer form a first base image for a base color in accordance with a predetermined adjustment value, and form a first correction image for a correction color to be a subject for correction in accordance with a value obtained by changing a predetermined adjustment value within a predetermined range;

a first adjustment value determination step of making a computer determine a first adjustment value from the changed adjustment value based on a density output corresponding to the first base image and the first correction image from a sensor that outputs a density of an image forming portion;

an adjustment value candidate extraction step of making a computer extract a plurality of adjustment value candidates that have periodical relation with the first adjustment value determined within said predetermined range in an adjustable range of an adjustment value;

a selective adjustment value extraction step of making a computer extract a plurality of selective adjustment values to be subject to adjustment from the extracted adjustment value candidates;

an intermediate formation step of making a computer form an intermediate base image for the base color in accordance with the predetermined adjustment value, and form an intermediate correction image for the correction color in accordance with said extracted selective adjustment values;

an intermediate adjustment value determination step of making a computer determine an intermediate adjustment value from said plurality of selective adjustment values based on the density output corresponding to the intermediate base image and the intermediate correction image from said sensor;

an intermediate adjustment value candidate extraction step of making a computer extract a plurality of intermediate adjustment value candidates that have periodical relation with said determined intermediate adjustment value in an adjustable range of an adjustment value;

an execution step of making a computer again extract a plurality of selective adjustment values to be subject to adjustment from the extracted intermediate adjustment value candidates by said selective adjustment value extraction step and repeatedly execute each process at said intermediate formation step, intermediate adjustment value determination step and intermediate adjustment value candidate extraction step until the number of extracted intermediate adjustment value candidates becomes less than a predetermined number, if the number of extracted intermediate adjustment value candidates is the predetermined number or more;

a final formation step of making a computer form a final base image for the base color in accordance with the predetermined adjustment value, and form a final correction image for the correction color in accordance with each of said extracted intermediate adjustment value candidates, if the number of intermediate adjustment value candidates extracted by said intermediate adjustment value candidate extraction step is less than the predetermined number;

a final adjustment value determination step of making a computer determine a final adjustment value from said intermediate adjustment value candidates based on the density output corresponding to the final base image and the final correction image from said sensor; and a correction step of making a computer correct the predetermined adjustment value for the correction color to the determined final adjustment value.

* * * * *